United States Patent
Mehta et al.

(10) Patent No.: US 11,832,157 B2
(45) Date of Patent: *Nov. 28, 2023

(54) DEVICES AND METHODS FOR EFFICIENT EMERGENCY CALLING

(71) Applicant: RapidSOS, Inc., New York, NY (US)

(72) Inventors: Anil Mehta, Makanda, IL (US); Michael John Martin, Long Island City, NY (US); Nicholas Edward Horelik, Long Island City, NY (US); Matthew Bozik, New York, NY (US); Kris Kolodziej, Califon, NJ (US)

(73) Assignee: RapidSOS, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,392

(22) Filed: Sep. 7, 2021

(65) Prior Publication Data

US 2021/0409928 A1    Dec. 30, 2021

Related U.S. Application Data

(63) Continuation of application No. 16/823,192, filed on Mar. 18, 2020, now Pat. No. 11,140,538, which is a
(Continued)

(51) Int. Cl.
*H04W 4/02* (2018.01)
*H04W 4/90* (2018.01)
(Continued)

(52) U.S. Cl.
CPC ............... *H04W 4/90* (2018.02); *G10L 15/22* (2013.01); *G10L 17/00* (2013.01); *H04M 1/236* (2013.01);
(Continued)

(58) Field of Classification Search
CPC ............................... H04W 4/90; H04W 76/50
See application file for complete search history.

(56) References Cited

U.S. PATENT DOCUMENTS

| | | |
|---|---|---|
| 5,379,337 A | 1/1995 | Castillo et al. |
| 5,479,482 A | 12/1995 | Grimes |

(Continued)

FOREIGN PATENT DOCUMENTS

| | | |
|---|---|---|
| CA | 2662606 A1 | 10/2009 |
| CA | 2697986 A1 | 9/2010 |

(Continued)

OTHER PUBLICATIONS

Abel et al. Semantics + Filtering + Search = Twitcident exploring information in social web streams. HT'12—Proceedings of 23rd ACM Conference on Hypertext and Social Media (10 pgs) (Jun. 25-28, 2012).

(Continued)

*Primary Examiner* — Michael T Vu
(74) *Attorney, Agent, or Firm* — FITCH, EVEN, TABIN & FLANNERY LLP

(57) ABSTRACT

Disclosed are devices, systems, methods, and media for efficient emergency calling using digital devices. In some embodiments, a user is able to make an emergency call by a one-touch or dual-touch process. An authentication process may reduce inadvertent and unauthorized emergency calling. Persistent emergency buttons are also disclosed that may be used for calling emergency in different states of the device.

20 Claims, 10 Drawing Sheets

Related U.S. Application Data continuation of application No. 16/150,099, filed on Oct. 2, 2018, now Pat. No. 10,701,541, which is a continuation of application No. 15/588,343, filed on May 5, 2017, now Pat. No. 10,136,294, which is a continuation of application No. 15/382,097, filed on Dec. 16, 2016, now Pat. No. 9,736,670.

(60) Provisional application No. 62/268,664, filed on Dec. 17, 2015.

(51) Int. Cl.

| | |
|---|---|
| *H04W 88/02* | (2009.01) |
| *H04W 76/50* | (2018.01) |
| *H04W 12/06* | (2021.01) |
| *G10L 17/00* | (2013.01) |
| *G10L 15/22* | (2006.01) |
| *H04M 1/23* | (2006.01) |
| *H04W 64/00* | (2009.01) |
| *H04M 1/27* | (2006.01) |

(52) U.S. Cl.
CPC .............. *H04W 4/02* (2013.01); *H04W 12/06* (2013.01); *H04W 12/068* (2021.01); *H04W 64/00* (2013.01); *H04W 76/50* (2018.02); *H04W 88/02* (2013.01); *G10L 2015/223* (2013.01); *H04M 1/271* (2013.01); *H04M 2242/04* (2013.01); *H04M 2250/10* (2013.01); *H04M 2250/12* (2013.01); *H04M 2250/22* (2013.01); *H04M 2250/52* (2013.01); *H04M 2250/68* (2013.01); *H04M 2250/74* (2013.01)

(56) References Cited

U.S. PATENT DOCUMENTS

| | | | |
|---|---|---|---|
| 5,563,931 | A  | 10/1996 | Bishop et al. |
| 5,596,625 | A  | 1/1997  | Leblanc |
| 5,710,803 | A  | 1/1998  | Kowal et al. |
| 5,742,666 | A  | 4/1998  | Alpert |
| 6,014,555 | A  | 1/2000  | Tendler |
| 6,133,853 | A  | 10/2000 | Obradovich et al. |
| 6,167,255 | A  | 12/2000 | Kennedy et al. |
| 6,249,674 | B1 | 6/2001  | Verdonk |
| 6,252,943 | B1 | 6/2001  | Johnson et al. |
| 6,256,489 | B1 | 7/2001  | Lighter et al. |
| 6,262,655 | B1 | 7/2001  | Yoshioka et al. |
| 6,292,687 | B1 | 9/2001  | Lowell et al. |
| 6,363,138 | B1 | 3/2002  | Aprile |
| 6,459,782 | B1 | 10/2002 | Bedrosian et al. |
| 6,477,362 | B1 | 11/2002 | Raith et al. |
| 6,502,030 | B2 | 12/2002 | Hilleary |
| 6,510,315 | B1 | 1/2003  | Arnson |
| 6,556,816 | B1 | 4/2003  | Gafrick et al. |
| 6,571,092 | B2 | 5/2003  | Faccin et al. |
| 6,574,323 | B1 | 6/2003  | Manuel et al. |
| 6,587,545 | B1 | 7/2003  | Antonucci et al. |
| 6,594,666 | B1 | 7/2003  | Biswas et al. |
| 6,600,812 | B1 | 7/2003  | Gentillin et al. |
| 6,628,933 | B1 | 9/2003  | Humes |
| 6,680,998 | B1 | 1/2004  | Bell et al. |
| 6,707,421 | B1 | 3/2004  | Drury et al. |
| 6,731,610 | B2 | 5/2004  | Sajikawa et al. |
| 6,993,118 | B2 | 1/2006  | Antonucci et al. |
| 7,054,611 | B2 | 5/2006  | Eisner et al. |
| 7,058,385 | B2 | 6/2006  | Lauper |
| 7,084,775 | B1 | 8/2006  | Smith |
| 7,177,400 | B2 | 2/2007  | Eisner et al. |
| 7,224,773 | B2 | 5/2007  | Croak et al. |
| 7,271,704 | B2 | 9/2007  | McSheffrey et al. |
| 7,277,705 | B2 | 10/2007 | Casaccia et al. |
| 7,313,402 | B1 | 12/2007 | Rahman |
| 7,324,801 | B2 | 1/2008  | Droste et al. |
| 7,349,706 | B2 | 3/2008  | Kim et al. |
| 7,409,044 | B2 | 8/2008  | Leduc |
| 7,409,428 | B1 | 8/2008  | Brabec et al. |
| 7,436,938 | B2 | 10/2008 | Savaglio et al. |
| 7,437,143 | B1 | 10/2008 | Williams |
| 7,469,138 | B2 | 12/2008 | Dayar et al. |
| 7,483,519 | B2 | 1/2009  | Binning |
| 7,519,351 | B2 | 4/2009  | Malone et al. |
| 7,519,372 | B2 | 4/2009  | MacDonald et al. |
| 7,548,158 | B2 | 6/2009  | Titus et al. |
| 7,565,131 | B2 | 7/2009  | Rollender |
| 7,646,854 | B2 | 1/2010  | Anderson |
| 7,676,215 | B2 | 3/2010  | Chin et al. |
| 7,684,782 | B2 | 3/2010  | Ashley, Jr. et al. |
| 7,848,733 | B2 | 12/2010 | Bull et al. |
| 7,937,067 | B2 | 5/2011  | Maier et al. |
| 7,949,326 | B2 | 5/2011  | Gallagher et al. |
| 8,009,810 | B2 | 8/2011  | Seidberg et al. |
| 8,027,658 | B2 | 9/2011  | Suryanarayana et al. |
| 8,041,335 | B2 | 10/2011 | Khetawat et al. |
| 8,041,341 | B1 | 10/2011 | Malackowski et al. |
| 8,045,954 | B2 | 10/2011 | Barbeau et al. |
| 8,068,881 | B2 | 11/2011 | Schrager |
| 8,102,972 | B2 | 1/2012  | Poremba |
| 8,126,424 | B2 | 2/2012  | Piett et al. |
| 8,150,367 | B1 | 4/2012  | Malladi et al. |
| 8,165,560 | B2 | 4/2012  | Stenquist |
| 8,165,562 | B2 | 4/2012  | Piett et al. |
| 8,185,087 | B2 | 5/2012  | Mitchell, Jr. et al. |
| 8,195,121 | B2 | 6/2012  | Dunn et al. |
| 8,219,135 | B2 | 7/2012  | De et al. |
| 8,244,205 | B2 | 8/2012  | Wu |
| 8,249,546 | B1 | 8/2012  | Shah et al. |
| 8,249,547 | B1 | 8/2012  | Fellner |
| 8,289,953 | B2 | 10/2012 | Ray et al. |
| 8,306,501 | B2 | 11/2012 | Moodbidri et al. |
| 8,326,260 | B1 | 12/2012 | Bradish et al. |
| 8,369,488 | B2 | 2/2013  | Sennett et al. |
| 8,396,970 | B2 | 3/2013  | Black et al. |
| 8,401,565 | B2 | 3/2013  | Sandberg et al. |
| 8,417,090 | B2 | 4/2013  | Fleming |
| 8,417,212 | B2 | 4/2013  | Cepuran et al. |
| 8,442,481 | B2 | 5/2013  | Maier et al. |
| 8,442,482 | B2 | 5/2013  | Maier et al. |
| 8,472,973 | B2 | 6/2013  | Lin et al. |
| 8,484,352 | B2 | 7/2013  | Piett et al. |
| 8,489,062 | B2 | 7/2013  | Ray et al. |
| 8,494,868 | B2 | 7/2013  | Saalsaa |
| 8,509,729 | B2 | 8/2013  | Shaw |
| 8,516,122 | B2 | 8/2013  | Piett et al. |
| 8,538,370 | B2 | 9/2013  | Ray et al. |
| 8,538,468 | B2 | 9/2013  | Daly |
| 8,588,733 | B2 | 11/2013 | Ferguson et al. |
| 8,594,015 | B2 | 11/2013 | Dunn et al. |
| 8,606,218 | B2 | 12/2013 | Ray et al. |
| 8,625,578 | B2 | 1/2014  | Roy et al. |
| 8,626,112 | B2 | 1/2014  | Ray et al. |
| 8,630,609 | B2 | 1/2014  | Ray et al. |
| 8,644,301 | B2 | 2/2014  | Tamhankar et al. |
| 8,649,806 | B2 | 2/2014  | Cuff et al. |
| 8,682,279 | B2 | 3/2014  | Rudolf et al. |
| 8,682,281 | B2 | 3/2014  | Dunn et al. |
| 8,682,286 | B2 | 3/2014  | Dickinson et al. |
| 8,712,366 | B2 | 4/2014  | Greene et al. |
| 8,747,336 | B2 | 6/2014  | Tran |
| 8,751,265 | B2 | 6/2014  | Piett et al. |
| 8,755,767 | B2 | 6/2014  | Maier et al. |
| 8,760,290 | B2 | 6/2014  | Piett et al. |
| 8,761,721 | B2 | 6/2014  | Li |
| 8,792,867 | B1 | 7/2014  | Negahban et al. |
| 8,811,935 | B2 | 8/2014  | Faccin et al. |
| 8,825,687 | B2 | 9/2014  | Marceau et al. |
| 8,848,877 | B2 | 9/2014  | Seidberg et al. |
| 8,866,606 | B1 | 10/2014 | Will et al. |
| 8,868,028 | B1 | 10/2014 | Kaltsukis |
| 8,880,021 | B2 | 11/2014 | Hawkins |
| 8,890,685 | B1 | 11/2014 | Sookman et al. |
| 8,903,355 | B2 | 12/2014 | Biage et al. |
| 8,918,075 | B2 | 12/2014 | Maier et al. |

(56) References Cited

U.S. PATENT DOCUMENTS

| | | |
|---|---|---|
| 8,948,732 B1 | 2/2015 | Negahban et al. |
| 8,971,839 B2 | 3/2015 | Hong |
| 8,983,424 B2 | 3/2015 | Binning |
| 8,984,143 B2 | 3/2015 | Serra et al. |
| 9,008,078 B2 | 4/2015 | Kamdar et al. |
| 9,014,657 B2 | 4/2015 | Rohde et al. |
| 9,019,870 B2 | 4/2015 | Khan et al. |
| 9,020,462 B2 | 4/2015 | Hodgson et al. |
| 9,071,643 B2 | 6/2015 | Saito et al. |
| 9,077,676 B2 | 7/2015 | Price et al. |
| 9,078,092 B2 | 7/2015 | Piett et al. |
| 9,094,816 B2 | 7/2015 | Maier et al. |
| 9,129,219 B1 | 9/2015 | Robertson et al. |
| 9,167,379 B1 | 10/2015 | Hamilton et al. |
| 9,244,922 B2 | 1/2016 | Marceau et al. |
| 9,258,680 B2 | 2/2016 | Drucker |
| 9,277,389 B2 | 3/2016 | Saito et al. |
| 9,351,142 B2 | 5/2016 | Basore et al. |
| 9,369,847 B2 | 6/2016 | Borghei |
| 9,384,491 B1 | 7/2016 | Briggs et al. |
| 9,390,625 B2 | 7/2016 | Green et al. |
| 9,402,159 B1 | 7/2016 | Self et al. |
| 9,408,051 B2 | 8/2016 | Finney et al. |
| 9,420,099 B1 | 8/2016 | Krishnan et al. |
| 9,426,638 B1 | 8/2016 | Johnson |
| 9,497,585 B1 | 11/2016 | Cooley et al. |
| 9,503,876 B2 | 11/2016 | Saito et al. |
| 9,544,260 B2 | 1/2017 | Cuff et al. |
| 9,544,750 B1 | 1/2017 | Self et al. |
| 9,591,467 B2 | 3/2017 | Piett et al. |
| 9,609,128 B2 | 3/2017 | Dahan et al. |
| 9,629,185 B1 | 4/2017 | Gluckman et al. |
| 9,635,534 B2 | 4/2017 | Maier et al. |
| 9,659,484 B1 | 5/2017 | Mehta et al. |
| 9,693,213 B2 | 6/2017 | Self et al. |
| 9,734,721 B2 | 8/2017 | Stenneth et al. |
| 9,736,670 B2 | 8/2017 | Mehta et al. |
| 9,756,169 B2 | 9/2017 | Mehta et al. |
| 9,794,755 B1 | 10/2017 | South et al. |
| 9,805,430 B2 | 10/2017 | Miasnik et al. |
| 9,838,858 B2 | 12/2017 | Anand et al. |
| 9,877,177 B2 | 1/2018 | Lesage et al. |
| 9,924,043 B2 | 3/2018 | Mehta et al. |
| 9,942,739 B2 | 4/2018 | Bozik et al. |
| 9,986,404 B2 | 5/2018 | Mehta et al. |
| 9,992,655 B2 | 6/2018 | Anand et al. |
| 9,994,218 B2 | 6/2018 | Pal et al. |
| 9,998,507 B2 | 6/2018 | Mehta et al. |
| 10,002,375 B1 | 6/2018 | Scythes et al. |
| D829,222 S | 9/2018 | Choi et al. |
| 10,089,854 B2 | 10/2018 | Hender et al. |
| 10,136,294 B2 | 11/2018 | Mehta et al. |
| 10,140,482 B2 | 11/2018 | Mehta et al. |
| 10,140,842 B2 | 11/2018 | Mehta et al. |
| 10,142,213 B1 | 11/2018 | Hart et al. |
| 10,142,469 B2 | 11/2018 | Klaban |
| 10,142,816 B2 | 11/2018 | Cavendish et al. |
| 10,149,116 B1 | 12/2018 | Kerr et al. |
| 10,165,431 B2 | 12/2018 | Bozik et al. |
| 10,375,558 B2 | 8/2019 | Katz et al. |
| 10,419,915 B2 | 9/2019 | Mehta et al. |
| 10,425,799 B2 | 9/2019 | Anand et al. |
| 10,447,865 B2 | 10/2019 | Mehta et al. |
| 10,657,799 B2 | 5/2020 | Mehta et al. |
| 10,701,541 B2 | 6/2020 | Mehta et al. |
| 10,701,542 B2 | 6/2020 | Martin et al. |
| 10,771,951 B2 | 9/2020 | Mehta et al. |
| 10,795,870 B1 | 10/2020 | Kulkarni |
| 10,805,786 B2 | 10/2020 | Pellegrini et al. |
| 10,820,181 B2 | 10/2020 | Horelik et al. |
| 10,861,320 B2 | 12/2020 | Martin et al. |
| 10,911,926 B2 | 2/2021 | Pellegrini et al. |
| 10,977,927 B2 | 4/2021 | Katz et al. |
| 11,140,538 B2 | 10/2021 | Mehta et al. |
| 11,146,680 B2 | 10/2021 | Leavitt et al. |
| 11,153,737 B2 | 10/2021 | Anand et al. |
| 11,197,145 B2 | 12/2021 | Martin et al. |
| 11,218,584 B2 | 1/2022 | Martin et al. |
| 11,330,664 B1 | 5/2022 | Martin et al. |
| 2001/0036224 A1 | 11/2001 | Demello et al. |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang et al. |
| 2002/0103622 A1 | 8/2002 | Burge |
| 2002/0120698 A1 | 8/2002 | Tamargo |
| 2003/0069035 A1 | 4/2003 | Shurvinton |
| 2003/0109245 A1 | 6/2003 | McCalmont et al. |
| 2003/0195775 A1 | 10/2003 | Hampton et al. |
| 2004/0166828 A1 | 8/2004 | Yosioka |
| 2004/0203572 A1 | 10/2004 | Aerrabotu et al. |
| 2004/0229620 A1 | 11/2004 | Zhao et al. |
| 2004/0266390 A1 | 12/2004 | Faucher et al. |
| 2005/0085215 A1 | 4/2005 | Kokko et al. |
| 2005/0104745 A1 | 5/2005 | Bachelder et al. |
| 2005/0111630 A1 | 5/2005 | Potorny et al. |
| 2005/0151642 A1 | 7/2005 | Tupler et al. |
| 2005/0176403 A1 | 8/2005 | Lalos |
| 2005/0190053 A1 | 9/2005 | Dione |
| 2005/0190892 A1 | 9/2005 | Dawson et al. |
| 2005/0192746 A1 | 9/2005 | King et al. |
| 2005/0220277 A1 | 10/2005 | Blalock et al. |
| 2005/0222829 A1 | 10/2005 | Dumas |
| 2005/0239477 A1 | 10/2005 | Kim et al. |
| 2005/0242944 A1 | 11/2005 | Bankert et al. |
| 2005/0282518 A1 | 12/2005 | D'Evelyn et al. |
| 2005/0285181 A1 | 12/2005 | Yasui et al. |
| 2006/0085275 A1 | 4/2006 | Stokes et al. |
| 2006/0109960 A1 | 5/2006 | D'Evelyn et al. |
| 2006/0154642 A1 | 7/2006 | Scannell, Jr. |
| 2006/0217105 A1 | 9/2006 | Kumar P S et al. |
| 2006/0234726 A1 | 10/2006 | Ashley, Jr. et al. |
| 2006/0293024 A1 | 12/2006 | Benco et al. |
| 2007/0003024 A1 | 1/2007 | Olivier et al. |
| 2007/0030144 A1 | 2/2007 | Titus et al. |
| 2007/0030146 A1 | 2/2007 | Shepherd |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060097 A1 | 3/2007 | Edge et al. |
| 2007/0161383 A1 | 7/2007 | Caci |
| 2007/0164872 A1 | 7/2007 | Monroe |
| 2007/0171854 A1 | 7/2007 | Chen et al. |
| 2007/0218895 A1 | 9/2007 | Saito et al. |
| 2008/0019268 A1 | 1/2008 | Rollins |
| 2008/0063153 A1 | 3/2008 | Krivorot et al. |
| 2008/0077474 A1 | 3/2008 | Dumas et al. |
| 2008/0081646 A1 | 4/2008 | Morin et al. |
| 2008/0166990 A1 | 7/2008 | Toiv |
| 2008/0194238 A1 | 8/2008 | Kwon |
| 2008/0253535 A1 | 10/2008 | Sherry et al. |
| 2008/0274721 A1 | 11/2008 | Stagnetto |
| 2008/0294058 A1 | 11/2008 | Shklarski |
| 2008/0309486 A1 | 12/2008 | McKenna et al. |
| 2009/0018875 A1 | 1/2009 | Monatesti et al. |
| 2009/0041206 A1 | 2/2009 | Hobby et al. |
| 2009/0094602 A1 | 4/2009 | Ziskind et al. |
| 2009/0134982 A1 | 5/2009 | Robertson et al. |
| 2009/0149153 A1 | 6/2009 | Lee |
| 2009/0186596 A1 | 7/2009 | Kaltsukis |
| 2009/0214000 A1 | 8/2009 | Patel et al. |
| 2009/0233573 A1 | 9/2009 | Gray |
| 2009/0257345 A1 | 10/2009 | King |
| 2009/0280771 A1 | 11/2009 | Bolin |
| 2009/0284348 A1 | 11/2009 | Pfeffer |
| 2009/0311987 A1 | 12/2009 | Edge et al. |
| 2009/0322513 A1 | 12/2009 | Hwang et al. |
| 2010/0002846 A1 | 1/2010 | Ray et al. |
| 2010/0003954 A1 | 1/2010 | Greene et al. |
| 2010/0003964 A1 | 1/2010 | Khare et al. |
| 2010/0093305 A1 | 4/2010 | Reich et al. |
| 2010/0156626 A1 | 6/2010 | Story |
| 2010/0159871 A1 | 6/2010 | Tester |

(56) References Cited

U.S. PATENT DOCUMENTS

| | | |
|---|---|---|
| 2010/0159976 A1 | 6/2010 | Marocchi et al. |
| 2010/0166153 A1 | 7/2010 | Guleria et al. |
| 2010/0190468 A1 | 7/2010 | Scott et al. |
| 2010/0202368 A1 | 8/2010 | Hans |
| 2010/0238018 A1 | 9/2010 | Kelly |
| 2010/0261448 A1 | 10/2010 | Peters |
| 2010/0262668 A1 | 10/2010 | Piett et al. |
| 2010/0291907 A1 | 11/2010 | Macnaughtan et al. |
| 2010/0317317 A1 | 12/2010 | Maier et al. |
| 2011/0009086 A1 | 1/2011 | Poremba et al. |
| 2011/0029600 A1 | 2/2011 | Theimer |
| 2011/0044444 A1 | 2/2011 | Abramson |
| 2011/0071880 A1 | 3/2011 | Spector |
| 2011/0086607 A1 | 4/2011 | Wang et al. |
| 2011/0103266 A1 | 5/2011 | Andreasen et al. |
| 2011/0134897 A1 | 6/2011 | Montemurro et al. |
| 2011/0151829 A1 | 6/2011 | Velusamy et al. |
| 2011/0153368 A1 | 6/2011 | Pierre et al. |
| 2011/0201357 A1 | 8/2011 | Garrett et al. |
| 2011/0263219 A1 | 10/2011 | Hasenfang et al. |
| 2011/0263319 A1 | 10/2011 | Hamalainen et al. |
| 2011/0281547 A1 | 11/2011 | Cordero |
| 2012/0002792 A1 | 1/2012 | Chang |
| 2012/0015622 A1 | 1/2012 | Kuz et al. |
| 2012/0028599 A1 | 2/2012 | Hatton et al. |
| 2012/0029970 A1 | 2/2012 | Stiles et al. |
| 2012/0040636 A1 | 2/2012 | Kazmi |
| 2012/0092161 A1 | 4/2012 | West |
| 2012/0144019 A1 | 6/2012 | Zhu |
| 2012/0146809 A1 | 6/2012 | Oh et al. |
| 2012/0157795 A1 | 6/2012 | Chiu et al. |
| 2012/0196557 A1 | 8/2012 | Reich et al. |
| 2012/0196558 A1 | 8/2012 | Reich et al. |
| 2012/0202428 A1 | 8/2012 | Mirbaha et al. |
| 2012/0210325 A1 | 8/2012 | De et al. |
| 2012/0218102 A1 | 8/2012 | Bivens et al. |
| 2012/0256745 A1 | 10/2012 | Piett et al. |
| 2012/0257729 A1 | 10/2012 | Piett et al. |
| 2012/0258680 A1 | 10/2012 | Piett et al. |
| 2012/0289243 A1 | 11/2012 | Tarlow et al. |
| 2012/0295575 A1 | 11/2012 | Nam |
| 2012/0295576 A1 | 11/2012 | Peterson |
| 2012/0309341 A1 | 12/2012 | Ward |
| 2012/0320912 A1 | 12/2012 | Estrada et al. |
| 2013/0005295 A1 | 1/2013 | Park et al. |
| 2013/0012155 A1 | 1/2013 | Forstall et al. |
| 2013/0030825 A1 | 1/2013 | Bagwandeen et al. |
| 2013/0036175 A1 | 2/2013 | Lau |
| 2013/0052983 A1 | 2/2013 | Fletcher et al. |
| 2013/0065569 A1 | 3/2013 | Leipzig et al. |
| 2013/0082837 A1 | 4/2013 | Cosentino et al. |
| 2013/0084824 A1 | 4/2013 | Hursey |
| 2013/0102351 A1 | 4/2013 | Mo |
| 2013/0120106 A1 | 5/2013 | Cauwels et al. |
| 2013/0120459 A1 | 5/2013 | Dickinson et al. |
| 2013/0122932 A1 | 5/2013 | Patel et al. |
| 2013/0138791 A1 | 5/2013 | Thomas et al. |
| 2013/0183924 A1 | 7/2013 | Saigh et al. |
| 2013/0185368 A1 | 7/2013 | Nordstrom et al. |
| 2013/0203373 A1 | 8/2013 | Edge |
| 2013/0203376 A1 | 8/2013 | Maier et al. |
| 2013/0222133 A1 | 8/2013 | Schultz et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0260710 A1 | 10/2013 | Hr |
| 2013/0309994 A1 | 11/2013 | Hellwig et al. |
| 2013/0331055 A1 | 12/2013 | McKown et al. |
| 2013/0331058 A1 | 12/2013 | Harvey |
| 2014/0031000 A1 | 1/2014 | Hanover |
| 2014/0045450 A1 | 2/2014 | Ballantyne et al. |
| 2014/0051379 A1 | 2/2014 | Ganesh et al. |
| 2014/0059060 A1 | 2/2014 | Yang et al. |
| 2014/0086108 A1 | 3/2014 | Dunn et al. |
| 2014/0086145 A1 | 3/2014 | Ramkumar et al. |
| 2014/0087680 A1 | 3/2014 | Luukkala et al. |
| 2014/0087780 A1 | 3/2014 | Abhyanker et al. |
| 2014/0095425 A1 | 4/2014 | Sipple |
| 2014/0096195 A1 | 4/2014 | Morgan |
| 2014/0113606 A1 | 4/2014 | Morken et al. |
| 2014/0126356 A1 | 5/2014 | Lee et al. |
| 2014/0134969 A1 | 5/2014 | Jin et al. |
| 2014/0142979 A1 | 5/2014 | Mitsunaga |
| 2014/0148117 A1 | 5/2014 | Basore et al. |
| 2014/0148120 A1 | 5/2014 | Buck |
| 2014/0155017 A1 | 6/2014 | Fan et al. |
| 2014/0155018 A1 | 6/2014 | Fan et al. |
| 2014/0164505 A1 | 6/2014 | Daly et al. |
| 2014/0199959 A1 | 7/2014 | Hassan et al. |
| 2014/0213212 A1 | 7/2014 | Clawson |
| 2014/0218537 A1 | 8/2014 | Nepo |
| 2014/0222462 A1 | 8/2014 | Shakil et al. |
| 2014/0248848 A1 | 9/2014 | Mufti et al. |
| 2014/0253326 A1 | 9/2014 | Cho et al. |
| 2014/0257846 A1 | 9/2014 | Hermiz et al. |
| 2014/0302810 A1 | 10/2014 | Inha et al. |
| 2014/0324351 A1 | 10/2014 | Dannevik et al. |
| 2014/0359008 A1 | 12/2014 | Finney et al. |
| 2014/0368601 A1 | 12/2014 | Decharms |
| 2014/0370836 A1 | 12/2014 | Gladstone |
| 2014/0370841 A1 | 12/2014 | Roberts et al. |
| 2015/0011176 A1 | 1/2015 | Zhu |
| 2015/0029836 A1 | 1/2015 | Hans et al. |
| 2015/0031324 A1 | 1/2015 | Zentner et al. |
| 2015/0031418 A1 | 1/2015 | Bovis |
| 2015/0038109 A1 | 2/2015 | Salahshour |
| 2015/0054639 A1 | 2/2015 | Rosen |
| 2015/0055453 A1 | 2/2015 | Chaki et al. |
| 2015/0055554 A1 | 2/2015 | Sedlacek et al. |
| 2015/0065082 A1 | 3/2015 | Sehgal |
| 2015/0080021 A1 | 3/2015 | Bietz et al. |
| 2015/0081209 A1 | 3/2015 | Yeh et al. |
| 2015/0081927 A1 | 3/2015 | Xu et al. |
| 2015/0085997 A1 | 3/2015 | Biage et al. |
| 2015/0087259 A1 | 3/2015 | Hinsen |
| 2015/0094095 A1 | 4/2015 | Johnson et al. |
| 2015/0099481 A1 | 4/2015 | Maitre et al. |
| 2015/0109125 A1 | 4/2015 | Kaib et al. |
| 2015/0111524 A1 | 4/2015 | South |
| 2015/0137972 A1 | 5/2015 | Nepo et al. |
| 2015/0140936 A1 | 5/2015 | Sachs et al. |
| 2015/0147995 A1 | 5/2015 | Bontu et al. |
| 2015/0172897 A1 | 6/2015 | Mariathasan et al. |
| 2015/0181401 A1 | 6/2015 | Dhandu et al. |
| 2015/0201316 A1 | 7/2015 | Khatibi et al. |
| 2015/0289121 A1 | 10/2015 | Lesage et al. |
| 2015/0289122 A1 | 10/2015 | Friesen |
| 2015/0296351 A1 | 10/2015 | Tham et al. |
| 2015/0304827 A1 | 10/2015 | Price et al. |
| 2015/0317392 A1 | 11/2015 | Fernandez |
| 2015/0317809 A1 | 11/2015 | Chellappan et al. |
| 2015/0319284 A1 | 11/2015 | Leonessi |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1* | 1/2016 | Pi .................. G04G 21/025 368/10 |
| 2016/0026768 A1 | 1/2016 | Singh et al. |
| 2016/0034961 A1 | 2/2016 | May et al. |
| 2016/0057595 A1 | 2/2016 | Ahmed et al. |
| 2016/0065748 A1 | 3/2016 | Li et al. |
| 2016/0088455 A1 | 3/2016 | Bozik et al. |
| 2016/0142894 A1 | 5/2016 | Papakonstantinou et al. |
| 2016/0173689 A1 | 6/2016 | Klaban |
| 2016/0210581 A1 | 7/2016 | Braun |
| 2016/0219084 A1 | 7/2016 | Abiezzi |
| 2016/0219397 A1 | 7/2016 | Mayor et al. |
| 2016/0227589 A1 | 8/2016 | Marshall et al. |
| 2016/0269535 A1 | 9/2016 | Balabhadruni et al. |
| 2016/0307436 A1 | 10/2016 | Nixon |
| 2016/0315923 A1 | 10/2016 | Riscombe-Burton et al. |
| 2016/0316493 A1 | 10/2016 | Davis et al. |
| 2016/0330769 A1 | 11/2016 | Edge |
| 2016/0337831 A1 | 11/2016 | Piett et al. |

(56) References Cited

U.S. PATENT DOCUMENTS

| | | |
|---|---|---|
| 2016/0345171 A1 | 11/2016 | Kulkarni et al. |
| 2016/0353262 A1 | 12/2016 | Acevedo et al. |
| 2016/0353266 A1 | 12/2016 | Winkler et al. |
| 2016/0363931 A1 | 12/2016 | Yang et al. |
| 2016/0371973 A1 | 12/2016 | Holleczek et al. |
| 2017/0004427 A1 | 1/2017 | Bruchal et al. |
| 2017/0012815 A1 | 1/2017 | Nekrestyanov et al. |
| 2017/0046216 A1 | 2/2017 | Stenneth et al. |
| 2017/0075407 A1 | 3/2017 | Kritt et al. |
| 2017/0078226 A1 | 3/2017 | Daly et al. |
| 2017/0099579 A1 | 4/2017 | Ryan et al. |
| 2017/0108862 A1 | 4/2017 | Mikkelsen |
| 2017/0116845 A1 | 4/2017 | See et al. |
| 2017/0124670 A1 | 5/2017 | Becker et al. |
| 2017/0124852 A1 | 5/2017 | Pauws et al. |
| 2017/0140637 A1 | 5/2017 | Thurlow et al. |
| 2017/0142568 A1 | 5/2017 | Saito et al. |
| 2017/0142570 A1 | 5/2017 | Self et al. |
| 2017/0150335 A1 | 5/2017 | Self et al. |
| 2017/0161614 A1 | 6/2017 | Mehta et al. |
| 2017/0180963 A1 | 6/2017 | Cavendish et al. |
| 2017/0180966 A1 | 6/2017 | Piett et al. |
| 2017/0188218 A1 | 6/2017 | Corley et al. |
| 2017/0208543 A1 | 7/2017 | Zhang et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2017/0287085 A1 | 10/2017 | Smith et al. |
| 2017/0310827 A1 | 10/2017 | Mehta et al. |
| 2017/0316698 A1 | 11/2017 | Stenneth et al. |
| 2017/0323209 A1 | 11/2017 | Rinzler et al. |
| 2017/0325056 A1 | 11/2017 | Mehta et al. |
| 2017/0331954 A1 | 11/2017 | Kotnis et al. |
| 2017/0359712 A1 | 12/2017 | Meredith et al. |
| 2017/0374538 A1 | 12/2017 | Gellens et al. |
| 2018/0020091 A1 | 1/2018 | Self et al. |
| 2018/0020329 A1 | 1/2018 | Smith |
| 2018/0039737 A1 | 2/2018 | Dempers et al. |
| 2018/0053394 A1 | 2/2018 | Gersten |
| 2018/0077282 A1 | 3/2018 | Herron et al. |
| 2018/0077553 A1 | 3/2018 | Gideon, III |
| 2018/0176271 A1 | 6/2018 | Laurent |
| 2018/0262544 A1 | 9/2018 | Mehta et al. |
| 2018/0310159 A1 | 10/2018 | Katz et al. |
| 2018/0352408 A1 | 12/2018 | Baer et al. |
| 2019/0020993 A1 | 1/2019 | Nguyen |
| 2019/0130719 A1 | 5/2019 | D'Amico |
| 2019/0149661 A1 | 5/2019 | Klaban |
| 2019/0166244 A1 | 5/2019 | Ravichandran |
| 2019/0166480 A1 | 5/2019 | Rauner |
| 2019/0172335 A1 | 6/2019 | Johnston-Mitchell |
| 2019/0174288 A1 | 6/2019 | Bozik et al. |
| 2019/0174289 A1 | 6/2019 | Martin et al. |
| 2019/0205120 A1 | 7/2019 | Sheedy et al. |
| 2019/0230476 A1 | 7/2019 | Qi et al. |
| 2019/0246260 A1 | 8/2019 | Edge et al. |
| 2019/0261145 A1 | 8/2019 | South et al. |
| 2019/0281165 A1 | 9/2019 | Mehta et al. |
| 2019/0306664 A1 | 10/2019 | Mehta et al. |
| 2019/0320310 A1 | 10/2019 | Horelik et al. |
| 2019/0324825 A1 | 10/2019 | Schwartz et al. |
| 2019/0327597 A1 | 10/2019 | Katz et al. |
| 2020/0015058 A1 | 1/2020 | Wu |
| 2020/0059776 A1 | 2/2020 | Martin et al. |
| 2020/0100084 A1 | 3/2020 | Martin et al. |
| 2020/0126174 A1 | 4/2020 | Halse et al. |
| 2020/0135005 A1 | 4/2020 | Katz et al. |
| 2020/0242138 A1 | 7/2020 | Russ et al. |
| 2020/0258374 A1 | 8/2020 | Mehta et al. |
| 2020/0344602 A1 | 10/2020 | Li |
| 2021/0006961 A1 | 1/2021 | King-Berkman et al. |
| 2021/0014659 A1 | 1/2021 | Mehta et al. |
| 2021/0037368 A1 | 2/2021 | Leavitt et al. |
| 2021/0110686 A1 | 4/2021 | Slavin et al. |
| 2021/0127228 A1 | 4/2021 | Baarman et al. |
| 2021/0204108 A1 | 7/2021 | Horelik et al. |
| 2021/0266722 A1 | 8/2021 | Pellegrini et al. |
| 2021/0390844 A1 | 12/2021 | Katz et al. |
| 2022/0030109 A1 | 1/2022 | Leavitt et al. |
| 2022/0103995 A1 | 3/2022 | Horelik et al. |
| 2022/0131637 A1 | 4/2022 | Sangal et al. |
| 2022/0167141 A1 | 5/2022 | Anand et al. |
| 2022/0172599 A1 | 6/2022 | Mehta et al. |
| 2022/0174468 A1 | 6/2022 | Anand et al. |
| 2022/0201458 A1 | 6/2022 | Leavitt et al. |
| 2022/0264274 A1 | 8/2022 | Bozik et al. |
| 2022/0303380 A1 | 9/2022 | Martin et al. |
| 2022/0322061 A1 | 10/2022 | King-Berkman et al. |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2947936 A1 | 11/2014 |
| CA | 2646607 C | 9/2016 |
| CA | 2886535 A1 | 10/2016 |
| CA | 2697986 C | 5/2018 |
| CN | 104487976 A | 4/2015 |
| CN | 104539776 A | 4/2015 |
| CN | 104541313 A | 4/2015 |
| CN | 205220594 U | 5/2016 |
| CN | 106021508 A | 10/2016 |
| EP | 2161912 A2 | 3/2010 |
| JP | H10314133 A | 12/1998 |
| JP | H1170086 A | 3/1999 |
| JP | 2003272070 A | 9/2003 |
| JP | 2006319946 A | 11/2006 |
| JP | 2006334369 A | 12/2006 |
| JP | 4107777 B2 | 6/2008 |
| JP | 2011-040883 A | 2/2011 |
| JP | 2011223285 A | 11/2011 |
| JP | 2012222443 A | 11/2012 |
| JP | 2015-226182 A | 12/2015 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| KR | 20170100422 A | 9/2017 |
| WO | WO-0022593 A1 | 4/2000 |
| WO | WO-0165763 A2 | 9/2001 |
| WO | WO-0167419 A2 | 9/2001 |
| WO | WO-2007109599 A2 | 12/2007 |
| WO | WO-2012129561 A1 | 9/2012 |
| WO | WO-2014025563 A1 | 2/2014 |
| WO | WO-2014063121 A1 | 4/2014 |
| WO | WO-2014074420 A1 | 5/2014 |
| WO | WO-2014087157 A1 | 6/2014 |
| WO | WO-2014176646 A1 | 11/2014 |
| WO | WO-2015127867 A1 | 9/2015 |
| WO | WO-2015196155 A1 | 12/2015 |
| WO | WO-2016044540 A1 | 3/2016 |
| WO | WO-2016093553 A1 | 6/2016 |
| WO | WO-2017079354 A1 | 5/2017 |
| WO | WO-2017083571 A1 | 5/2017 |
| WO | WO-2017100220 A1 | 6/2017 |
| WO | WO-2017106775 A1 | 6/2017 |
| WO | WO-2017112820 A1 | 6/2017 |
| WO | WO-2017189610 A2 | 11/2017 |
| WO | WO-2017196753 A1 | 11/2017 |
| WO | WO-2018039142 A1 | 3/2018 |
| WO | WO-2019113129 A1 | 6/2019 |
| WO | WO-2020172612 A1 | 8/2020 |
| WO | WO-2020205033 A1 | 10/2020 |
| WO | WO-2021034859 A1 | 2/2021 |

(56) References Cited

FOREIGN PATENT DOCUMENTS

OTHER PUBLICATIONS

ArcGIS REST Services Directory. Folder: TIGERWeb. Available at https://tigerweb.geo.census.gov/arcgis/rest/services/TIGERweb. (1 pg.) (Accessed Sep. 2017).
Chohlaswood et al. Mining 911 Calls in New York City: Temporal Patterns, Detection and Forecasting. AAAI Conference on Artificial Intelligence Workshop (Apr. 2015).
Chowdhury et al. Tweet4act: Using incident-specific profiles for classifying crisis-related messages. Proceedings of the 10th International ISCRAM Conference (pp. 834-839) (2013).
Cipolla et al. A tool for Emergency Detection with Deep Learning Neural Networks. KDWeb (2016) How to predict a disaster. ICAR—National Research Council of Italy—Palermo, Italy (Dec. 1, 2016) (10 pgs).
Hodgkiss et al. Spatiotemporal Analysis of 911 Call Stream Data. Proceedings of the 2005 national conference on Digital government research (2005).
Homeland Security Science and Technology. Using Social Media for Enhanced Situational Awareness and Decision Support. Virtual Social Medial Working Group and DHS First Responders Group. (44 pgs.) (Jun. 2014).
Jasso et al. Prediction of 911 Call Volumes for Emergency Event Detection. Proceedings of the 8th Annual International Digital Government Research Conference (2007).
Marcus et al. Twitinfo: Aggregating and Visualizing Microblogs for Event Exploration. ACM CHI Conference May 7-12, 2011, 2011 (10 pgs).
Meier. MatchApp: Next Generation Disaster Response App? iRevolution (12 pgs.) (Feb. 27, 2013).
National Emergency No. Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (May 8, 2012).
National Emergency No. Association (Nena) Technical Committee Chairs: NENA Functional and Interface Standards for Next Generation 9-1-1 Version 1.0 (i3). (Dec. 18, 2017). Retrieved from the Internet: URL:https://c.ymcdn.com/sites/nena.site-ym.com/resource/collection/2851C951-69FF-40F0-A6B8-36A714CB085D/NENA_08-002-vl_Functional_Interface_Standards_NG911_i3.pdf [retrieved on Feb. 5, 2018] (121 pgs).
PCT/US2015/050609 International Search Report and Written Opinion dated Dec. 16, 2015.
PCT/US2016/060189 International Search Report and Written Opinion dated Feb. 24, 2017.
PCT/US2016/065212 International Search Report and Written Opinion dated Feb. 20, 2017.
PCT/US2016/067366 International Search Report and Written Opinion dated Mar. 31, 2017.
PCT/US2016/068134 International Search Report and Written Opinion dated Apr. 21, 2017.
PCT/US2017/029465 International Search Report and Written Opinion dated Aug. 9, 2017.
PCT/US2017/031605 International Search Report and Written Opinion dated Jul. 31, 2017.
PCT/US2017/047854 International Search Report and Written Opinion dated Nov. 28, 2017.
PCT/US2018/028951 International Search Report and Written Opinion dated Aug. 10, 2018.
PCT/US2018/063935 International Search Report and Written Opinion dated Mar. 22, 2019.
PCT/US2019/027538 International Search Report and Written Opinion dated Aug. 2, 2019.
PCT/US2020/019341 International Search Report and Written Opinion dated Jun. 29, 2020.
PCT/US2020/046857 International Search Report and Written Opinion dated Nov. 18, 2020.
Seattle Real Time Fire 911 Calls. Available at https://catalog.data.gov/dataset/seattle-real-time-fire-911-calls-6cdf3 (3 pgs.) (Accessed Sep. 2017).
Song. Next Generation Emergency Call System with Enhanced Indoor Positioning, Columbia University. Thesis [online] [retrieved Apr. 20, 2020 from < url:https://scholar.google.co.kr/citations/?user=h_4uUqAAAAAJ&hl=ko (156 pgs) (2014) </url:. < a > .
Takazi. Floating Ground: An Architecture for Network Mobility and Ad Hoc Network Convergence. Thesis. Graduate School of Media and Governance Keio University 5322 Endo Fujisawa, Kanagawa, JAPAN 2520882 (pp. 1-162) (Jan. 2011).
U.S. Census Bureau. Developers: Population Estimates APIs. Available at https://www.census.gov/data/developers/data-sets/popest-popproj/popest.html (2 pgs.) (Accessed Sep. 2017).
U.S. Appl. No. 14/794,780 Office Action dated Feb. 2, 2016.
U.S. Appl. No. 14/794,780 Office Action dated Mar. 7, 2017.
U.S. Appl. No. 14/794,780 Office Action dated Nov. 15, 2016.
U.S. Appl. No. 14/856,818 Office Action dated Apr. 12, 2017.
U.S. Appl. No. 15/371,117 Office Action dated Apr. 3, 2020.
U.S. Appl. No. 15/371,117 Office Action dated Aug. 5, 2019.
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,379 Office Action dated Nov. 2, 2017.
U.S. Appl. No. 15/436,484 Office Action dated May 8, 2017.
U.S. Appl. No. 15/436,484 Office Action dated Sep. 14, 2017.
U.S. Appl. No. 15/444,133 Office Action dated Apr. 4, 2017.
U.S. Appl. No. 15/444,133 Office Action dated Aug. 17, 2017.
U.S. Appl. No. 15/497,067 Office Action dated Jun. 23, 2017.
U.S. Appl. No. 15/588,343 Office Action dated Feb. 26, 2018.
U.S. Appl. No. 15/589,847 Office Action dated Jun. 23, 2017.
U.S. Appl. No. 15/589,847 Office Action dated Nov. 30, 2017.
U.S. Appl. No. 15/589,847 Office Action dated Nov. 6, 2018.
U.S. Appl. No. 15/667,531 Office Action dated Apr. 5, 2018.
U.S. Appl. No. 15/667,531 Office Action dated Nov. 8, 2017.
U.S. Appl. No. 15/682,440 Office Action dated Jan. 27, 2020.
U.S. Appl. No. 15/682,440 Office Action dated Jul. 10, 2019.
U.S. Appl. No. 15/880,208 Office Action dated Aug. 7, 2018.
U.S. Appl. No. 15/958,186 Office Action dated Oct. 18, 2018.
U.S. Appl. No. 15/958,398 Office Action dated Oct. 12, 2018.
U.S. Appl. No. 15/960,384 Office Action dated Jul. 12, 2018.
U.S. Appl. No. 15/976,600 Office Action dated Aug. 3, 2020.
U.S. Appl. No. 15/976,600 Office Action dated Jan. 30, 2020.
U.S. Appl. No. 16/150,099 Office Action dated Jun. 25, 2019.
U.S. Appl. No. 16/162,171 Office Action dated Apr. 9, 2020.
U.S. Appl. No. 16/162,171 Office Action dated Nov. 4, 2019.
U.S. Appl. No. 16/162,171 Office Action dated Sep. 24, 2020.
U.S. Appl. No. 16/178,476 Office Action dated May 30, 2019.
U.S. Appl. No. 16/209,892 Office Action dated Feb. 8, 2019.
U.S. Appl. No. 16/271,634 Office Action dated Dec. 16, 2019.
U.S. Appl. No. 16/271,634 Office Action dated Jun. 13, 2019.
U.S. Appl. No. 16/378,363 Office Action dated Feb. 17, 2021.
U.S. Appl. No. 16/378,363 Office Action dated Jul. 19, 2019.
U.S. Appl. No. 16/378,363 Office Action dated Sep. 17, 2021.
U.S. Appl. No. 16/384,600 Office Action dated Apr. 2, 2020.
U.S. Appl. No. 16/384,600 Office Action dated Jun. 9, 2021.
U.S. Appl. No. 16/384,600 Office Action dated Oct. 2, 2020.
U.S. Appl. No. 16/421,355 Office Action dated Feb. 4, 2020.
U.S. Appl. No. 16/421,355 Office Action dated Oct. 19, 2020.
U.S. Appl. No. 16/436,810 Office Action dated Aug. 9, 2019.
U.S. Appl. No. 16/436,810 Office Action dated Dec. 17, 2019.
U.S. Appl. No. 16/509,296 Office Action dated Sep. 3, 2020.
U.S. Appl. No. 16/526,195 Office Action dated Dec. 27, 2019.
U.S. Appl. No. 16/537,377 Office Action dated Dec. 27, 2021.
U.S. Appl. No. 16/684,366 Office Action dated Dec. 23, 2020.
U.S. Appl. No. 16/740,207 Office Action dated Aug. 17, 2020.
U.S. Appl. No. 16/740,207 Office Action dated Mar. 11, 2020.
U.S. Appl. No. 16/798,049 Office Action dated Jul. 17, 2020.
U.S. Appl. No. 16/798,049 Office Action dated Mar. 8, 2021.
U.S. Appl. No. 16/823,192 Office Action dated Dec. 4, 2020.
U.S. Appl. No. 16/834,914 Office Action dated Dec. 2, 2020.
U.S. Appl. No. 16/865,170 Office Action dated Jul. 9, 2021.
U.S. Appl. No. 16/936,856 Office Action dated Aug. 16, 2021.

(56) References Cited

OTHER PUBLICATIONS

U.S. Appl. No. 16/936,856 Office Action dated Aug. 5, 2021.
U.S. Appl. No. 17/115,098 Office Action dated Mar. 9, 2021.
U.S. Appl. No. 17/143,819 Office Action dated Dec. 6, 2021.
U.S. Appl. No. 17/332,863 Office Action dated Sep. 9, 2021.
U.S. Appl. No. 16/378,363 Office Action dated Jan. 14, 2020.
Weather Company Data For IBM Bluemix APIs. Available at https://twcservice.mybluemix.net/rest-api/ (100 pgs) (Accessed Sep. 2017).
Botega et al. Saw-Oriented User Interfaces For Emergency Dispatch Systems. Computer Vision—Eccv 2020 : 16th European Conference, Glasgow, Uk, Aug. 23-28, 2020 : Proceedings; Part of the Lecture Notes in Computer Science (Jul. 21, 2015).
U.S. Appl. No. 15/976,600 Office Action dated Jan. 28, 2022.
U.S. Appl. No. 16/421,355 Office Action dated Jan. 7, 2022.
U.S. Appl. No. 16/539,946 Office Action dated Jul. 28, 2022.
U.S. Appl. No. 16/865,170 Office Action dated Feb. 24, 2022.
U.S. Appl. No. 17/065,337 Office Action dated Aug. 12, 2022.
U.S. Appl. No. 17/143,819 Office Action dated May 26, 2022.
U.S. Appl. No. 17/196,438 Office Action dated May 10, 2022.
U.S. Appl. No. 17/221,568 Office Action dated May 2, 2022.
U.S. Appl. No. 17/378,045 Office Action dated Jul. 20, 2022.
U.S. Appl. No. 17/448,610 Office Action dated Oct. 5, 2022.
U.S. Appl. No. 17/545,244 Office Action dated Apr. 1, 2022.
U.S. Appl. No. 17/671,493 Office Action dated May 10, 2022.
U.S. Appl. No. 17/671,510 Office Action dated Apr. 22, 2022.
U.S. Appl. No. 17/671,510 Office Action dated Aug. 4, 2022.
U.S. Appl. No. 17/856,796 Office Action dated Sep. 13, 2022.

\* cited by examiner

DEVICES AND METHODS FOR EFFICIENT EMERGENCY CALLING

CROSS-REFERENCE TO RELATED APPLICATIONS

This application is a continuation of U.S. application Ser. No. 16/823,192 filed on Mar. 18, 2020, which is a continuation of U.S. application Ser. No. 16/150,099 filed on Oct. 2, 2018, now issued as U.S. Pat. No. 10,701,541 on Jun. 30, 2020, which is a continuation of U.S. application Ser. No. 15/588,343 filed on May 5, 2017, now issued as U.S. Pat. No. 10,136,294 on Nov. 20, 2018, which is a continuation of U.S. application Ser. No. 15/382,097 filed on Dec. 16, 2016, now issued as U.S. Pat. No. 9,736,670 on Aug. 15, 2017, which claims the benefit of U.S. Provisional Application No. 62/268,664 filed on Dec. 17, 2015, the entire contents of each are incorporated herein by reference in their entireties.

BACKGROUND

Emergency victims or bystanders may request help by calling a designated emergency number (e.g., 911 or phone number of a local emergency dispatch center). Increasingly, calls to emergency dispatch centers ("EDCs"), such as Public Safety Answering Points ("PSAPs"), are made via wireless communication devices rather than from land-based telephone lines. However, users are unable to place an emergency call or send an emergency request using wireless communication devices without having to dial a predefined number. In addition, when a wireless communication device is used for the emergency call via a cellphone carrier, the EDCs or PSAPs often receive limited location information, which may delay the emergency response time.

SUMMARY

In emergency situations, being able to make an emergency call with a communication device in a simple and efficient manner can save lives and reduce property damage. Various obstacles may complicate an attempt to request emergency assistance. An emergency may occur while the communication device is in an inaccessible or inconvenient state. The device may in a power-saving state, locked for security reasons, inactive due to low battery life or low cellular signal, or some other state that makes it difficult for a user to quickly and easily access the device to make an emergency request or call. For example, the user may not have a soft touch button or interactive element available to make an emergency call because the display is turned off. Even when the display is on, the user may have to unlock the screen before being able to place the call. Moreover, the act of calling itself can be a burden depending on the level of stress the user is experiencing. For example, even dialing a simple number like 9-1-1 requires three consecutive interactions to be accurately made, which may be particularly burdensome for a user in a state of panic or distress (e.g., the user is experiencing a medical emergency).

However, simplifying the process of making an emergency call or request is difficult because it may increase the likelihood of inadvertent emergency calls. Inadvertent or prank calling for emergency services can be burdensome and even a punishable offense in certain jurisdictions. One estimate is that two out of five 9-1-1 calls are accidents, prank calls, or hang ups, which needlessly depletes emergency response resources. Therefore, the need to reduce this drain on emergency response resources incentivizes increasing the number of user interactions with the communication device before the emergency request is sent in order to minimize accidental dials.

One advantage of the devices, platforms, media, and methods described herein is that they provide a simple and efficient process for sending an emergency alert or emergency request. This process allows a user to reach emergency response resources with minimal effort through one or more user interactions with the communication device that are easy to remember and carry out even in a state of stress. In some embodiments, this process is readily accessible regardless of the state the device is in. For example, in some embodiments, a user is able to send an emergency alert even if the device is in an "inactive" mode in which the display is turned OFF. Another advantage is the process mitigates the risk of sending emergency alerts inadvertently by providing user authentication. In addition, in some embodiments, the interactions required to send an emergency alert is predefined in a manner to reduce the risk of accidental dialing is reduced. Yet another advantage is the emergency alert itself provides relevant information about the emergency such as, for example, user identification, location information, the type of emergency.

In one aspect, provided herein is a device comprising at least one processor, a memory, a network component, a location component, a user interface, a display, and instructions executable by the at least one processor to create an application for sending an emergency alert comprising: (a) an interface module receiving from the user interface one or more user interactions indicative of an emergency; (b) a communication module establishing a communication link with an emergency management system or an emergency dispatch center after the interface module receives the one or more user interactions indicative of an emergency, wherein establishing the communication link comprises sending an emergency alert comprising a request for emergency assistance and emergency data comprising location information; (c) an authentication module providing user authentication, wherein user authentication is required before sending the emergency alert; and (d) at least two device modes comprising: (i) an active mode characterized by the display being powered on and presenting one or more non-physical interactive elements, wherein the one or more user interactions indicative of an emergency comprises interacting with one or more non-physical interactive elements on the display; and (ii) an inactive mode characterized by the display being powered off and presenting no interactive elements, wherein the one or more user interactions indicative of an emergency comprises interacting with one or more physical interactive elements on the device. In some embodiments, the authentication module provides user authentication by receiving user input authenticating user identity. In further embodiments, the user input is selected from the group consisting of: name, birth date, social security number, driver license number, home address, email address, phone number, credit card information, bank account information, biometrics, fingerprint, or any combination thereof. In some embodiments, the authentication module evaluates whether authentication is required. In some embodiments, the authentication module does not require authentication if the risk of inadvertent emergency calls is low. In some embodiments, the authentication module does not require authentication if the emergency management system or emergency dispatch center does not require authentication. In some embodiments, a user optionally disables the authentication requirement. In some embodiments, a delay timer is initiated after the interface module receives one or more user interactions indicative of an emergency, wherein the communication module sends the emergency alert when the delay timer counts down to zero. In further embodiments, the display presents the delay timer as a countdown during which a user can cancel the communication link before the countdown finishes. In further embodiments, the time delay is about 10 seconds. In some embodiments, the device further comprises a microphone for receiving audio input or commands from a user. In some embodiments, the device further comprises a camera for receiving photo or video input from a user. In some embodiments, the authentication module requires one or more user interactions providing user authentication after the interface module receives one or more user interactions indicative of an emergency. In further embodiments, the one or more user interactions providing user authentication is selected from the group consisting of: touch, tap, press, squeeze, swipe, voice, gesture, capturing a photo or video with a camera, or any combination thereof. In some embodiments, the one or more user interactions indicative of an emergency comprises a live video or photo captured by a camera. In further embodiments, the authentication module analyzes the video or photo to provide user authentication through face recognition, body recognition, audio recognition, or a combination thereof. In some embodiments, the one or more user interactions indicative of an emergency is predefined by a user. In some embodiments, the user selects one or more user interactions from a list of user interactions to be recognized by the interface module as being indicative of an emergency. In some embodiments, the user customizes one or more user interactions to be recognized by the interface module as being indicative of an emergency. In some embodiments, the one or more user interactions indicative of an emergency provides user authentication. In some embodiments, the one or more user interactions indicative of an emergency is selected from the group consisting of: touch, tap, press, squeeze, swipe, voice, gesture, capturing a photo or video with a camera, or any combination thereof. In some embodiments, the one or more user interactions indicative of an emergency comprises interacting with one or more hard buttons on the device. In further embodiments, the one or more hard buttons provide biometric authentication. In further embodiments, the one or more hard buttons comprise a fingerprint reader providing fingerprint authentication when the user interacts with the one or more hard buttons. In some embodiments, the one or more user interactions indicative of an emergency comprises interacting with one or more hard buttons on the device in a specific sequence. In some embodiments, the one or more user interactions indicative of an emergency comprise one or more voice commands. In further embodiments, the authentication module provides user authentication using voice recognition of the one or more voice commands. In some embodiments, the display comprises a touchscreen. In some embodiments, the device switches from inactive mode to active mode when the interface module receives one or more user interactions indicative of an emergency. In some embodiments, the active mode is characterized by the display presenting without interruption a persistent emergency button throughout the duration of the active mode, said persistent emergency button comprising at least one non-physical interactive element indicative of an emergency. In further embodiments, the interface module receives one or more interactions indicative of an emergency when the persistent emergency button is selected. In further embodiments, the persistent emergency button is responsive to user interaction when the device is locked. In further embodiments, the persistent emergency button is responsive to user interaction when the device is in a non-communicative state. In further embodiments, the persistent emergency button is responsive to user interaction when the device is engaged with other functions. In yet further embodiments, the other functions are selected from the group consisting of: phone call, messaging, social media, map or navigation, video chat, VoIP, web browsing, podcast, gaming, watching videos, mobile application, or any combination thereof. In further embodiments, the persistent emergency button is user adjustable. In yet further embodiments, a transparency or opaqueness of the emergency button is user adjustable. In yet further embodiments, the position of the emergency button on the display is user adjustable. In some embodiments, the display of the device in active mode presents interactive elements depicted as a grid of buttons, each interactive element corresponding to a different emergency indication. In further embodiments, the emergency indications are medical, police, fire, and car crash, wherein each interactive element comprises a minimalist graphic depicting the corresponding emergency indication. In some embodiments, the one or more user interactions indicative of an emergency for the device in active mode further comprises interacting with one or more physical interactive elements on the device. In some embodiments, the device further comprises an emergency mode characterized by an established communication link with an emergency management system or emergency dispatch center, wherein the display presents one or more interactive communication elements available for user selection to communicate with the emergency management system or emergency dispatch center. In further embodiments, the one or more interactive communication elements comprise a speechless button, wherein the communication module sends information to the emergency management system or emergency dispatch center indicating the user is unable to speak upon user selection of the speechless button. In further embodiments, the one or more interactive communication elements comprises a messaging button, wherein the communication module sends a message entered by a user to the emergency management system or emergency dispatch center upon user selection of the messaging button. In further embodiments, the one or more interactive communication elements comprises a recording button for capturing and sending a photo or video to the emergency management system or emergency dispatch center upon user selection of the recording button. In further embodiments, the one or more interactive communication elements comprises a speakerphone button for hands-free communication with the emergency management system or emergency dispatch center upon user selection of the speakerphone button. In some embodiments, the one or more physical interactive elements comprise one or more hard buttons. In further embodiments, the one or more hard buttons is selected from the group consisting of: power button, volume button, home button, navigation button, keyboard button, return button, multitasking button, camera button, or any combination thereof. In further embodiments, the one or more hard buttons comprise a sensor. In yet further embodiments, the sensor is a fingerprint scanner. In some embodiments, the non-physical interactive elements comprise one or more soft buttons. In further embodiments, the one or more soft buttons comprises a persistent emergency button. In some embodiments, the user interaction indicative of an emergency is a one-touch interaction. In further embodiments, the one-touch interaction comprises a user interaction with a soft button indicative of an emergency. In yet further embodiments, the one-touch interaction comprises a user interaction with a persistent emergency button. In further embodiments, the one-touch interaction is selected from the group consisting of: voice command, gesture, or photo or video capture with a camera. In yet further embodiments, the gesture is selected from the group consisting of: touch, tap, press, squeeze, or swipe. In further embodiments, the one-touch interaction comprises an extended interaction, wherein the user maintains contact with the user interface for at least 2 seconds. In yet further embodiments, the extended interaction provides user authentication. In some embodiments, the one or more user interactions indicative of an emergency comprise a dual touch interaction. In further embodiments, the dual touch interaction provides user authentication. In some embodiments, the emergency data comprises user authentication information. In some embodiments, the emergency data comprises real-time user information. In further embodiments, the real-time user information is selected from the group consisting of: location, emergency, speed, direction, physiological data, or a combination thereof. In yet further embodiments, the physiological data is obtained from one or more sensors in proximity to the user. In some embodiments, the data comprises historical user information. In further embodiments, the historical user information is selected from the group consisting of: location, past emergencies, physiological data, or a combination thereof. In yet further embodiments, the device periodically stores location information obtained from the location component to generate historical location information. In yet further embodiments, the historical user information comprises predefined information provided by a user. In still yet further embodiments, the predefined user information is selected from name, sex, gender, age, one or more pre-existing medical conditions, contact information, one or more emergency contacts, one or more disabilities, height, weight, biometric information, one or more preset locations the user frequents, or any combination thereof. In some embodiments, the emergency request is sent using Voice over Internet Protocol (VoIP). In some embodiments, the device is a communication device. In some embodiments, the device is a mobile wireless device. In some embodiments, the device is a tablet. In some embodiments, the device is a computer. In some embodiments, the device is a wearable device. In some embodiments, the communication module stores the emergency data and repeats attempting to establish a communication link when the request for emergency assistance fails to reach the emergency management system or emergency dispatch center.

In another aspect, provided herein is a system for sending an emergency alert comprising: a device comprising at least one processor, a memory, a network component, a location component, a user interface, a display, and instructions executable by the at least one processor to create an application for sending an emergency alert comprising: (a) an interface module receiving from the user interface one or more user interactions indicative of an emergency; (b) a communication module establishing a communication link with an emergency management system or an emergency dispatch center after the interface module receives the one or more user interactions indicative of an emergency, wherein establishing the communication link comprises sending an emergency alert comprising a request for emergency assistance and emergency data comprising location information; (c) an authentication module providing user authentication, wherein user authentication is required before sending the emergency alert; and (d) at least two device modes comprising: (i) an active mode characterized by the display being powered on and presenting one or more non-physical interactive elements, wherein the one or more user interactions indicative of an emergency comprises interacting with one or more non-physical interactive elements on the display; and (ii) an inactive mode characterized by the display being powered off and presenting no interactive elements, wherein the one or more user interactions indicative of an emergency comprises interacting with one or more physical interactive elements on the device. In some embodiments, the authentication module provides user authentication by receiving user input authenticating user identity. In further embodiments, the user input is selected from the group consisting of: name, birth date, social security number, driver license number, home address, email address, phone number, credit card information, bank account information, biometrics, fingerprint, or any combination thereof. In some embodiments, the authentication module evaluates whether authentication is required. In some embodiments, the authentication module does not require authentication if the risk of inadvertent emergency calls is low. In some embodiments, the authentication module does not require authentication if the emergency management system or emergency dispatch center does not require authentication. In some embodiments, a user optionally disables the authentication requirement. In some embodiments, a delay timer is initiated after the interface module receives one or more user interactions indicative of an emergency, wherein the communication module sends the emergency alert when the delay timer counts down to zero. In further embodiments, the display presents the delay timer as a countdown during which a user can cancel the communication link before the countdown finishes. In further embodiments, the time delay is about 10 seconds. In some embodiments, the device further comprises a microphone for receiving audio input or commands from a user. In some embodiments, the device further comprises a camera for receiving photo or video input from a user. In some embodiments, the authentication module requires one or more user interactions providing user authentication after the interface module receives one or more user interactions indicative of an emergency. In further embodiments, the one or more user interactions providing user authentication is selected from the group consisting of: touch, tap, press, squeeze, swipe, voice, gesture, capturing a photo or video with a camera, or any combination thereof. In some embodiments, the one or more user interactions indicative of an emergency comprises a live video or photo captured by a camera. In further embodiments, the authentication module analyzes the video or photo to provide user authentication through face recognition, body recognition, audio recognition, or a combination thereof. In some embodiments, the one or more user interactions indicative of an emergency is predefined by a user. In some embodiments, the user selects one or more user interactions from a list of user interactions to be recognized by the interface module as being indicative of an emergency. In some embodiments, the user customizes one or more user interactions to be recognized by the interface module as being indicative of an emergency. In some embodiments, the one or more user interactions indicative of an emergency provides user authentication. In some embodiments, the one or more user interactions indicative of an emergency is selected from the group consisting of: touch, tap, press, squeeze, swipe, voice, gesture, capturing a photo or video with a camera, or any combination thereof. In some embodiments, the one or more user interactions indicative of an emergency comprises interacting with one or more hard buttons on the device. In further embodiments, the one or more hard buttons provide biometric authentication. In further embodiments, the one or more hard buttons comprise a fingerprint reader providing fingerprint authentication when the user interacts with the one or more hard buttons. In some embodiments, the one or more user interactions indicative of an emergency comprises interacting with one or more hard buttons on the device in a specific sequence. In some embodiments, the one or more user interactions indicative of an emergency comprise one or more voice commands. In further embodiments, the authentication module provides user authentication using voice recognition of the one or more voice commands. In some embodiments, the display comprises a touchscreen. In some embodiments, the device switches from inactive mode to active mode when the interface module receives one or more user interactions indicative of an emergency. In some embodiments, the active mode is characterized by the display presenting without interruption a persistent emergency button throughout the duration of the active mode, said persistent emergency button comprising at least one non-physical interactive element indicative of an emergency. In further embodiments, the interface module receives one or more interactions indicative of an emergency when the persistent emergency button is selected. In further embodiments, the persistent emergency button is responsive to user interaction when the device is locked. In further embodiments, the persistent emergency button is responsive to user interaction when the device is in a non-communicative state. In further embodiments, the persistent emergency button is responsive to user interaction when the device is engaged with other functions. In yet further embodiments, the other functions are selected from the group consisting of: phone call, messaging, social media, map or navigation, video chat, Von', web browsing, podcast, gaming, watching videos, mobile application, or any combination thereof. In further embodiments, the persistent emergency button is user adjustable. In yet further embodiments, a transparency or opaqueness of the emergency button is user adjustable. In yet further embodiments, a position of the emergency button on the display is user adjustable. In some embodiments, the display of the device in active mode presents interactive elements depicted as a grid of buttons, each interactive element corresponding to a different emergency indication. In further embodiments, the emergency indications are medical, police, fire, and car crash, wherein each interactive element comprises a minimalist graphic depicting the corresponding emergency indication. In some embodiments, the one or more user interactions indicative of an emergency for the device in active mode further comprises interacting with one or more physical interactive elements on the device. In some embodiments, the device further comprises an emergency mode characterized by an established communication link with an emergency management system or emergency dispatch center, wherein the display presents one or more interactive communication elements available for user selection to communicate with the emergency management system or emergency dispatch center. In further embodiments, the one or more interactive communication elements comprise a speechless button, wherein the communication module sends information to the emergency management system or emergency dispatch center indicating the user is unable to speak upon user selection of the speechless button. In further embodiments, the one or more interactive communication elements comprises a messaging button, wherein the communication module sends a message entered by a user to the emergency management system or emergency dispatch center upon user selection of the messaging button. In further embodiments, the one or more interactive communication elements comprises a recording button for capturing and sending a photo or video to the emergency management system or emergency dispatch center upon user selection of the recording button. In further embodiments, the one or more interactive communication elements comprises a speakerphone button for hands-free communication with the emergency management system or emergency dispatch center upon user selection of the speakerphone button. In some embodiments, the one or more physical interactive elements comprise one or more hard buttons. In further embodiments, the one or more hard buttons is selected from the group consisting of: power button, volume button, home button, navigation button, keyboard button, return button, multitasking button, camera button, or any combination thereof. In further embodiments, the one or more hard buttons comprise a sensor. In yet further embodiments, the sensor is a fingerprint scanner. In some embodiments, the non-physical interactive elements comprise one or more soft buttons. In further embodiments, the one or more soft buttons comprises a persistent emergency button. In some embodiments, the user interaction indicative of an emergency is a one-touch interaction. In further embodiments, the one-touch interaction comprises a user interaction with a soft button indicative of an emergency. In yet further embodiments, the one-touch interaction comprises a user interaction with a persistent emergency button. In further embodiments, the one-touch interaction is selected from the group consisting of: voice command, gesture, or photo or video capture with a camera. In yet further embodiments, the gesture is selected from the group consisting of: touch, tap, press, squeeze, or swipe. In further embodiments, the one-touch interaction comprises an extended interaction, wherein the user maintains contact with the user interface for at least 2 seconds. In yet further embodiments, the extended interaction provides user authentication. In some embodiments, the one or more user interactions indicative of an emergency comprise a dual touch interaction. In further embodiments, the dual touch interaction provides user authentication. In some embodiments, the emergency data comprises user authentication information. In some embodiments, the emergency data comprises real-time user information. In further embodiments, the real-time user information is selected from the group consisting of: location, emergency, speed, direction, physiological data, or a combination thereof. In yet further embodiments, the physiological data is obtained from one or more sensors in proximity to the user. In some embodiments, the data comprises historical user information. In further embodiments, the historical user information is selected from the group consisting of: location, past emergencies, physiological data, or a combination thereof. In yet further embodiments, the device periodically stores location information obtained from the location component to generate historical location information. In yet further embodiments, the historical user information comprises predefined information provided by a user. In still yet further embodiments, the predefined user information is selected from name, sex, gender, age, one or more pre-existing medical conditions, contact information, one or more emergency contacts, one or more disabilities, height, weight, biometric information, one or more preset locations the user frequents, or any combination thereof. In some embodiments, the emergency request is sent using Voice over Internet Protocol (VoIP). In some embodiments, the device is a communication device. In some embodiments, the device is a mobile wireless device. In some embodiments, the device is a tablet. In some embodiments, the device is a computer. In some embodiments, the device is a wearable device. In some embodiments, the communication module stores the emergency data and repeats attempting to establish a communication link when the request for emergency assistance fails to reach the emergency management system or emergency dispatch center.

In another aspect, provided herein is non-transitory computer-readable storage media encoded with a computer program including instructions executable by at least one processor to create an application for sending an emergency alert, the application comprising: (a) an interface module receiving from the user interface or display one or more user interactions indicative of an emergency; (b) a communication module establishing a communication link with an emergency management system or an emergency dispatch center after the interface module receives the one or more user interactions indicative of an emergency, wherein establishing the communication link comprises sending an emergency alert comprising a request for emergency assistance and emergency data comprising location information; (c) an authentication module providing user authentication, wherein user authentication is required before the communication link is established; and (d) at least two device modes comprising: (i) an active mode characterized by the display being powered on and presenting one or more interactive elements, wherein the one or more user interactions indicative of an emergency comprises interacting with one or more non-physical interactive elements on the display; and (ii) an inactive mode characterized by the display being powered off and presenting no interactive elements, wherein the one or more user interactions indicative of an emergency comprises interacting with one or more physical interactive elements on the device. In some embodiments, the authentication module provides user authentication by receiving user input authenticating user identity. In further embodiments, the user input is selected from the group consisting of: name, birth date, social security number, driver license number, home address, email address, phone number, credit card information, bank account information, biometrics, fingerprint, or any combination thereof. In some embodiments, the authentication module evaluates whether authentication is required. In some embodiments, the authentication module does not require authentication if the risk of inadvertent emergency calls is low. In some embodiments, the authentication module does not require authentication if the emergency management system or emergency dispatch center does not require authentication. In some embodiments, a user optionally disables the authentication requirement. In some embodiments, a delay timer is initiated after the interface module receives one or more user interactions indicative of an emergency, wherein the communication module sends the emergency alert when the delay timer counts down to zero. In further embodiments, the display presents the delay timer as a countdown during which a user can cancel the communication link before the countdown finishes. In further embodiments, the time delay is about 10 seconds. In some embodiments, the interface module receives one or more user interactions indicative of an emergency comprising audio input or commands from a microphone. In some embodiments, the interface module receives one or more user interactions indicative of an emergency comprising photo or video input from a camera. In some embodiments, the authentication module requires one or more user interactions providing user authentication after the interface module receives one or more user interactions indicative of an emergency. In further embodiments, the one or more user interactions providing user authentication is selected from the group consisting of: touch, tap, press, squeeze, swipe, voice, gesture, capturing a photo or video with a camera, or any combination thereof. In some embodiments, the one or more user interactions indicative of an emergency comprises a live video or photo captured by a camera. In further embodiments, the authentication module analyzes the video or photo to provide user authentication through face recognition, body recognition, audio recognition, or a combination thereof. In some embodiments, the one or more user interactions indicative of an emergency is predefined by a user. In some embodiments, the user selects one or more user interactions from a list of user interactions to be recognized by the interface module as being indicative of an emergency. In some embodiments, the user customizes one or more user interactions to be recognized by the interface module as being indicative of an emergency. In some embodiments, the one or more user interactions indicative of an emergency provides user authentication. In some embodiments, the one or more user interactions indicative of an emergency is selected from the group consisting of: touch, tap, press, squeeze, swipe, voice, gesture, capturing a photo or video with a camera, or any combination thereof. In some embodiments, the one or more user interactions indicative of an emergency comprises interacting with one or more hard buttons on the device. In further embodiments, the one or more hard buttons provide biometric authentication. In further embodiments, the one or more hard buttons comprise a fingerprint reader providing fingerprint authentication when the user interacts with the one or more hard buttons. In some embodiments, the one or more user interactions indicative of an emergency comprises interacting with one or more hard buttons on the device in a specific sequence. In some embodiments, the one or more user interactions indicative of an emergency comprise one or more voice commands. In further embodiments, the authentication module provides user authentication using voice recognition of the one or more voice commands. In some embodiments, the display comprises a touchscreen. In some embodiments, the application switches from inactive mode to active mode when the interface module receives one or more user interactions indicative of an emergency. In some embodiments, the active mode is characterized by the display presenting without interruption a persistent emergency button throughout the duration of the active mode, said persistent emergency button comprising at least one non-physical interactive element indicative of an emergency. In further embodiments, the interface module receives one or more interactions indicative of an emergency when the persistent emergency button is selected. In further embodiments, the persistent emergency button is responsive to user interaction when the device is locked. In further embodiments, the persistent emergency button is responsive to user interaction when the device is in a non-communicative state. In further embodiments, the persistent emergency button is responsive to user interaction when the device is engaged with other functions. In yet further embodiments, the other functions are selected from the group consisting of: phone call, messaging, social media, map or navigation, video chat, VoIP, web browsing, podcast, gaming, watching videos, mobile application, or any combination thereof. In further embodiments, the persistent emergency button is user adjustable. In yet further embodiments, a transparency or opaqueness of the emergency button is user adjustable. In yet further embodiments, a position of the emergency button on the display is user adjustable. In some embodiments, the display of the device in active mode presents interactive elements depicted as a grid of buttons, each interactive element corresponding to a different emergency indication. In further embodiments, the emergency indications are medical, police, fire, and car crash, wherein each interactive element comprises a minimalist graphic depicting the corresponding emergency indication. In some embodiments, the one or more user interactions indicative of an emergency for the device in active mode further comprises interacting with one or more physical interactive elements on the device. In further embodiments, the application further comprises an emergency mode characterized by an established communication link with an emergency management system or emergency dispatch center, wherein the display presents one or more interactive communication elements available for user selection to communicate with the emergency management system or emergency dispatch center. In further embodiments, the one or more interactive communication elements comprise a speechless button, wherein the communication module sends information to the emergency management system or emergency dispatch center indicating the user is unable to speak upon user selection of the speechless button. In further embodiments, the one or more interactive communication elements comprises a messaging button, wherein the communication module sends a message entered by a user to the emergency management system or emergency dispatch center upon user selection of the messaging button. In further embodiments, the one or more interactive communication elements comprises a recording button for capturing and sending a photo or video to the emergency management system or emergency dispatch center upon user selection of the recording button. In further embodiments, the one or more interactive communication elements comprises a speakerphone button for hands-free communication with the emergency management system or emergency dispatch center upon user selection of the speakerphone button. In some embodiments, the one or more physical interactive elements comprise one or more hard buttons. In further embodiments, the one or more hard buttons is selected from the group consisting of: power button, volume button, home button, navigation button, keyboard button, return button, multitasking button, camera button, or any combination thereof. In further embodiments, the one or more hard buttons comprise a sensor. In yet further embodiments, the sensor is a fingerprint scanner. In some embodiments, the non-physical interactive elements comprise one or more soft buttons. In further embodiments, the one or more soft buttons comprises a persistent emergency button. In some embodiments, the user interaction indicative of an emergency is a one-touch interaction. In further embodiments, the one-touch interaction comprises a user interaction with a soft button indicative of an emergency. In yet further embodiments, the one-touch interaction comprises a user interaction with a persistent emergency button. In further embodiments, the one-touch interaction is selected from the group consisting of: voice command, gesture, or photo or video capture with a camera. In yet further embodiments, the gesture is selected from the group consisting of: touch, tap, press, squeeze, or swipe. In further embodiments, the one-touch interaction comprises an extended interaction, wherein the user maintains contact with the user interface for at least 2 seconds. In yet further embodiments, the extended interaction provides user authentication. In some embodiments, the one or more user interactions indicative of an emergency comprise a dual touch interaction. In further embodiments, the dual touch interaction provides user authentication. In some embodiments, the emergency data comprises user authentication information. In some embodiments, the emergency data comprises real-time user information. In further embodiments, the real-time user information is selected from the group consisting of: location, emergency, speed, direction, physiological data, or a combination thereof. In yet further embodiments, the physiological data is obtained from one or more sensors in proximity to the user. In some embodiments, the data comprises historical user information. In further embodiments, the historical user information is selected from the group consisting of: location, past emergencies, physiological data, or a combination thereof. In yet further embodiments, the application periodically stores location information obtained from the location component to generate historical location information. In yet further embodiments, the historical user information comprises predefined information provided by a user. In still yet further embodiments, the predefined user information is selected from name, sex, gender, age, one or more pre-existing medical conditions, contact information, one or more emergency contacts, one or more disabilities, height, weight, biometric information, one or more preset locations the user frequents, or any combination thereof. In some embodiments, the emergency request is sent using Voice over Internet Protocol (VoIP). In some embodiments, the application is run on a communication device. In some embodiments, the application is run on a mobile wireless device. In some embodiments, the application is run on a tablet. In some embodiments, the application is run on a computer. In some embodiments, the application is run on a wearable device. In some embodiments, the communication module stores the emergency data and repeats attempting to establish a communication link when the request for emergency assistance fails to reach the emergency management system or emergency dispatch center.

In another aspect, provided herein is a method of sending an emergency alert using a communication device comprising at least one processor, a memory, a network component, a location component, a user interface, a display, and instructions executable by the at least one processor to create an application for sending an emergency alert, the method comprising: (a) providing, by the device, an interface module receiving one or more user interactions indicative of an emergency from the user interface, display, microphone, or camera; (b) establishing, by the device, a communication module establishing a communication link with an emergency management system or an emergency dispatch center after the interface module receives the one or more user interactions indicative of an emergency, wherein establishing the communication link comprises sending an emergency alert comprising a request for emergency assistance and emergency data comprising location information; (c) providing, by the device, an authentication module providing user authentication, wherein user authentication is required before a communication link is established; and (d) providing, by the device, at least two device modes comprising: (i) an active mode characterized by the display being powered on and presenting one or more interactive elements, wherein the one or more user interactions indicative of an emergency comprises interacting with one or more interactive elements on the display; and (ii) an inactive mode characterized by the display being powered off and presenting no interactive elements, wherein the one or more user interactions indicative of an emergency comprises interacting with one or more hard buttons on the device. In some embodiments, the authentication module provides user authentication by receiving user input authenticating user identity. In further embodiments, the user input is selected from the group consisting of: name, birth date, social security number, driver license number, home address, email address, phone number, credit card information, bank account information, biometrics, fingerprint, or any combination thereof. In some embodiments, the authentication module evaluates whether authentication is required. In some embodiments, the authentication module does not require authentication if the risk of inadvertent emergency calls is low. In some embodiments, the authentication module does not require authentication if the emergency management system or emergency dispatch center does not require authentication. In some embodiments, a user optionally disables the authentication requirement. In some embodiments, a delay timer is initiated after the interface module receives one or more user interactions indicative of an emergency, wherein the communication module sends the emergency alert when the delay timer counts down to zero. In further embodiments, the display presents the delay timer as a countdown during which a user can cancel the communication link before the countdown finishes. In further embodiments, the time delay is about 10 seconds. In some embodiments, the method further comprises receiving, by the device, audio input or commands from a user via a microphone. In some embodiments, the method further comprises receiving, by the device, photo or video input from a user via a camera. In some embodiments, the authentication module requires one or more user interactions providing user authentication after the interface module receives one or more user interactions indicative of an emergency. In further embodiments, the one or more user interactions providing user authentication is selected from the group consisting of: touch, tap, press, squeeze, swipe, voice, gesture, capturing a photo or video with a camera, or any combination thereof. In some embodiments, the one or more user interactions indicative of an emergency comprises a live video or photo captured by a camera. In further embodiments, the authentication module analyzes the video or photo to provide user authentication through face recognition, body recognition, audio recognition, or a combination thereof. In some embodiments, the one or more user interactions indicative of an emergency is predefined by a user. In some embodiments, the user selects one or more user interactions from a list of user interactions to be recognized by the interface module as being indicative of an emergency. In some embodiments, the user customizes one or more user interactions to be recognized by the interface module as being indicative of an emergency. In some embodiments, the one or more user interactions indicative of an emergency provides user authentication. In some embodiments, the one or more user interactions indicative of an emergency is selected from the group consisting of: touch, tap, press, squeeze, swipe, voice, gesture, capturing a photo or video with a camera, or any combination thereof. In some embodiments, the one or more user interactions indicative of an emergency comprises interacting with one or more hard buttons on the device. In further embodiments, the one or more hard buttons provide biometric authentication. In further embodiments, the one or more hard buttons comprise a fingerprint reader providing fingerprint authentication when the user interacts with the one or more hard buttons. In some embodiments, the one or more user interactions indicative of an emergency comprises interacting with one or more hard buttons on the device in a specific sequence. In some embodiments, the one or more user interactions indicative of an emergency comprise one or more voice commands. In further embodiments, the authentication module provides user authentication using voice recognition of the one or more voice commands. In some embodiments, the display comprises a touchscreen. In some embodiments, the device switches from inactive mode to active mode when the interface module receives one or more user interactions indicative of an emergency. In some embodiments, the active mode is characterized by the display presenting without interruption a persistent emergency button throughout the duration of the active mode, said persistent emergency button comprising at least one non-physical interactive element indicative of an emergency. In further embodiments, the interface module receives one or more interactions indicative of an emergency when the persistent emergency button is selected. In further embodiments, the persistent emergency button is responsive to user interaction when the device is locked. In further embodiments, the persistent emergency button is responsive to user interaction when the device is in a non-communicative state. In further embodiments, the persistent emergency button is responsive to user interaction when the device is engaged with other functions. In yet further embodiments, the other functions are selected from the group consisting of: phone call, messaging, social media, map or navigation, video chat, VOID, web browsing, podcast, gaming, watching videos, mobile application, or any combination thereof. In further embodiments, the persistent emergency button is user adjustable. In yet further embodiments, a transparency or opaqueness of the emergency button is user adjustable. In yet further embodiments, a position of the emergency button on the display is user adjustable. In some embodiments, the display of the device in active mode presents interactive elements depicted as a grid of buttons, each interactive element corresponding to a different emergency indication. In further embodiments, the emergency indications are medical, police, fire, and car crash, wherein each interactive element comprises a minimalist graphic depicting the corresponding emergency indication. In some embodiments, the one or more user interactions indicative of an emergency for the device in active mode further comprises interacting with one or more physical interactive elements on the device. In further embodiments, the method further comprises providing, by the device, an emergency mode characterized by an established communication link with an emergency management system or emergency dispatch center, wherein the display presents one or more interactive communication elements available for user selection to communicate with the emergency management system or emergency dispatch center. In further embodiments, the one or more interactive communication elements comprise a speechless button, wherein the communication module sends information to the emergency management system or emergency dispatch center indicating the user is unable to speak upon user selection of the speechless button. In further embodiments, the one or more interactive communication elements comprises a messaging button, wherein the communication module sends a message entered by a user to the emergency management system or emergency dispatch center upon user selection of the messaging button. In further embodiments, the one or more interactive communication elements comprises a recording button for capturing and sending a photo or video to the emergency management system or emergency dispatch center upon user selection of the recording button. In further embodiments, the one or more interactive communication elements comprises a speakerphone button for hands-free communication with the emergency management system or emergency dispatch center upon user selection of the speakerphone button. In some embodiments, the one or more physical interactive elements comprise one or more hard buttons. In further embodiments, the one or more hard buttons is selected from the group consisting of: power button, volume button, home button, navigation button, keyboard button, return button, multitasking button, camera button, or any combination thereof. In further embodiments, the one or more hard buttons comprise a sensor. In yet further embodiments, the sensor is a fingerprint scanner. In some embodiments, the non-physical interactive elements comprise one or more soft buttons. In further embodiments, the one or more soft buttons comprises a persistent emergency button. In some embodiments, the user interaction indicative of an emergency is a one-touch interaction. In further embodiments, the one-touch interaction comprises a user interaction with a soft button indicative of an emergency. In yet further embodiments, the one-touch interaction comprises a user interaction with a persistent emergency button. In further embodiments, the one-touch interaction is selected from the group consisting of: voice command, gesture, or photo or video capture with a camera. In yet further embodiments, the gesture is selected from the group consisting of: touch, tap, press, squeeze, or swipe. In further embodiments, the one-touch interaction comprises an extended interaction, wherein the user maintains contact with the user interface for at least 2 seconds. In yet further embodiments, the extended interaction provides user authentication. In some embodiments, the one or more user interactions indicative of an emergency comprise a dual touch interaction. In further embodiments, the dual touch interaction provides user authentication. In some embodiments, the emergency data comprises user authentication information. In some embodiments, the emergency data comprises real-time user information. In further embodiments, the real-time user information is selected from the group consisting of: location, emergency, speed, direction, physiological data, or a combination thereof. In yet further embodiments, the physiological data is obtained from one or more sensors in proximity to the user. In some embodiments, the data comprises historical user information. In further embodiments, the historical user information is selected from the group consisting of: location, past emergencies, physiological data, or a combination thereof. In yet further embodiments, the device periodically stores location information obtained from the location component to generate historical location information. In yet further embodiments, the historical user information comprises predefined information provided by a user. In still yet further embodiments, the predefined user information is selected from name, sex, gender, age, one or more pre-existing medical conditions, contact information, one or more emergency contacts, one or more disabilities, height, weight, biometric information, one or more preset locations the user frequents, or any combination thereof. In some embodiments, the emergency request is sent using Voice over Internet Protocol (VoIP). In some embodiments, the device is a communication device. In some embodiments, the device is a mobile wireless device. In some embodiments, the device is a tablet. In some embodiments, the device is a computer. In some embodiments, the device is a wearable device. In some embodiments, the communication module stores the emergency data and repeats attempting to establish a communication link when the request for emergency assistance fails to reach the emergency management system or emergency dispatch center.

In another aspect, provided herein is a method of requesting emergency assistance by sending an emergency alert using a communication device, the method comprising: (a) providing, by the device, user authentication through pre-registration and SMS verification; (b) receiving, by the device, a one touch user interaction indicative of an emergency; (c) initiating, by the device, a countdown for sending an emergency request to an emergency management system or emergency dispatch center, wherein the display presents the countdown, a confirm emergency button for sending the emergency request immediately, and an cancel emergency button for cancelling the emergency request and countdown; (d) restarting, by the device, the countdown when a user interaction is detected before the countdown reaches 0; and (e) sending, by the device, the emergency request when the countdown reaches 0 or upon receiving a user interaction with the confirm emergency button.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
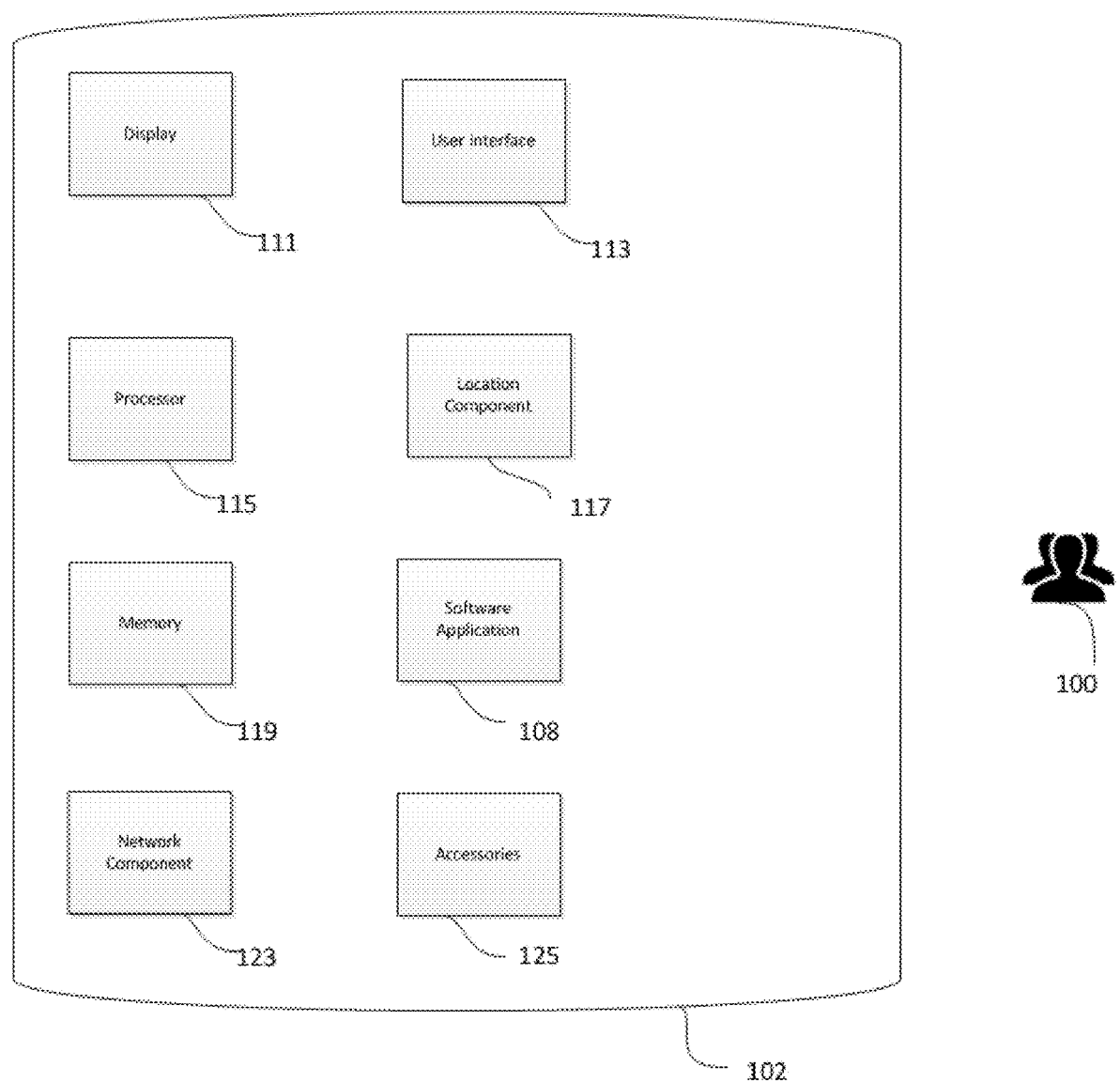
FIG. 1A is a schematic diagram of one embodiment of a device for emergency calling.

Historically, a user has not been able to place a call for requesting an emergency response from an emergency dispatch center (EDC) such as a public safety access point (PSAP) using a fast and simple process on a communication device that is accessible regardless of the state of the device. A number of personal communication devices are enabled with software applications to call for emergency assistance over data communication channels, such as the Internet. However these software applications require an excessive sequence of interactions for the user to send an emergency assistance request. Such software applications may also require a user to input a response to a query on the device and to wait for the device to respond or act upon that input to continue the process of placing a call for emergency assistance. The sequence of interactions required to initiate a call for emergency assistance can lead to undesirable delay or even failure to initiate the call. For example, the device may become unresponsive during the performance of the series of interactions because the user is unable to provide information requested by the device (e.g., user panics and forgets password, causing the device to be locked after repeatedly entering an incorrect password).

Moreover, a user wishing to place a call requesting an emergency response may find the process overly complicated if using a communication device in a certain state, such as when the device is locked, the display screen is off, certain applications are open, or some other device state when the Home Screen is not showing. For example, if the device is a smart phone with a touchscreen display that is turned off, the user may have to first press a button to turn on the touchscreen. The user may then need to press the home button or swipe in order to reach the unlock screen. Here, the user then has to enter a 4 or 6-digit number combination in order to unlock the device. Next, the user may need to press a call or phone button on the touchscreen display to bring up a dial screen, dial the digits 9-1-1, and then press the call or phone button again to initiate the call. This particular process requires a precise sequence of at least 11 user interactions, which can be an onerous burden for a user in the midst of an emergency situation.

Furthermore, an emergency call made in this manner has various disadvantages including a lack of accurate location information and an inability for the user to provide additional details and authorization mechanisms. An emergency dispatch center ("EDC") that receives an emergency call may have difficulty receiving adequate location information from mobile/wireless communication devices. The EDC personnel may also be limited to speaking with the user making the call in order to obtain relevant details of the emergency. In addition, the designated emergency number may vary between different countries, and the user will have to be aware of the correct number in order to make an emergency call. For example, the designated emergency number in the United Kingdom is 1-1-2 when dialing from a mobile phone.

The devices, systems, methods, and media described herein enable users to utilize communication devices to place emergency calls or requests in a fast and simple manner regardless of the state of the communication device.

In some embodiments, described herein are devices comprising at least one processor, a memory, a network component, a location component, a user interface, a display, and instructions executable by the at least one processor to create an application for sending an emergency alert comprising: (a) an interface module receiving from the user interface one or more user interactions indicative of an emergency; (b) a communication module establishing a communication link with an emergency management system or an emergency dispatch center after the interface module receives the one or more user interactions indicative of an emergency, wherein establishing the communication link comprises sending an emergency alert comprising a request for emergency assistance and emergency data comprising location information; (c) an authentication module providing user authentication, wherein user authentication is required before sending the emergency alert; and (d) at least two device modes comprising: (i) an active mode characterized by the display being powered on and presenting one or more non-physical interactive elements, wherein the one or more user interactions indicative of an emergency comprises interacting with one or more non-physical interactive elements on the display; and (ii) an inactive mode characterized by the display being powered off and presenting no interactive elements, wherein the one or more user interactions indicative of an emergency comprises interacting with one or more physical interactive elements on the device.

In some embodiments, described herein are systems for sending an emergency alert comprising: a device comprising at least one processor, a memory, a network component, a location component, a user interface, a display, and instructions executable by the at least one processor to create an application for sending an emergency alert comprising: (a) an interface module receiving from the user interface one or more user interactions indicative of an emergency; (b) a communication module establishing a communication link with an emergency management system or an emergency dispatch center after the interface module receives the one or more user interactions indicative of an emergency, wherein establishing the communication link comprises sending an emergency alert comprising a request for emergency assistance and emergency data comprising location information; (c) an authentication module providing user authentication, wherein user authentication is required before sending the emergency alert; and (d) at least two device modes comprising: (i) an active mode characterized by the display being powered on and presenting one or more non-physical interactive elements, wherein the one or more user interactions indicative of an emergency comprises interacting with one or more non-physical interactive elements on the display; and (ii) an inactive mode characterized by the display being powered off and presenting no interactive elements, wherein the one or more user interactions indicative of an emergency comprises interacting with one or more physical interactive elements on the device.

In some embodiments, described herein are non-transitory computer-readable storage media encoded with a computer program including instructions executable by at least one processor to create an application for sending an emergency alert, the application comprising: (a) an interface module receiving from the user interface or display one or more user interactions indicative of an emergency; (b) a communication module establishing a communication link with an emergency management system or an emergency dispatch center after the interface module receives the one or more user interactions indicative of an emergency, wherein establishing the communication link comprises sending an emergency alert comprising a request for emergency assistance and emergency data comprising location information; (c) an authentication module providing user authentication, wherein user authentication is required before the communication link is established; and (d) at least two device modes comprising: (i) an active mode characterized by the display being powered on and presenting one or more interactive elements, wherein the one or more user interactions indicative of an emergency comprises interacting with one or more non-physical interactive elements on the display; and (ii) an inactive mode characterized by the display being powered off and presenting no interactive elements, wherein the one or more user interactions indicative of an emergency comprises interacting with one or more physical interactive elements on the device.

In some embodiments, described herein are methods of sending an emergency alert using a communication device comprising at least one processor, a memory, a network component, a location component, a user interface, a display, and instructions executable by the at least one processor to create an application for sending an emergency alert, the method comprising: (a) providing, by the device, an interface module receiving one or more user interactions indicative of an emergency from the user interface, display, microphone, or camera; (b) establishing, by the device, a communication module establishing a communication link with an emergency management system or an emergency dispatch center after the interface module receives the one or more user interactions indicative of an emergency, wherein establishing the communication link comprises sending an emergency alert comprising a request for emergency assistance and emergency data comprising location information; (c) providing, by the device, an authentication module providing user authentication, wherein user authentication is required before a communication link is established; and (d) providing, by the device, at least two device modes comprising: (i) an active mode characterized by the display being powered on and presenting one or more interactive elements, wherein the one or more user interactions indicative of an emergency comprises interacting with one or more interactive elements on the display; and (ii) an inactive mode characterized by the display being powered off and presenting no interactive elements, wherein the one or more user interactions indicative of an emergency comprises interacting with one or more hard buttons on the device.

In some embodiments, described herein are methods of requesting emergency assistance by sending an emergency alert using a communication device, the method comprising: (a) providing, by the device, user authentication through pre-registration and SMS verification; (b) receiving, by the device, a one touch user interaction indicative of an emergency; (c) initiating, by the device, a countdown for sending an emergency request to an emergency management system or emergency dispatch center, wherein the display presents the countdown, a confirm emergency button for sending the emergency request immediately, and an cancel emergency button for cancelling the emergency request and countdown; (d) restarting, by the device, the countdown when a user interaction is detected before the countdown reaches 0; and (e) sending, by the device, the emergency request when the countdown reaches 0 or upon receiving a user interaction with the confirm emergency button.

In some embodiments, described herein is a method of facilitating communication between a user of a communication device, for example, a wireless communication device or a smart phone, and an EMS or EDC wherein the communication is initiated by limited number of interactions (such as one, dual, triple, etc.) between the user and the communication device. In some embodiments, the method comprises configuring the communication device to recognize one or more user interactions, for example, touch, swipe, voice, tap or other forms of user interactions, as an initiation of a request for emergency assistance from a user of the communication device. In some embodiments, the user interaction is a one touch interaction from the user that causes the communication device to initiate a call requesting emergency assistance. In other embodiments, the user interaction is a sequence of two (dual touch) user interactions. In some embodiments, the communication device uses either a first or a second user interaction to authenticate or verify the identity of the user of the communication device. In some embodiments, the communication device sends a request for emergency assistance to an EMS or EDC after user authentication. In some embodiments, the request comprises information or data about the user (e.g., user name, health records, emergency contact information, family information, or a combination thereof) that are relevant to emergency response personnel in providing emergency assistance to the user.

In some embodiments, the interaction between the user and the communication device includes the user interacting with a touch screen of the communication device capable of displaying soft buttons to the user. In some embodiments, the communication device is able to recognize which soft button the user has selected based on one or more forms of user interaction (e.g., interaction via touch, tap, swipe, voice, gesture, face recognition, body recognition or other forms of user-device interaction). In some embodiments, based on this interaction, the device and/or the software application for emergency calling determines if a request for emergency assistance should be placed to the EDC. If so, the device places a call for emergency assistance. In some embodiments, the communication device utilizes one or more of voice recognition, gesture recognition, face recognition, body recognition or other forms of user-device interaction to identify or verify the identity of the user of the communication device and include metadata related to the user in the call for emergency assistance.

In some embodiments the interaction between the user and the communication device includes interacting with one or more hard buttons of the communication device, (e.g., a power button, a volume control button, etc.). In some embodiments, the communication device is configured to recognize a particular sequence and/or pattern of presses of the one or more hard buttons as a command to the communication device to send an emergency alert to an EDC on behalf of the user.

In some embodiments, the interaction between the user and the communication device authenticates the user of the communication device, following which an emergency alert is sent from the communication device to an EMS or EDC. In some embodiments, the interaction between the user and the communication device is used to send an emergency alert from the communication device to and EDC without authentication of the request or the identity of the user.

Certain Terminologies

As described herein, a "device" is a digital processing device. In some embodiments, a device is a piece of electronic equipment designed with one or more functionalities. In some embodiments, a "communication device" is any device with a communication component (e.g., network element, network component, or any other network or communication component), which allows it to send and receive information over a wireless channel, a wired channel, or a combination thereof. In some embodiments, a communication device makes an emergency call or request over a communication network such as, for example, a cellular network or the Internet. In some embodiments, a communication device sends and receives information over a cellular network or the Internet. In some embodiments, a communication device is a mobile phone, a smart phone, a laptop, a desktop, or a tablet. In some embodiments, a communication device is a wearable device with a communication component. As used herein, "mobile wireless device" refers to devices that are portable. In some embodiments, a user wears or carries the mobile wireless device on his or her person or in a vehicle. Exemplary mobile wireless devices include mobile or cellular phones, wearable devices, etc.

As described herein, an "emergency alert" refers to contacting an emergency service over one or more communication channels or links regarding an emergency situation. In some embodiments, an emergency alert comprises an "emergency call" in which a user calls an emergency service. In some embodiments, an emergency alert comprises an "emergency request" which a user requests emergency assistance from an emergency service. In some embodiments, the emergency service is an emergency management system ("EMS"). In some embodiments, the emergency service is an emergency dispatch center ("EDC") or public-safety answering point ("PSAP"). In some embodiments, the emergency service is an EMS that acts as an intermediary between the user caller and an EDC or PSAP, whereby the EMS processes an emergency alert received from the user and forwards the request along with relevant information to the appropriate EDC or PSAP. In some embodiments, an "appropriate" EDC or PSAP is one that is located in the same jurisdiction as the location of the user communication device sending the emergency alert.

As described herein, the "state" of a communication device refers to a particular state in various components of the communication device are at different levels of activity. In some embodiments, the device state depends on operating systems, customizations and settings of the device, user preferences, usage behavior, power levels or other factors. In some embodiments, the state of a communication device is determined by pre-installed or user predefined settings of the device for power-saving, security, battery life, cellular signal, satellite signal, etc. For example, in some embodiments, a communication device such as a mobile phone is in a flight state, wherein the communication module has been disabled to prevent communication by the phone. In some embodiments, the device is in a sleep or hibernate state, which are power saving states where various components and applications are disabled or at lower activity levels. In some embodiments, a device is in a locked state that provides a security measure requiring the user to unlock the device (e.g., by entering a number combination) before being able to fully access the device.

As described herein, the device has one or more "modes." An "active mode" refers to when the display is on and presenting one or more interactive elements (e.g., soft buttons). In some embodiments, the display is a touchscreen or a standard display, LCD, LED, etc. As described herein, an "inactive mode" refers to when the communication device is powered on, wherein the display is powered off or showing a blank screen, and presents no interactive elements. In this mode, no interactive elements are visible or available for interaction. As described herein, an "emergency mode" refers to the mode of the device when a user has sent an emergency alert (thus establishing a communication link). In some embodiments, a device is in emergency mode after sending an emergency alert even when the EMS or EDC fails to respond. In some embodiments, a device in emergency mode displays one or more interactive elements for enhanced communication with an emergency management system or emergency dispatch center. In some embodiments, a device in emergency mode displays a message indicating whether the emergency alert was successfully received by an EMS or EDC. In some embodiments, a device in emergency mode periodically re-sends the emergency alert if the previous alert is not successfully received by an EMS or EDC until the user cancels the call or request. In some embodiments, the period the device in emergency mode waits before re-sending the emergency alert is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 seconds or more after the previous alert is not successfully received by an EMS or EDC. As referenced herein, "stealth mode" refers to a mode in which the emergency alert is made without detectable cues, for example, without sound.

As referenced herein, a "physical button" and "hard button" are synonymous and refer to a physical interactive button on a device and not a non-physical or soft interactive element such as a soft button on a display or touchscreen.

As referenced herein, an "Emergency Management System" (EMS) refers to a system that receives and processes emergency alerts from users and forwards them to the appropriate EDC, for example, the EDC for the jurisdiction from which the emergency call or request was made. Various embodiments of the EMS are described in U.S. patent application Ser. No. 14/856,818, and incorporated herein by reference. The "Emergency Dispatch Center" (EDC) refers to the entity that receives the emergency alert and coordinates the emergency assistance. In some embodiments, the EDC is a public organization run by the municipality, county or city or may be a private organization. In some embodiments, emergency assistance is selected from medical, caregivers, firefighting, police, military, paramilitary, border patrol, lifeguard, security services, or any combination thereof. A "public-safety answering point" (PSAP) refers to a call center that answers calls to emergency numbers for police, firefighting, ambulance services, etc.

As used herein, a "user interaction" or "interaction" refers to a user interacting with a device to provide input. In some embodiments, an interaction comprises interacting with a physical or non-physical interactive element on the device. In some embodiments, a physical interactive element is a hard button. In some embodiments, a physical interactive element is a camera, a microphone, a fingerprint reader/scanner, a sensor, or any other device component for receiving user input. In some embodiments, a non-physical interactive element is a soft button on a touchscreen. In some embodiments, an interaction with a physical or non-physical interactive element comprises touching, tapping, swiping, pressing, squeezing, clicking, turning, rotating, spinning, typing, speaking, or gesturing. In some embodiments, an interaction has a prolonged duration, for example, pressing a hard button for 5 seconds. In some embodiments, a user provides more than one interaction by providing two or more consecutive interactions.

Existing filings, for example, U.S. patent application Ser. No. 14/856,818, titled "METHOD AND SYSTEM FOR EMERGENCY CALL MANAGEMENT," filed on Sep. 17, 2015 and incorporated herein by reference, take advantage of Voice over Internet Protocol (VoIP) technology to make emergency calls, including multi-media messaging, from communication devices such as cellular phones to EDCs.

FIG. 1A is a schematic diagram of one embodiment of a device described herein. In some embodiments, the device 102 is an electronic device such as a communication device (e.g., mobile or cellular phone, computer, laptop, etc.). In some embodiments, a communication device is a wearable device. In some embodiments, a communication device is a wireless mobile device or a smart phone. In some embodiments, a user 100 is selected from one or more persons who are the primary users of the device 102.

In some embodiments, the device 102 comprises at least one processor 115, a memory 119 (e.g., an EPROM memory, a RAM, a solid-state memory), a display 111, a user interface 113, a network component 123 (e.g., an antenna and associated components, Wi-Fi adapters, Bluetooth® adapters, etc.) and a software application 108 (e.g., mobile application, server application, computer program, application). In some embodiments, the wearable device is equipped with a location component 117, for example, a global positioning system (GPS).

User Interface

In some embodiments, the device 102 has several components including a display 111 and user interface 113, which allow the user 100 to interact with the device 102. In some embodiments, the display 111 is a part of the user interface 113. In some embodiments, the display 111 and/or the user interface 113 comprises a touch screen (e.g., a capacitive touch screen), which is capable of displaying information and receiving user input. In some embodiments, a touch screen comprises one or more non-physical interactive elements such as, for example, soft buttons. As used herein, a soft button refers to a non-physical, simulated button shown on a display or touch screen. In some embodiments, a soft button is an emergency button, an emergency call button, an emergency selection button, a persistent emergency button, a message button, a text button, a photo button, a video button, a photo/video button, an app button, an emergency app button, or any other soft button. In some embodiments, a user interacts with a non-physical interactive element by touching, tapping, swiping, or pressing the element. In some embodiments, a user interface 113 comprises one or more physical interactive elements. In some embodiments, physical interactive elements comprise physical or hard buttons (not shown). In some embodiments, a hard button is a power button, a volume toggle button, a home button, a back button, menu button, navigation button(s), return button, multi-tasking button, camera button, a button on a physical keyboard, or any other physical button on the device. In some embodiments, physical interactive elements comprises interactive elements such as, for example, a switch or toggle, a wheel, a click wheel (e.g., iPod® click wheel), or any combination thereof. In some embodiments, a user 100 interacts with the user interface 113 by touching, tapping, swiping, or pressing any of the one or more physical buttons located on the device outside of the touchscreen.

In some embodiments, a device 102 includes various accessories 125 that allow additional functionality. In some embodiments, the accessories 125 include one or more of the following: microphone (e.g., for user voice interaction), a camera (e.g., for input of gestures commands or pictures from the user 100), speakers, one or more sensors such as a fingerprint reader or scanner, USB/micro-USB port, headphone jack, a card reader, SIM card slot, and any combination thereof.

Figure 1B:
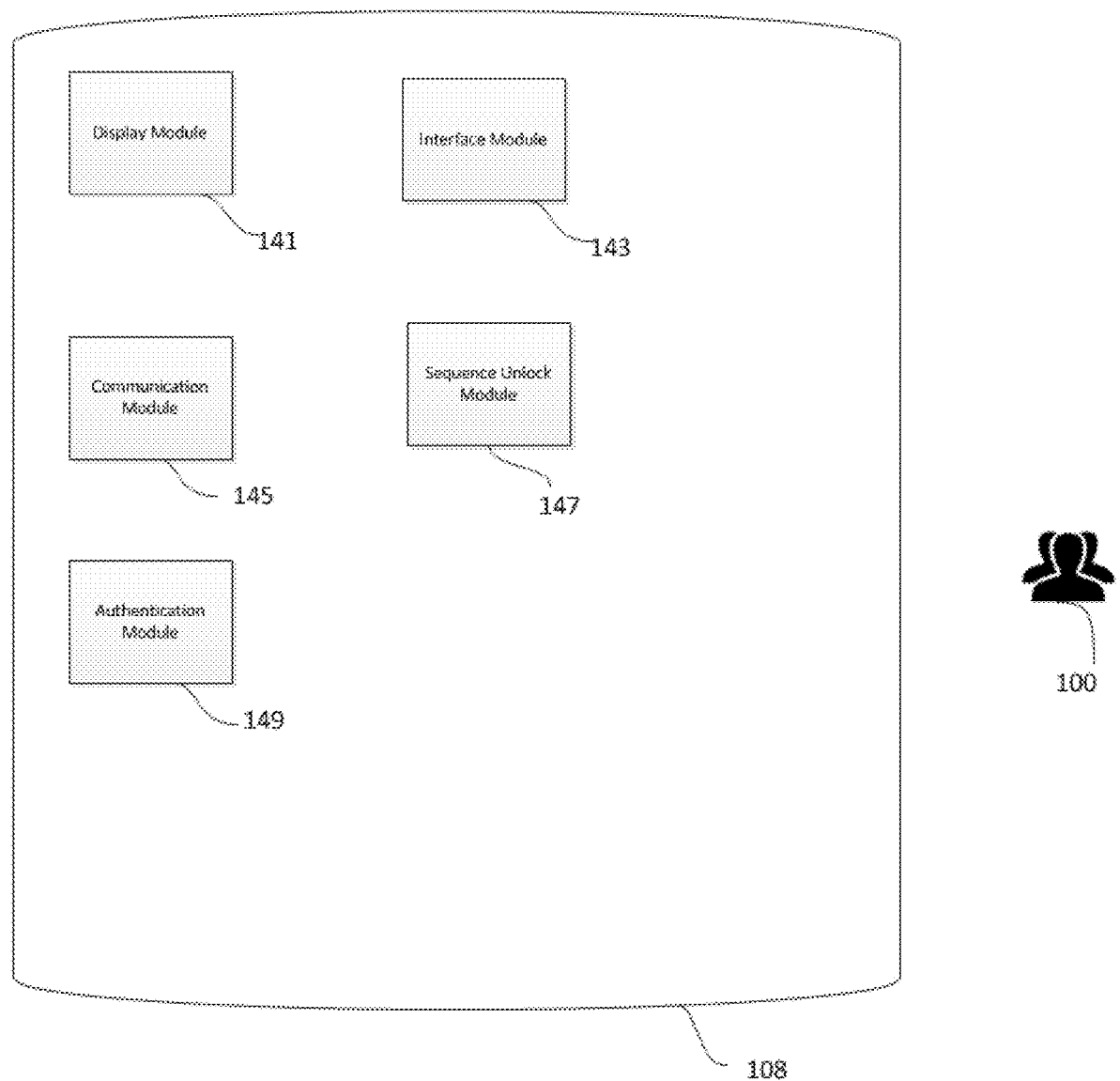
FIG. 1B is a schematic diagram of one embodiment of an application for emergency calling.

FIG. 1B is a schematic diagram of one embodiment of a software application 108 for emergency calling. In some embodiments, the software application 108 comprises one or more software modules such as, for example, a display module 141, an interface module 143, a communication module 145, a sequence unlock module 147, an authentication module 149, or any combination thereof. In some embodiments, the display module 141 displays an interactive graphic user interface on the touchscreen.

In some embodiments, the interface module 143 receives one or more user interactions indicative of an emergency from the user interface 113 via one or more inputs such as, for example, soft-buttons on the touchscreen, hard buttons on the device outside of the touchscreen, commands spoken into a microphone 127, or any combination thereof. In some embodiments, a user 100 interacts with the user interface 113 by providing one or more user interactions indicative of an emergency in order to send a request for an emergency assistance or response. In some embodiments, user interactions include interacting with the user interface 113 by interacting with one or more non-physical interactive elements (e.g., soft buttons on touchscreen), physical interactive elements (e.g., hard buttons on device), or any combination thereof.

In some embodiments, user interactions indicative of an emergency comprises a specific sequence of interactions. In some embodiments, user interactions indicative of an emergency comprise interacting with at least one physical interactive element, followed by interacting with at least one non-physical interactive element. In some embodiments, user interactions indicative of an emergency comprises interacting with at least one non-physical interactive element, followed by interacting with at least one physical interactive element. In some embodiments, user interactions indicative of an emergency comprise an interaction with a non-physical interactive element. In some embodiments, user interactions indicative of an emergency comprises an interaction with a physical interactive element. In some embodiments, user interactions indicative of an emergency comprise a sequence of interactions with a non-physical interactive element. In some embodiments, user interactions indicative of an emergency comprise a sequence of interactions with a physical interactive element. In some embodiments, user interactions indicative of an emergency comprise a sequence of interactions with at least one non-physical interactive element.

In some embodiments, user interactions indicative of an emergency comprise a sequence of interactions with at least 1, 2, 3, 4, 5, 6, 7, 8, 9, or 10 or more non-physical interactive elements. In some embodiments, user interactions indicative of an emergency comprise a sequence of interactions with at least one physical interactive element. In some embodiments, user interactions indicative of an emergency comprise a sequence of interactions with at least 1, 2, 3, 4, 5, 6, 7, 8, 9, or 10 or more physical interactive elements. In some embodiments, user interactions indicative of an emergency comprise a sequence of interactions with at least one non-physical interactive element and at least one physical interactive element. In some embodiments, user interactions indicative of an emergency comprise at least 1, 2, 3, 4, 5, 6, 7, 8, 9, or 10 or more consecutive interactions with a physical interactive element. In some embodiments, user interactions indicative of an emergency comprise pressing a hard button 1, 2, 3, 4, 5, 6, 7, 8, 9, or 10 or more times consecutively. In some embodiments, user interactions indicative of an emergency comprise at least 1, 2, 3, 4, 5, 6, 7, 8, 9, or 10 or more consecutive interactions with at least 1, 2, 3, 4, 5, 6, 7, 8, 9, or 10 or more physical interactive elements. In some embodiments, user interactions indicative of an emergency comprise at least 1, 2, 3, 4, 5, 6, 7, 8, 9, or 10 or more consecutive interactions with at least 1, 2, 3, 4, 5, 6, 7, 8, 9, or 10 or more hard buttons. In some embodiments, user interactions indicative of an emergency comprise at least 1, 2, 3, 4, 5, 6, 7, 8, 9, or 10 or more consecutive interactions with a non-physical interactive element. In some embodiments, user interactions indicative of an emergency comprise pressing a soft button 1, 2, 3, 4, 5, 6, 7, 8, 9, or 10 or more times consecutively. In some embodiments, user interactions indicative of an emergency comprise at least 1, 2, 3, 4, 5, 6, 7, 8, 9, or 10 or more consecutive interactions with at least 1, 2, 3, 4, 5, 6, 7, 8, 9, or 10 or more non-physical interactive elements. In some embodiments, user interactions indicative of an emergency comprise at least 1, 2, 3, 4, 5, 6, 7, 8, 9, or 10 or more consecutive interactions with at least 1, 2, 3, 4, 5, 6, 7, 8, 9, or 10 or more soft buttons. For example, in some embodiments, if at least 3 consecutive interactions with a soft button (e.g., a persistent emergency button) are indicative of an emergency, then a user presses the soft button 3, 4, 5, or more times in order for the interface module 143 to receive (e.g., detect) interactions indicative of an emergency. In some embodiments, separate interactions are consecutive interactions if they are separated by no more than 100, 200, 300, 400, 500, 600, 700, 800, 900, or 1000 milliseconds, including increments therein.

In some embodiments, user interactions indicative of an emergency comprise pressing or touching a hard button continuously for a predefined period of time. In some embodiments, user interactions indicative of an emergency comprise pressing or touching a hard button continuously for about 1, 2, 3, 4, 5, 6, 7, 8, 9, or 10 seconds or more. In some embodiments, user interactions indicative of an emergency comprise pressing or touching a hard button continuously for at least about 1, 2, 3, 4, 5, 6, 7, 8, 9, or about 10 seconds or more. For example, in some embodiments, if pressing a hard button continuously for at least about 3 seconds is indicative of an emergency, then a user presses the hard button continuously for 3, 4, 5 or more seconds in order for the interface module 143 to receive (e.g., detect) user interactions indicative of an emergency. In some embodiments, user interactions indicative of an emergency comprise pressing or touching a hard button continuously for no more than about 1, 2, 3, 4, 5, 6, 7, 8, 9, 10, 11, 12, 13, 14, 15, 16, 17, 18, 19, or about 20 seconds. In some embodiments, user interactions indicative of an emergency comprise pressing or touching a soft button continuously for a predefined period of time. In some embodiments, user interactions indicative of an emergency comprise pressing or touching a soft button continuously for about 1, 2, 3, 4, 5, 6, 7, 8, 9, or about 10 seconds or more. In some embodiments, user interactions indicative of an emergency comprise pressing or touching a soft button continuously for at least about 1, 2, 3, 4, 5, 6, 7, 8, 9, or about 10 seconds or more. In some embodiments, user interactions indicative of an emergency comprise pressing or touching a soft button continuously for no more than about 1, 2, 3, 4, 5, 6, 7, 8, 9, 10, 11, 12, 13, 14, 15, 16, 17, 18, 19, or about 20 seconds.

In some embodiments, a user 100 defines a sequence of interactions indicative of an emergency. In some embodiments, the interface module 143 allows a user to define one or more sequences of interactions indicative of an emergency. For example, in some embodiments, the user 100 defines a sequence of interactions indicative of an emergency, the sequence comprising: holding down the home button continuously for 5 seconds. In some embodiments, the interface module 143 provides a predefined list of sequences of interactions indicative of an emergency. For example, in some embodiments, the interface module 143 provides a predefined sequence of interactions indicative of an emergency, the sequence comprising: pressing the physical home button three times consecutively. In some embodiments, a sequence of interactions indicative of an emergency indicates a specific type of emergency. For example, in some embodiments, a sequence of interactions indicates a fire emergency, a car crash, a police emergency, a medical emergency, or a combination thereof.

In some embodiments, a sequence of interactions indicative of an emergency comprises a combination of interactions using one or more interactive elements. In some embodiments, these sequences of interactions are provided by the device or predefined by a user. In some embodiments, the receipt of these interactions by the interface module 143 causes the device communication module to send an emergency alert or initiate the process for sending an emergency alert. In some embodiments, a sequence of interactions comprises touching a persistent emergency button on the touchscreen. In some embodiments, a sequence of interactions comprises pressing a home button (hard button) and then touching a persistent emergency button (soft button). In some embodiments, sequence of interactions comprises pressing a home button twice, and then pressing an increase volume button twice. In some embodiments, a sequence of interactions comprises pressing a home button twice, and then pressing a decrease volume button twice. In some embodiments, a sequence of interactions comprises pressing a home button continuously for three seconds, and then touching a persistent emergency button. In some embodiments, a sequence of interactions comprises pressing a home button continuously for three seconds, and then giving audio command requesting emergency assistance (via a microphone). In some embodiments, a sequence of interactions comprises pressing a home button continuously for three seconds, and then making a gesture requesting emergency assistance (via a camera). In some embodiments, a sequence of interactions comprises giving an audio command requesting emergency assistance (via microphone), and then pressing a persistent emergency button on the touchscreen. In some embodiments, a sequence of interactions comprises giving an audio command requesting emergency assistance (via a microphone), and then making a gesture requesting emergency assistance (via a camera). In some embodiments, a sequence of interactions comprises touching a persistent emergency button, and then touching a soft button confirming the emergency. In some embodiments, a sequence of interactions comprises touching a persistent emergency button, then touching a soft button indicating the type of emergency.

Authentication

In some embodiments, the authentication module 149 provides user authentication. In some embodiments, authentication is needed to authenticate the identity of the user or person who is providing interactions indicative of an emergency to the communication device in order to minimize the risk of unauthorized or accidental emergency alerts. In some embodiments, the authentication module 149 evaluates or determines whether authentication is required for sending the emergency alert. In some embodiments, the authentication module 149 decides that authentication is not required because the one or more user interactions indicative of an emergency comprise a sequence that is unlikely to occur by accident. For example, in some embodiments, the authentication module determines authentication is not required when the sequence of user interactions indicative of an emergency comprises at least 1, 2, 3, 4, 5, 6, 7, 8, 9, or 10 or more interactions. In some embodiments, the authentication module determines authentication is not required when the sequence of user interactions indicative of an emergency comprises interacting with at least 1, 2, 3, 4, 5, 6, 7, 8, 9, or 10 or more interactive elements. In some embodiments, the interactive elements are physical interactive elements, non-physical interactive elements, or any combination thereof. In some embodiments, authentication is not required if the user provides authentication beforehand. For example, in some embodiments, a user links his fingerprint to his identity, address, and phone number on the communication device, and then provides authentication by scanning his fingerprint on a fingerprint scanner on the device. In some embodiments, the user 100 has predefined a sufficiently secure sequence of user interactions (e.g., triple press on the volume button), such that the risk of accidentally sending an emergency alert, request, or call is reduced or minimized even when authentication is not required. In some embodiments, the user is best positioned to know what sequence of interactions is more likely or less likely to occur by accident with regards to his or her communication device. For example, in some embodiments, a user prefers to keep her communication device in her back pocket and realizes that her preferred means of carrying the device makes it likely the home button will be pressed continuously for a period of time (e.g., the "butt dial"). Keeping this in mind, the user decides to define a sequence of interactions comprising pressing the home button three consecutive times, followed by pressing a persistent emergency button on the touchscreen. The user defines this sequence of interactions as being sufficiently secure such that authentication is not required when the user carries out the sequence of interactions to request emergency assistance. Accordingly, in some embodiments, the user optionally removes or disables the authentication requirement for when the interface module receives a particular sequence of interactions indicative of an emergency. In some embodiments, user interactions indicative of an emergency comprise one or more authenticating interactions. For example, in some embodiments, a sequence of user interactions indicative of an emergency comprises triple pressing (pressing three consecutive times) a home button that comprises a fingerprint scanner (e.g., the home button on an iPhone® 5S). In further embodiments, at least one of the three button presses is sufficient to provide fingerprint authentication of the user.

In some embodiments, if authentication is required before a request for emergency assistance can be sent, the authentication module 149 provides user authentication. In some embodiments, the user 100 interacts with the device 102 to establish that he or she is the person associated with the device and/or he or she is in an emergency situation. In some embodiments, user authentication is provided using a fingerprint reader, voice recognition, image recognition, password, pin, or any combination thereof. In some embodiments, the user interaction providing user authentication is selected from a group consisting of touch, tap, press, squeeze, swipe, voice, gesture, capturing a photo or video with the camera, or any combination thereof.

Establishing Communication Link

In some embodiments, the communication module 145 uses the network component 123 of the device to send or receive communications, such as an emergency alert. In some embodiments, after the interface module 143 receives one or more user interactions or a sequence of user interactions indicative of an emergency, the communication module 145 establishes a communication link with an emergency management service (EMS) or an emergency dispatch center (EDC). In some embodiments, establishing a communication link with an EMS or EDC comprises sending an emergency alert. In some embodiments, an emergency alert comprises a request for emergency assistance (e.g., an emergency request). In some embodiments, an emergency alert comprises emergency data. In some embodiments, emergency data is relevant to the emergency situation. For example, in some embodiments, relevant emergency data comprises location information (e.g., GPS coordinates of the device), the type of emergency (e.g., as indicated by the user via the device), user identity, user information (e.g., user health information if this is a health emergency), or any combination thereof. In some embodiments, emergency data is sent to an EMS or EDC over an established communication link after the initial emergency alert has been sent.

In some embodiments, once a communication link has been established with an EMS or EDC, the device enters emergency mode. In some embodiments, a device in emergency mode is characterized by an established communication link with an emergency management system or emergency dispatch center, wherein the display presents one or more interactive communication elements available for user selection to communicate with the emergency management system or emergency dispatch center. In some embodiments, the one or more interactive communication elements comprises a speechless button, wherein the communication module sends information to the emergency management system or emergency dispatch center indicating the user is unable to speak upon user selection of the speechless button. In some embodiments, the one or more interactive communication elements comprises a messaging button, wherein the communication module sends a message entered by a user to the emergency management system or emergency dispatch center upon user selection of the messaging button. In some embodiments, the one or more interactive communication elements comprises a recording button for capturing and sending a photo or video to the emergency management system or emergency dispatch center upon user selection of the recording button. In some embodiments, the one or more interactive communication elements comprises a speakerphone button for hands-free communication with the emergency management system or emergency dispatch center upon user selection of the speakerphone button.

Emergency Data

In some embodiments, the emergency alert comprises a request for emergency assistance. In some embodiments, the emergency alert further comprises location information. In some embodiments, the location information comprises GPS coordinates provided by the location component 117. In some embodiments, location information comprises coordinates of the cellular tower that transmitted the emergency alert. In some embodiments, location information comprises coordinates of the cellular tower the device sending the emergency alert was last in communication with. In some embodiments, the location information is saved information in the EMS server associated with the user 100.

In some embodiments, emergency data comprises user information selected from the group consisting of location (e.g., home or office address), emergency type (e.g., medical emergency, fire emergency, car crash emergency, or police emergency), speed and/or direction of the device 102, health data of the user 100 (e.g., medical conditions and prescriptions), sensor data (e.g., physiological information provided by a wearable device for monitoring health) or any combination thereof. In some embodiments, physiological information comprises heart rate or pulse, blood pressure, body temperature, hydration, blood cholesterol, blood glucose, other physiological characteristics, or any combination thereof. In some embodiments, emergency data comprises historical user information. In some embodiments, historical user information is selected from location, previous emergencies, physiological data, or any combination thereof. In some embodiments, emergency data comprises current user information selected from current location, current emergency type, current physiological data, or any combination thereof. In some embodiments, current user information comprises user information that is no more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60 minutes old. In some embodiments, current user information comprises information that is no more than 1, 2, 3, 4, 5, 6, 7, 8, 9, 10, 11, 12, 13, 14, 15, 16, 17, 18, 19, 20, 21, 22, 23, or 24 hours old. In some embodiments, current user information comprises information that is no more than 1, 2, 3, 4, 5, 6, 7, 8, 9, or 10 days old. In some embodiments, historical user information comprises information that is more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60 minutes old. In some embodiments, historical user information comprises information that is more than 1, 2, 3, 4, 5, 6, 7, 8, 9, 10, 11, 12, 13, 14, 15, 16, 17, 18, 19, 20, 21, 22, 23, or 24 hours old. In some embodiments, historical user information comprises information that is more than 1, 2, 3, 4, 5, 6, 7, 8, 9, or 10 days old. For example, in some embodiments, a sensor reading from a wearable device indicating a pulse rate of 60 beats per minute for the user is current when it is collected. However, in some embodiments, if historical data is predefined as data that is more than 5 minutes old, then the sensor reading of 60 beats per minute will be categorized as historical data after 5 minutes have passed since the sensor reading was obtained.

Figure 2:
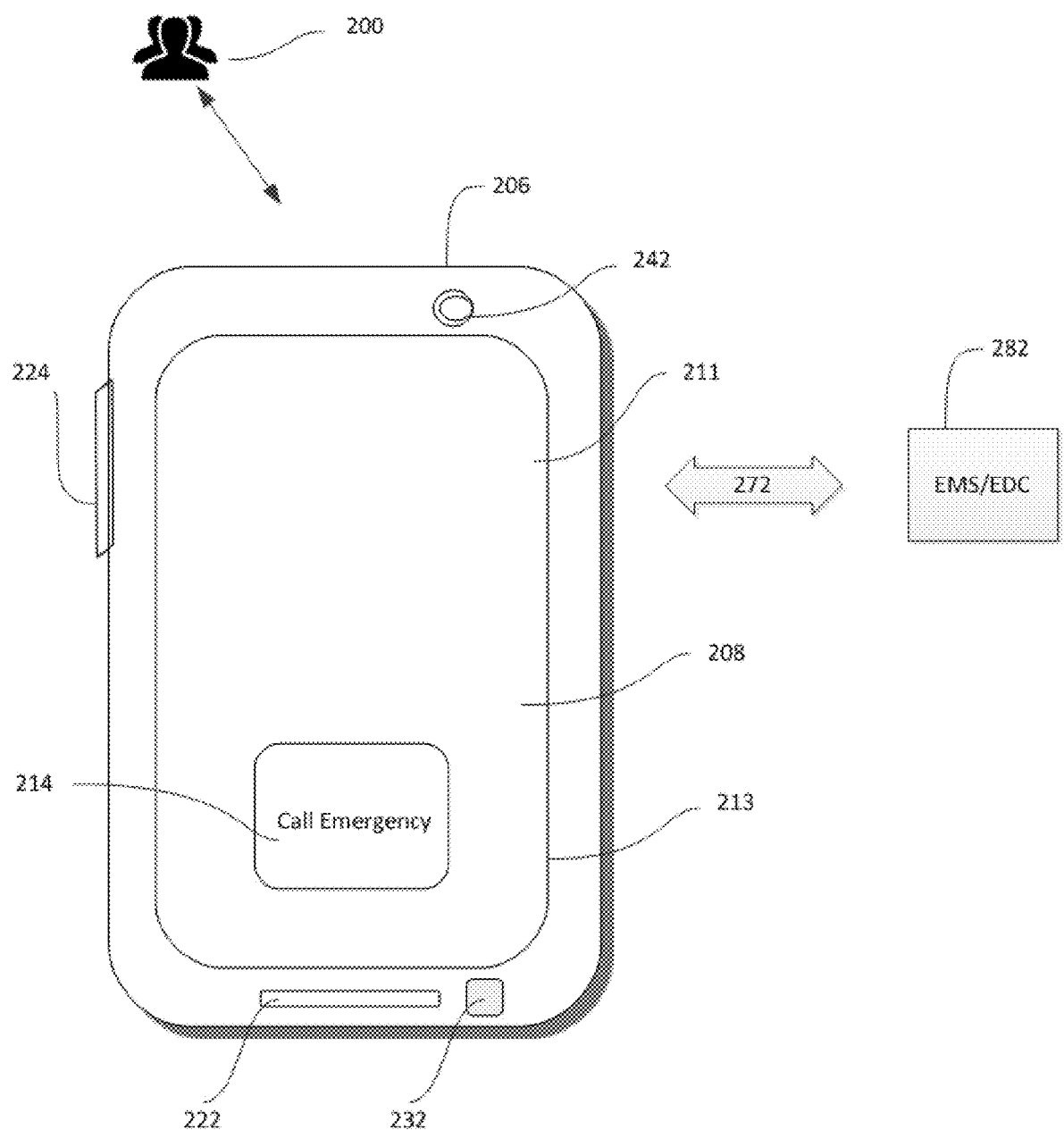
FIG. 2 is a schematic diagram of one embodiment of a communication device displaying a soft button for making an emergency call.

FIG. 2 is an illustration of one embodiment of a communication device 206. In some embodiment, the communication device 206 is a cellular phone, smart phone, portable computer, or wearable electronic device. In some embodiments, the communication device 206 comprises a processor, a memory, a display 211, user interface 213, and an emergency call application 208 including instructions executable by the processor. In some embodiments, the communication device 206 comprises a location component such as GPS. In some embodiments, on the display 211, the communication device 206 comprises one or more soft buttons that can be activated by touch, for example, a soft button 214 displayed on a touch screen display 211 when the device is in active mode. In some embodiments, the communication device 206 comprises one or more physical buttons 222, 224 (that may be interacted with by pressing or touching), for example, a power button, a volume rocker button or the menu buttons activated by touch such as those found on on smart phones. In some embodiments, the communication device 206 comprises a microphone (not shown), a camera 242, and one or more sensors 232, for example, a fingerprint reader. In some embodiments, the application 208 comprises one or more software modules. In some embodiments, a software module is a user interface module, a communication module or an authentication module. In some embodiments, the interface module receives one or more user interactions indicative of an emergency from the user interface, a microphone (not shown), a camera 242, or one or more sensors 232 such as a fingerprint reader. In some embodiments, the communication module establishes a communication link 272 with an EMS or an EDC 282. In some embodiments, communication module establishes a communication link 272 with an EMS or EDC 282 by sending an emergency alert comprising a request for emergency assistance and emergency data through the communication link. In some embodiments, the communication link 272 is a data connection through Wi-Fi, Bluetooth®, Infra-red (IR), the cellular network, or other communication network. In some embodiments, authentication module is used to provide user authentication before the communication link 272 is established.

EMS and EDC

As referenced herein, an Emergency Management System ("EMS") refers to a system that receives and processes emergency alerts from users and forwards them to the EDC. Various embodiments of the EMS are described in U.S. patent application Ser. No. 14/856,818, and incorporated herein by reference. In some embodiments, when the emergency alert is sent from the communication device 206 to the EMS, it will forward the alert to the appropriate EDC (such as a PSAP) which then provides an emergency response or emergency assistance. In some embodiments, an emergency response or emergency assistance comprises the EMS or EDC sending emergency response personnel (e.g., firefighters, police, emergency medical technicians, or any combination thereof).

The Emergency Dispatch Center ("EDC") refers to the entity that receives the emergency alert and coordinates the emergency assistance. In some embodiments, EDC is a public organization run by the municipality, county or city or may be a private organization. In some embodiments, emergency assistance is selected from medical, caregivers, firefighting, police, military, paramilitary, border patrol, lifeguard, and security services. In some embodiments, the emergency alert is sent from the communication device 206 to an EDC, which will send the emergency assistance. In some embodiments, an EDC comprises an EMS, wherein the EMS is a part of the EDC rather than an independent entity.

Active or Inactive Mode

In some embodiments, the communication device 206 is in one or more states when an emergency arises that prompts a user to request emergency assistance. For example, in some embodiments, when the communication device 206 is powered ON, but in a hibernation or sleep state, the display 211 is turned off. In some embodiments, regardless of the state of the device, the device is in a device mode that allows a user send an emergency alert using a quick and simple process. In some embodiments, the device comprises at least two modes. In some embodiments, the device comprises two modes. In some embodiments, the device comprises three modes. In some embodiments, the device comprises four modes. In some embodiments, the device comprises five modes. In some embodiments, device comprises at least 1, 2, 3, 4, 5, 6, 7, 8, 9, or 10 or more modes. In some embodiments, device comprises an active mode. Active mode is characterized by the display being powered ON and presenting one or more interactive elements. In some embodiments, the device comprises an inactive mode. Inactive mode is characterized by the display being powered OFF and presenting no interactive elements. In a particular embodiment, the device comprises both an active mode and an inactive mode. In some embodiments, the user 200 interacts with one or more physical interactive elements on a device 206 in inactive mode to provide one or more user interactions indicative of an emergency. In some embodiments, the user 200 interacts with one or more hard buttons 222, 224 on a device 206 in inactive mode to provide one or more user interactions indicative of an emergency. In some embodiments, the user 200 interacts with one or more soft buttons 214 on a device 206 in active mode to provide one or more user interactions indicative of an emergency. In other embodiments, a user 200 is able to interact with one or more hard buttons 222, 224 on a device 206 in active mode to provide one or more user interactions indicative of an emergency. In some embodiments, when the display is in inactive mode, the communication device 206 is in one or more states of the device such as, for example, a sleep or hibernate state. In some embodiments, when the display is in active mode, the communication device 206 is in one or more states of the device such as, for example, locked state, unlocked screen, flight state, etc. Locked state refers to when the device is locked and inaccessible (e.g., user is unable to enter the right password). Unlocked screen refers to the device after it has been unlocked and accessible (e.g., user entered the right password). Flight state refers to the device when communication is turned off (e.g., when the user has boarded an airplane about to take off and is instructed to turn off cellular, Wi-Fi, and Bluetooth communication). In some embodiments, a device sends an emergency alert upon receiving one or more user interactions indicative of an emergency regardless of the state of the device. For example, in some embodiments, a device that receives one or more user interactions indicative of an emergency while in a non-communicative state (e.g., flight or airplane state) immediately turns communication back on and attempts to send an emergency alert to an EMS or EDC. In some embodiments, a device comprises a stealth mode. A stealth mode is refers to a mode in which the emergency alert is made without detectable cues, for example, without sound. In some embodiments, a device in stealth mode has all sounds turned off, alerts turned off, vibrations turned off, the display turned off, or any combination thereof. In some embodiments, a user optionally customizes the stealth mode by choosing what to turn on or off during stealth mode. In some embodiments, a device is in either active mode or inactive mode and not both at the same time. In some embodiments, the device is in stealth mode simultaneously with an active mode or inactive mode.

In some embodiments, a user 200 touches a soft button 214 to initiate an emergency alert. In comparison to a long and complex sequence of interactions such as turning on the display, unlocking the device, pressing the call button, dialing 9-1-1 (or another emergency number that is applicable in that jurisdiction) and pressing "send" or "call," a one-touch button method of sending an emergency alert may be quicker and easier. In some embodiments, the display is in active mode, a mere touch of a button provides a quick and easy way to trigger the emergency alert, which is especially useful when the user is suffering a medical emergency. In some embodiments, a one-touch process for sending an emergency alert in a device in active mode is provided via a persistent emergency button that is omnipresent on the display screen throughout all states of the active mode. Because time is of critical importance in responding to emergency situations, having to carry out additional steps in requesting emergency assistance can be a high burden for a user in the middle of an emergency. Thus, there is a need for a way to request emergency assistance regardless of the state of the communication device. This need is met by the devices, systems, methods, and media disclosed herein. In some embodiments, a soft button 214 such as a persistent emergency button is available in different states of the communication device 206 (e.g., a phone in locked, unlocked screen, flight state, etc.) for user interaction to send an emergency alert.

In some embodiments, the interaction between the user 200 and the communication device 206 initiates a process for requesting emergency assistance, and includes a sequence of actions or interactions. For example, in a particular embodiment, a first press of the soft button 224 followed by a first press of the physical button 222 and a first interaction with the sensor 232 (e.g., providing user authentication via a fingerprint scanner) initiates the emergency call. In some embodiments, the sequence of interactions between the user 200 and a soft button 214, one or more physical buttons 222, 224, and/or a sensor 232 comprises one or more interactions with each of the soft button 214, physical button 224 and/or the sensor 232. In certain embodiments, the sequence of steps or interactions performed by the user 200 of the communication device 206 includes a gesture towards the camera 242 of the communication device 206. In some embodiments, the gesture towards the camera 229 is performed as a replacement to one or more interactions in the sequence of interactions with the soft button 214, the physical buttons 222, 224, and/or the sensor 232 for sending an emergency alert. In some embodiments, the gesture towards the camera 229 is performed in addition to a particular sequence of interactions with the soft button 214, physical button 222, 224, and/or the sensor 232 for sending an emergency alert.

Figure 3:
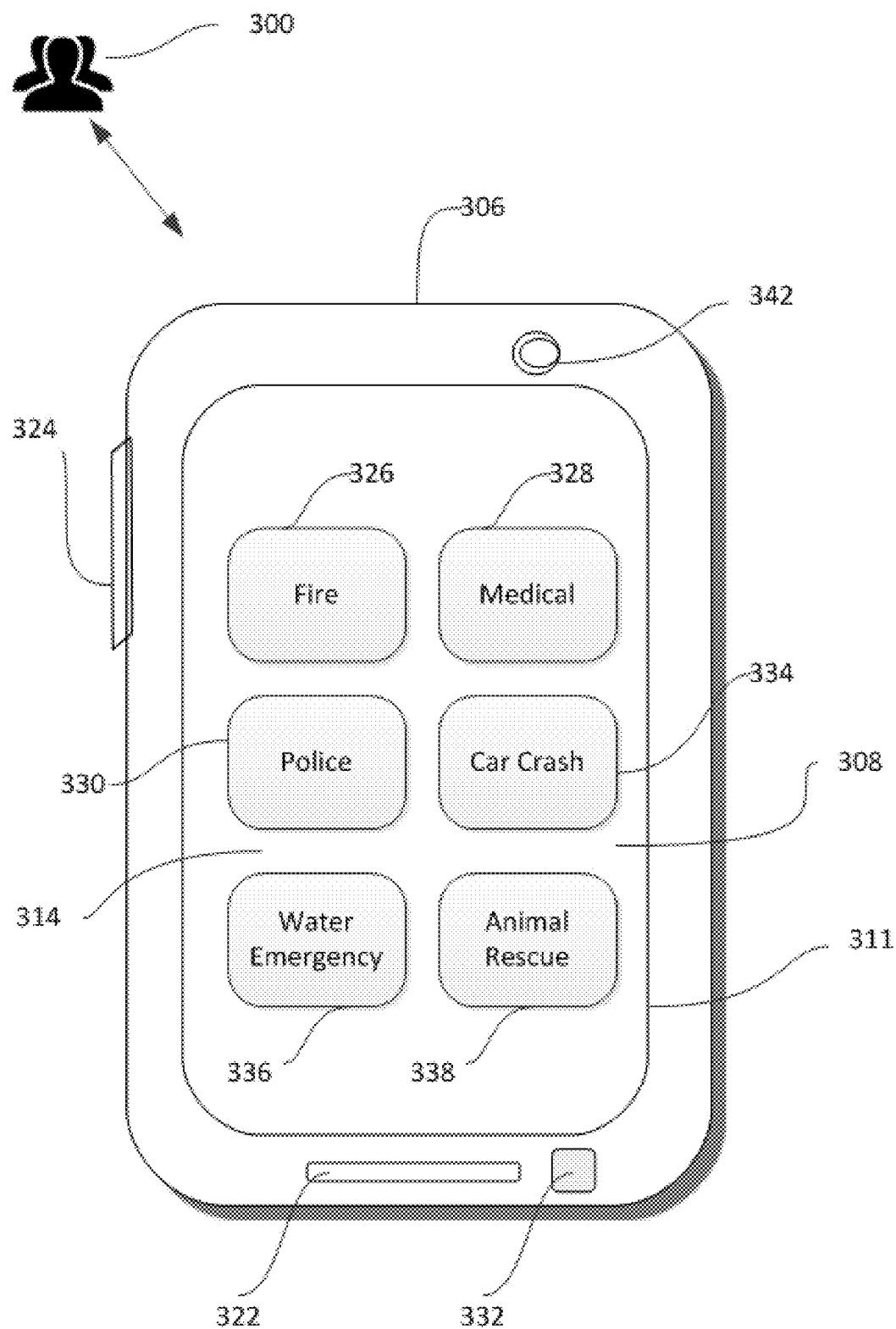
FIG. 3 is a schematic diagram of one embodiment of a communication device displaying a plurality of buttons for making an emergency call.

FIG. 3 is a schematic diagram of one embodiment of a communication device 306 with a plurality of soft buttons 314 for making an emergency call. In some embodiments, the plurality of soft buttons 314 for making an emergency call comprises a six-tile soft button design. In some embodiments, the plurality of soft buttons 314 for making an emergency call comprises a four-tile soft button design. In some embodiments, the plurality of soft buttons 314 for making an emergency call are accessed by interacting with or touching a persistent emergency button. In other embodiments, interacting with or touching a persistent emergency button results in sending an emergency alert without displaying the plurality of soft buttons 314 for making an emergency call. In a particular embodiment, the communication device 306 comprises the following components— display 311, an emergency call application 308, physical buttons 322 and 324, camera 342 and fingerprint reader 332. In some embodiments, a user interaction that is indicative of an emergency is a soft touch with any one of the six soft buttons 314. In some embodiments, to indicate that there is fire and call emergency, a user 200 may touch the fire indication button 326. In some embodiments, one or more soft buttons for indicating different types of emergencies are selected from: Medical 328, Police 330, Car Crash 334, Water Emergency 336 and Animal Rescue 338.

By sending an emergency alert comprising emergency data relevant to the emergency, a user 300 provides relevant information to the EMS/EDC and/or the emergency responders. For example, if the emergency alert comprises information indicating a "Fire" emergency, then the EDC may be able to dispatch fire fighters to scene. On the other hand, if it is an "Animal Rescue", the EDC may be able to dispatch animal control or rescue personnel to the location of the emergency. Previously, a person who called for emergency assistance would have had to explain the type of emergency help needed during the emergency call to the EDC. Instead, in some embodiments, a user 300 presses soft buttons 314 to both send an emergency alert and indicate the type of emergency help needed. Furthermore, in some embodiments, the emergency alert comprises location information so the EDC is able to dispatch emergency responders without needing to ask about the location of the user or the emergency. In this way, according to some embodiments, a user 300 is able to initiate the emergency call and provide relevant details about the emergency using a one-touch process.

Figure 4:
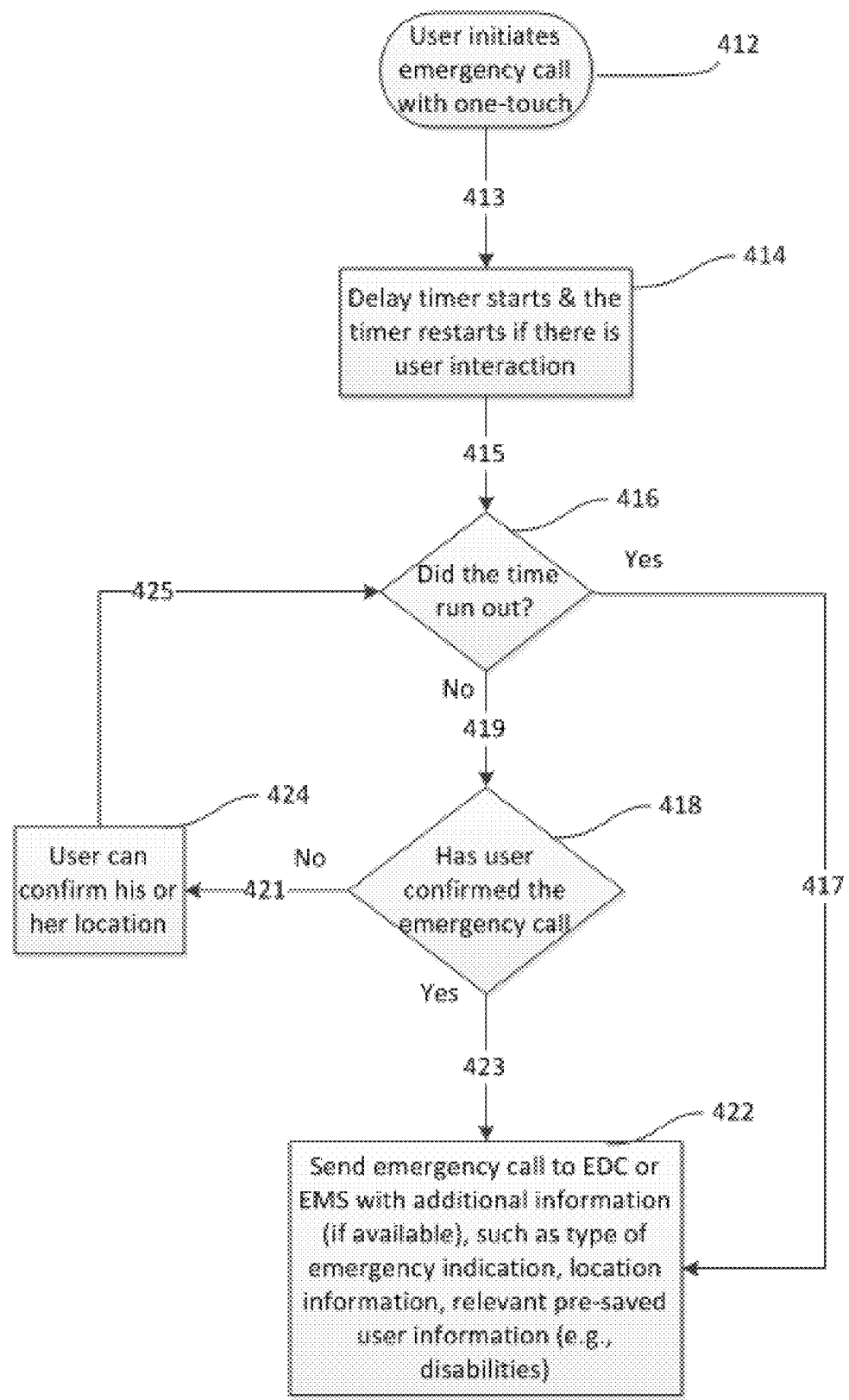
FIG. 4 is a flowchart of one embodiment showing how a user makes an emergency call using a one-touch button.

In some embodiments, when a user 300 interacts with a communication device 306 to indicate an emergency using one of a plurality of soft buttons 314 (as shown in FIG. 3), an emergency alert is sent with one-touch. In some embodiments, a user 300 sends an emergency alert using a one-touch process by touching a persistent emergency button on the display of a device in active mode. FIG. 4 illustrates an exemplary method for making an emergency call with a one-touch process. First, the user initiate the emergency call by touching one of several soft buttons indicative of an emergency on the touchscreen display of a communication device (act 412) or by touching a persistent emergency button. In other embodiments, the emergency call is initiated by pressing one or more physical buttons. In some embodiments, if the device is in an inactive mode where the display is OFF, pressing a hard button transforms the device from inactive to active mode, wherein the device in active mode presents one or more interactive elements (e.g., a persistent emergency button) for sending an emergency alert.

In some embodiments, initiating the emergency call or emergency alert 412 causes a delay timer to start 414. The delay timer is a timer that counts down from a set amount of time. In some embodiments, delay timer restarts whenever the user interacts with the display or device 414 (e.g., by pressing or touching a hard or soft button). In some embodiments, the display on the device shows the delay timer in real-time for a user to see how much time is left on the timer until the emergency alert is sent to an EMS or EDC. In some embodiments, the display displays a cancel button for cancelling the emergency alert before the delay timer counts down to zero. In some embodiments, the delay timer is chosen so that there is sufficient time for the user to cancel inadvertent calls, but not so long as to excessively delay the emergency response. In some embodiments, the delay timer is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 seconds or more, including increments therein. In some embodiments, the delay timer is at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 seconds or more, including increments therein. In some embodiments, the delay timer is no more than about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 seconds, including increments therein. In some embodiments, the delay timer is between about 1 to 5 seconds, about 5-10 seconds, about 10-15 seconds, about 15-20 seconds, about 20-25 seconds, about 25-30 seconds, about 30-35 seconds, about 35-40 seconds, about 40-45 seconds, about 45-50 seconds, about 50-55 seconds, about 55-60 seconds, or more. In a particular embodiment, the delay timer is about 5 seconds. In another particular embodiment, the delay timer is about 8 seconds. In yet another particular embodiment, the delay timer is about 10 seconds. In yet another particular embodiment, the delay timer is about 12 seconds. In yet another particular embodiment, the delay timer is about 15 seconds. In some embodiments, the delay timer is optionally customized by defining a set time for the timer to count down from. For example, in a particular embodiment, a user optionally customizes the delay timer by choosing to set the timer at 10 seconds.

In some embodiments, while the delay timer is running or counting down (act 416), a user optionally confirms the emergency (act 418). In some embodiments, confirming the emergency causes the emergency module to immediately send an emergency alert to an EDC or EMS. In some embodiments, the emergency alert comprises any available emergency data (act 422). In some embodiments, the display on the device presents the delay timer and an emergency confirmation button after a user initiates the emergency call with a one-touch process. In some embodiments, the user confirms the emergency by touching the emergency confirmation button before the delay timer finishes counting down to zero (act 418). In some embodiments, emergency data that is sent with the emergency alert includes the type of emergency indication (such as Fire, Medical, etc.), location information, appropriate pre-saved user information (e.g., medical conditions or disabilities). In some embodiments, the location information includes GPS coordinates from the location component in the communication device. In some embodiments, if the communication device does not have a GPS or if the GPS signal is not available, historical GPS coordinates or user-inputted location information is sent. In some embodiments, the method allows the user to refine the location information by confirming the location (e.g., the address indicated by current or historical GPS coordinates, a home address, or a work address) as the location of the emergency 424. In some embodiments, the user has saved information that is to be sent in case of emergencies, for example, disability information (such as deafness, vision impairment, or some other physical handicap), or medical conditions (such as heart conditions, allergies, diabetes, Alzheimer's, etc.).

In some embodiments, if the delay timer reaches zero 417 before the user confirms the emergency, the device (or its communication module) sends an emergency alert immediately 422. Thus, in one particular embodiment, if the user initiates the emergency call (e.g., sending an emergency alert) by a one-touch process, the emergency request is sent after a 10-second delay timer without any additional interactions. In some embodiments, the one-touch process comprises any single interaction with a physical or non-physical interactive element. For example, in one particular embodiment, a one-touch process comprises pressing the home button for at least 5 seconds. In some embodiments, a one-touch process comprises pressing a persistent emergency button on the touchscreen. In addition, in some embodiments, with an additional touch (dual touch), the user is able to send the emergency call earlier by confirming (act 418) the location information (act 424) further enhancing the emergency alert. In some embodiments, a user sends an emergency alert by a multi-touch process (e.g., multiple interactions indicative of an emergency, wherein the interactions are touches). For example, in a particular embodiment, a multi-touch process comprises pressing a home button two consecutive times to bring up a delay timer of 10 seconds. In another embodiment, a multi-touch process comprises pressing a home button and then touching a persistent emergency button. In some embodiments, a one-touch, two-touch (dual touch), or multi-touch process initiates a delay timer as diagrammed in FIG. 4. In this way, a user is able to quickly and easily send an emergency alert while reducing the risk of sending an emergency alert by accident. In some embodiments, a user optionally customizes the sequence of interactions indicative of an emergency. Thus, in some embodiments, many multi-touch sequence variations are possible for sending an emergency alert.

A one-touch or two-touch process for sending an emergency call is particularly useful for several reasons. During emergencies, a user may be occupied with dealing with the emergency situation, such as finding a fire escape during a fire emergency. Alternatively, during a medical emergency, the user may become physically compromised. If the user is able to send an emergency alert comprising an emergency request, the type of emergency situation, and location information using a one-touch process, emergency response personnel can arrive at the scene fully prepared based on the provided information without requiring further user interactions. If the user has lost consciousness or is unresponsive after sending the emergency alert through the communication device, emergency responders may already have an idea of the cause of the user's unresponsiveness and thus come prepared to deal with it. For example, a user may be suffering from a heart attack and sends an emergency alert using a one-touch process by touching a "medical emergency" soft button. In some embodiments, the user has entered medical history information including a history of heart problems into the software application for requesting emergency assistance beforehand. In some embodiments, device has GPS. Therefore, in a particular embodiment, the emergency alert comprises the emergency type (medical emergency), the location information (GPS location of the communication device), and emergency data (user medical history information). In some embodiments, even if the user becomes unresponsive due to the heart attack, the EMS or EDC is able to provide emergency response personnel with the relevant information received in the initial emergency alert as well as the user's current unresponsiveness. The emergency response personnel may then be prepared to attempt resuscitation of a heart attack victim when they arrive at the accident site. Thus, in some embodiments, emergency data regarding the emergency is sent simultaneously with one-touch to enhance the emergency response.

The ease of one-touch or two-touch for sending the emergency call must be balanced with the risk of inadvertent and unauthorized calls. To overcome this problem, user authentication may be required to reduce risk of abuse of the account by non-authorized users. In some embodiments, users are required to register in order to provide authentication for sending emergency calls. In some embodiments, the user registration process includes a verification step by SMS or text, email or a voice call requiring user input authenticating the identity of the user.

In some embodiments, the user interactions that are indicative of an emergency are chosen by a user or a service provider based on ease of use and having a lower chance of inadvertent calling. In some embodiments, the user chooses the trigger interaction based on personal preferences or disabilities. Instead of using soft buttons, in some embodiments, a user with limited vision predefines the user interactions indicative of an emergency as comprising voice commands, gestures, hard button interactions, or any combination thereof. In some embodiments, with voice command, both the initiation of the emergency call and the authentication are done with voice recognition technology in one interaction ("one-command").

In some embodiments, an emergency call, alert, or request sent using the devices, systems, methods, or media described herein is sent to an Emergency Management System ("EMS"). In some embodiments, the final destination of the emergency call is an emergency dispatch center ("EDC"), such as Public Safety Answering Points ("PSAPs") with the EMS acting as an intermediary that routes the initial emergency call, alert, or request to an appropriate EDC or PSAP based on location information provided in the emergency alert. In some embodiments, an emergency alert is sent to the EMS first if it is available, wherein the request is sent to an EDC or PSAP if an EMS is unavailable.

In some embodiments, prior to sending the emergency call, alert, or request to an EDC or PSAP, the EMS obtains the location for the user by various methods, for example, using GPS information from the user communication device, and connecting the location information with the associated phone number. The EMS then queries a database at a VPC (VoIP Positioning Center) with the location information. In some embodiments, the VPC uses jurisdictional boundaries to determine the appropriate EDC or PSAP to route the call based on the location information. In a particular embodiment, when the emergency call, alert, or request is sent to the VPC, the VPC looks up the provisioned information and assigns an identification number called the Pseudo-Automatic Number Identification (pANI). In some embodiments, the VPC then forwards the call to the appropriate PSAP. In some embodiments, the PSAP runs an ALI (automatic location information) query based on the pANI and the request for location information is sent back to the VPC database, which will retrieve and send the location information to the PSAP. In some embodiments, most of these steps occur within a few seconds so that the emergency call is sent quickly.

Because the information about the location of the user is of critical importance for routing to the correct PSAP and dispatching emergency services to the correct location, the disclosed method makes it possible to send accurate location information. In comparison, in prior methods for sending location information when a mobile phone is used to send an emergency call through a carrier, the PSAPs receive limited location information, which may lead to the call being sent to the incorrect PSAP and the emergency services being sent to the incorrect location. In most cases, the PSAPs might only receive the address of the cell tower that is routing the call, and they may or may not get the GPS location of the device after some delay. In some embodiments, the disclosed systems, devices, methods, and media ensure that the location information is accurate by inserting the user's location information (e.g., GPS coordinates) when the emergency call is made and allowing the user to quickly confirm the location.

Figure 5:
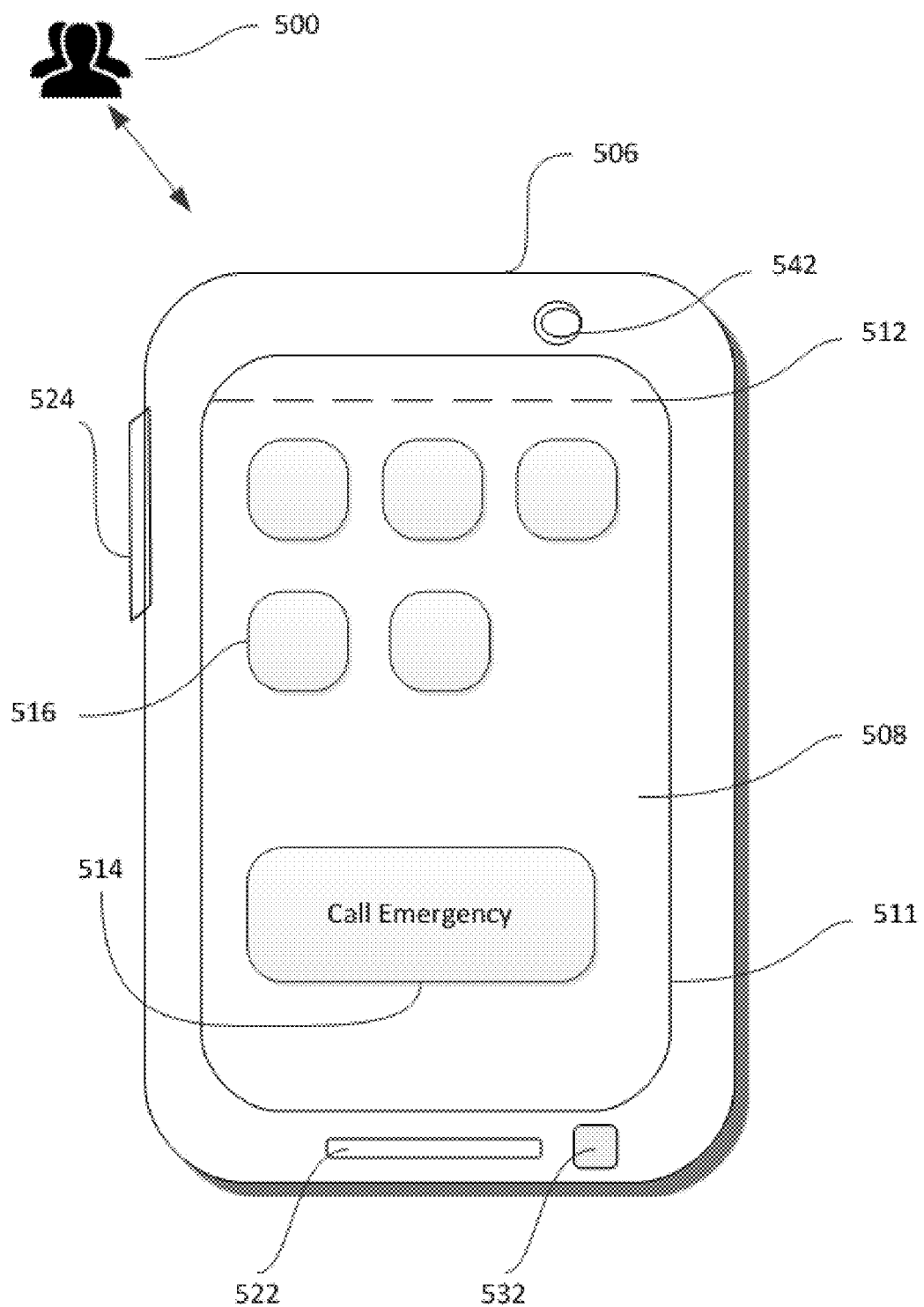
FIG. 5 is a schematic diagram of one embodiment of the communication device displaying a persistent emergency button for making an emergency call in the home screen.

Disclosed herein are devices that include a persistent emergency button provided for ease of calling within various states of the communication device. In some embodiments, a persistent emergency button is a soft button presented on the display of a communication device in active mode. FIG. 5 is a schematic diagram of one embodiment of a communication device 506 with a soft button 514 for making an emergency call while the display is showing the home screen. In some embodiments, the communication device 506 comprises a display 511, such as a touchscreen comprising a plurality of application icons 516, a notification bar 512, and a soft button 514 for sending an emergency call. In some embodiments, the user 500 interacts with the communication device 506 using physical buttons 522, 524, a fingerprint reader 532, a camera 542, a microphone, or some other input source. As shown, in some embodiments, the soft button 514 are visible and responsive to user interaction (e.g. touch) on the home screen, even when the user 500 is not actively using the application 508 for requesting emergency assistance. In this way, the user 500 is able to send an emergency call with one-touch while the display is showing the home screen.

Figure 6:
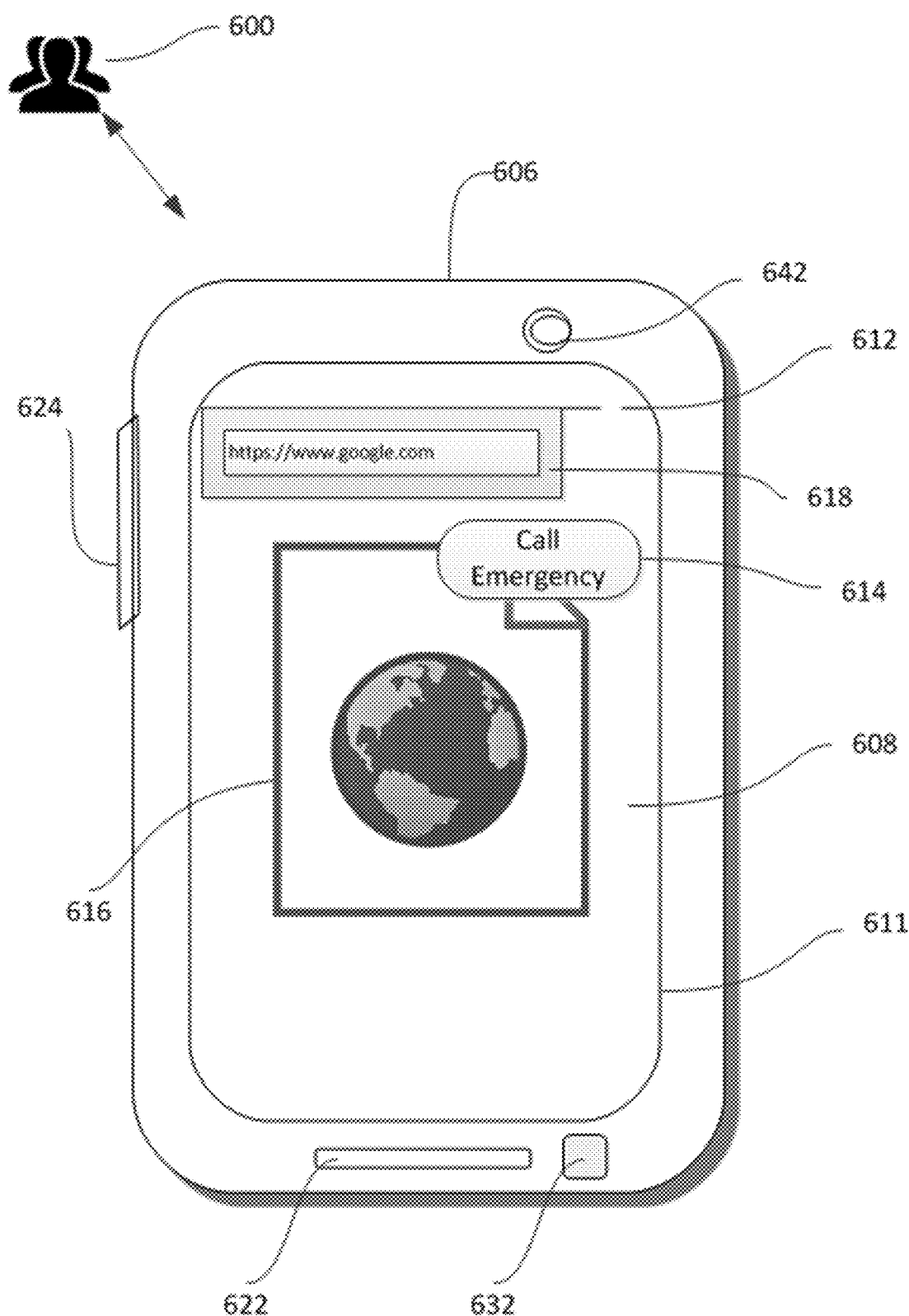
FIG. 6 is a schematic diagram of one embodiment of the communication device displaying a persistent emergency button while a browser application is running.

In some embodiments, the persistent emergency button remains visible and responsive when the device is in active mode even when a user is actively using an application. In some embodiments, the persistent emergency button remains visible and responsive when the device is in airplane state so long as the device is in active mode. In one embodiment of the communication device 606 shown in FIG. 6, a persistent emergency button 614 for emergency calling is visible as an overlay on top of a browser application. In some embodiments, the display 611 is a touchscreen with a plurality of interactive elements or icons for applications 616, a notification bar 612 and a persistent emergency button 614 for sending an emergency call. In some embodiments, the user 600 optionally interacts with the communication device 606 using the physical buttons 622, 624, the fingerprint reader 632, the camera 642, the microphone 658 (not shown), etc. In some embodiments, the persistent emergency button 614 is visible and waiting for user interaction as an overlay on top of the browser application 616 without blocking the address bar 618. In some embodiments, the location of the persistent emergency button is optionally customized. For example, in some embodiments, a user 600 optionally moves the persistent emergency button to a location of the user's choosing. In some embodiments, user 600 optionally moves the persistent emergency button to a different location depending on the application that is open or the state of the device. In some embodiments, because the persistent emergency button 614 is always available in a device in active mode, the user 600 is able to send an emergency alert even within the browser application. In another embodiment, the persistent emergency button is an icon within the notification bar 612, and drawing out the notification bar allows one-touch emergency call. In some embodiments, the user 600 is able to send an emergency alert by a one-touch or two-touch process using the persistent emergency button as described above.

In some embodiments, the application 608 continues running in background. In some embodiments, the persistent emergency button is programmed as an overlay button. The application 608 is integrated into the operating system of the communication device 606 to allow the persistent emergency button to persist in all states of the device.

Many variations in the shape, size and position on the display of the persistent emergency button are contemplated to incorporate ease of use, user preferences and disabilities, etc. In some embodiments, variations are customizable by a user. In some embodiments, variations are predefined by the device or application. In some embodiments, the persistent emergency button is located within the top half of the display or the bottom half of the display. In some embodiments, the persistent emergency button is located on the left half of the display or the right half of the display. In some embodiments, the persistent emergency button is located in the top left quadrant, the top right quadrant, the bottom left quadrant, or the bottom right quadrant of the display. In some embodiments, the persistent emergency button is located in the top center of the display, the bottom center of the display, or the center of the display. In some embodiments, the persistent emergency button is a geometric shape selected from a circle, oval, square, triangle, rectangle, diamond, pentagon, hexagon, heptagon, octagon, nonagon, decagon, or star. In some embodiments, persistent emergency button comprises a shape with rounded corners. In some embodiments, persistent emergency button comprises a shape with sharp corners. In some embodiments, persistent emergency button comprises one or more colors selected from pink, red, orange, yellow, green, blue, purple, brown, cyan, indigo, violet, magenta, white, gray, black or other colors produced by any combination thereof. In addition, the persistent emergency button comprises multiple buttons comprising separate buttons for different types of emergencies.

Figure 7:
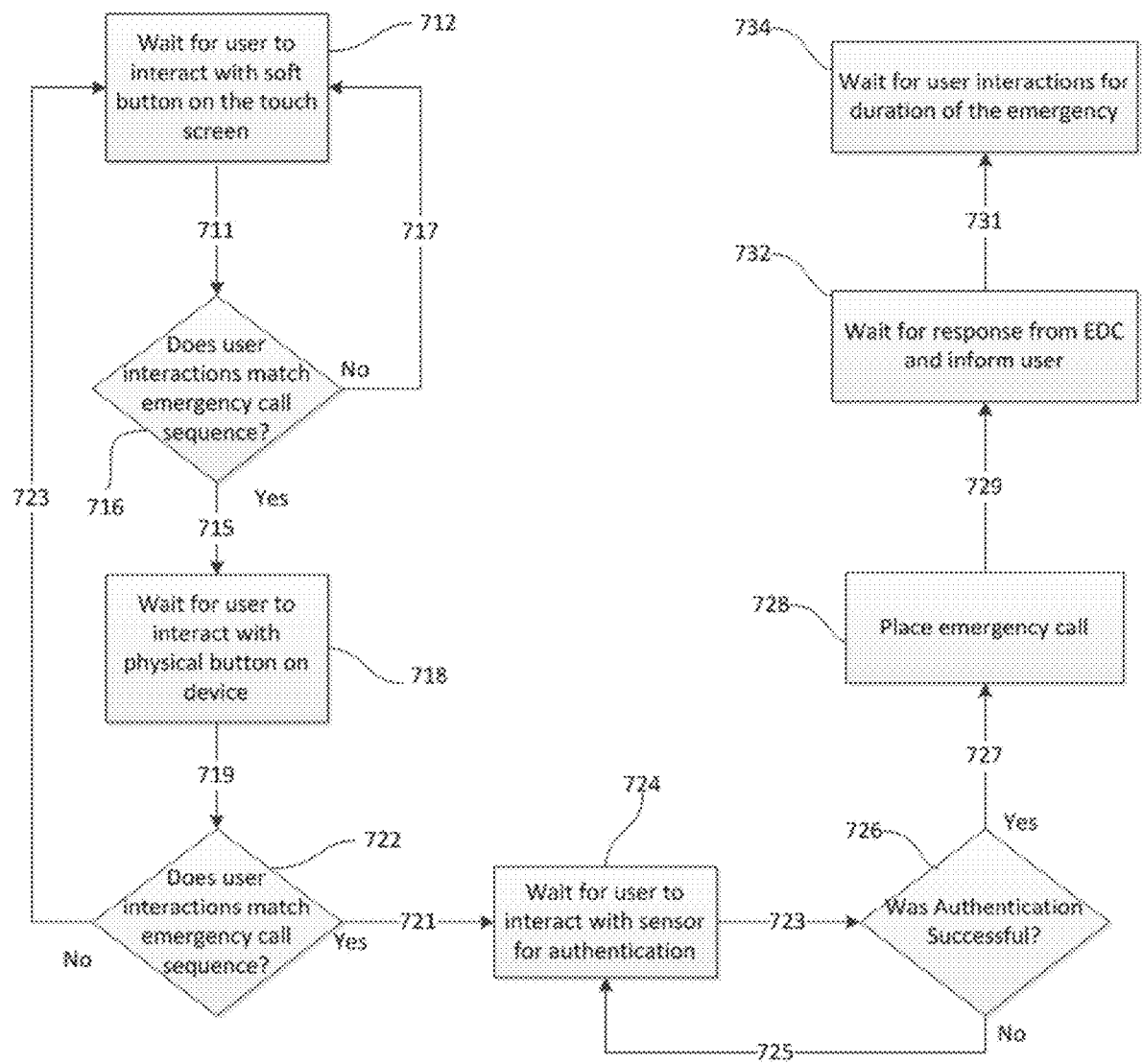
FIG. 7 is a flowchart showing one embodiment of how a user makes an emergency call using a communication device.

FIG. 7 is a flowchart showing one embodiment of a user making an emergency call (or sending emergency alert) using one embodiment of the communication device wherein the sequence of user interactions indicative of an emergency comprises a sequence of one or more interactions with one or more soft buttons and one or more interactions with one or more hard buttons, along with a user authentication step. In some embodiments, the display is in the active mode and waiting for the user to interact with a soft button (e.g., button 616 in FIG. 6) on the touch screen (act 712). When the user touches the soft button, the communication device registers this as the first step in a sequence of interactions indicative of an emergency and begins to compare it with one or more predefined sequences of soft button interactions indicative of an emergency. Responsive to performance of the additional instructions, the device compares the sequence of interactions with one or more sequences of soft button interactions predefined in the device (also referred to as "emergency call sequence") (act 716). If there is no match (act 716), the device waits for the user to interact with the soft button(s) again (act 712).

If there is a match between the user interaction and one or more soft button interactions in the predefined sequence, the communication device waits for the user to confirm the request by interacting with one or more physical buttons on the device (act 718). Responsive to the user interaction with the physical button(s), the device compares the sequence of interactions with one or more sequences of hard button interactions predefined in the device as indicative of an emergency (also referred to as "emergency call sequence") (act 722). The device waits for the user to interact with the physical button(s) for a predefined time period (act 718). In some embodiments, if there is no match after a predefined maximum number of retries or expiry of a predefined time period (act 723), the device returns to the state it was in prior to user interactions (act 712). If there is a match (act 722), the device waits for the user to interact with one or more sensors (e.g., a fingerprint scanner) to provide authentication (act 724).

If authentication is successful (act 727), the device sends an emergency alert (act 726). Authentication is successful if the sensor reading matches a pre-saved authorized reference. Following successful authentication, the device waits for a response from the EDC and informs the user (act 732). During the length of the emergency, the device waits for further user interactions (act 734). If the authentication is not successful (act 726), the device waits for the user to retry authentication (act 724). In some embodiments, if authentication is not successful after maximum retries or predefined time period, the device returns to the state it was in prior to user interactions (not shown).

In another embodiment (not shown), the authentication step using the sensor is not required. In some embodiments, user disables the authentication step because he or she deems the soft and hard button user interaction sequence to be sufficient to establish user authentication. In this particular embodiment, if the physical button sequence matches interactions pre-saved in the device (act 722), the emergency call is placed immediately without requiring authentication (act 728).

Figure 8:
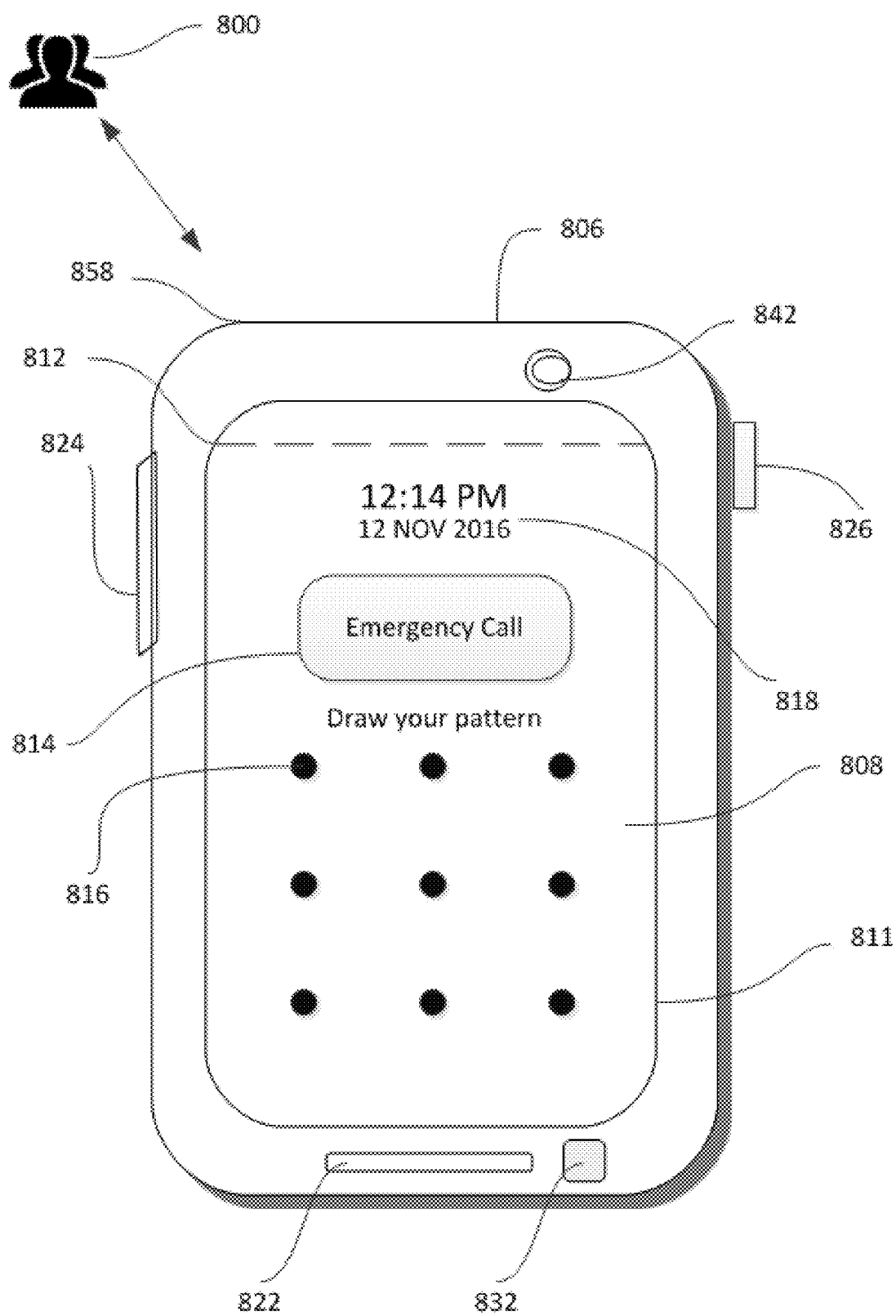
FIG. 8 is a schematic diagram of one embodiment of the communication device with a persistent emergency button in the locked screen.

FIG. 8 is a schematic diagram of one embodiment of the communication device with a persistent emergency button in a locked screen. The disclosed device 806 includes a soft button 814 for making an emergency call in the locked screen with a one-touch process as described in FIG. 4. The communication device 806 comprises a display 811 such as, for example, a touchscreen comprising a plurality of interactive elements for unlocking the phone 816, a notification bar 812, and a soft button 814 for sending an emergency alert. In addition, in some embodiments, the user 800 is able to interact with the communication device 806 using the physical buttons 822, 824, 826, the fingerprint reader 832, the camera 842, the microphone 858, or some other input source. In some embodiments, the physical buttons comprise a power button 826, a volume button 824, a home button 822, a navigation button, a keyboard button, a return button, a multitasking button, a camera button, or any combination thereof.

As shown, the soft button 814 may be visible and waiting for user touch in the locked screen, even if the user 800 has not entered the unlock code. In this way, the user 800 may be able to send an emergency call with one-touch from the locked screen when the device is in active mode with the display powered ON.

When the communicative device is in inactive mode, it may be a challenge to quickly and efficiently make an emergency call. If the device is powered ON, the display may be turn off because of power saving settings, which are user-defined or part of the operating system or manufacturer customizations. In some embodiments, since the display is turned OFF when the device is in inactive mode, the emergency call is initiated by pressing hard buttons such as 822, 824, or 826. In some embodiments, to prevent inadvertent calling, the sequence of interactions indicative of an emergency are chosen by the user or service provider. For example, in a particular embodiment, a user or service provider defines the sequence of interactions indicative of an emergency as comprising triple pressing the power button. Thus, in some embodiments, a sequence of presses such as a "triple press" of a hard button is sufficient to make an emergency call when the device is in an inactive state. In some embodiments, interacting with a hard button transforms the device from inactive mode to active mode and causes the display to turn on and display one or more interactive elements such as, for example, a persistent emergency button. In some embodiments, a user presses a hard button and then press a soft button such as a persistent emergency button as part of a process for sending an emergency alert (the alert may be sent immediately depending on whether a delay timer is initiated and/or if authentication is required).

Figure 9:
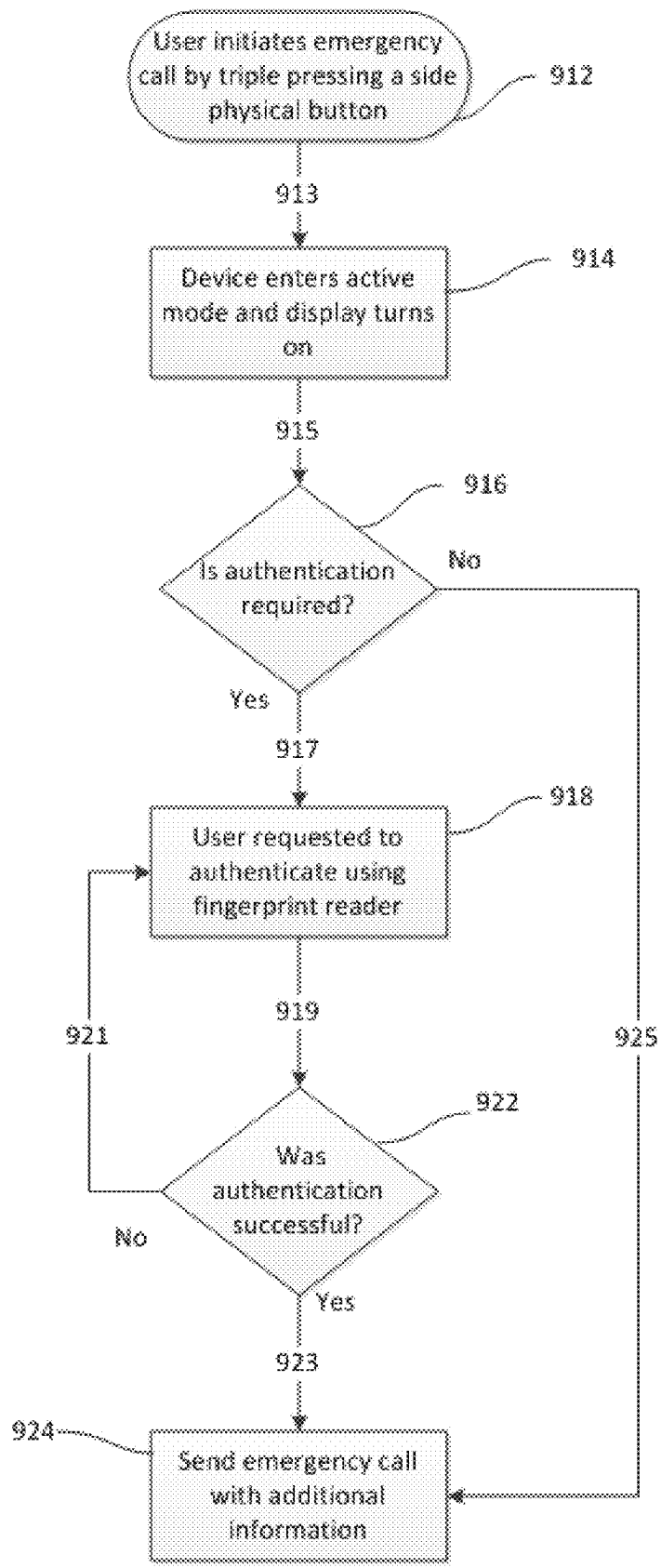
FIG. 9 is a flowchart showing how a user makes an emergency call with an inactive display in one embodiment of the communication device.

In some embodiments, an emergency call is made after a user interacts with hard buttons and then provides authentication. FIG. 9 is a flowchart showing how a user makes an emergency call with an inactive display in one embodiment of the communication device. First, the user initiates the emergency call by triple pressing the side physical button on the device (act 912). The user interaction causes the device to change from inactive to active mode, which causes the display to turn ON (act 914).

In some embodiments, authentication (act 916) is not required (act 925) to send the emergency call (act 924). For example, in some embodiments, a user has predefined a sequence of user interactions to indicate an emergency (e.g., a particular voice command in user's voice, a sequence of physical or soft button presses, a specific gesture, etc.). In some emergency situations, it is necessary to be able to make an emergency call surreptitiously. In some embodiments, if the user has pre-defined a specific sequence or pattern of interactions that is secure and unlikely to be pressed inadvertently, the authentication module allows the emergency call without authentication.

In some embodiments, the user is experiencing an emergency and may not be able to speak. In such embodiments, the user optionally provides predefined gestures and/or sequences of button presses and/or gestures for sending an emergency alert. In some embodiments, the authentication module evaluates whether authentication is required if the risk of inadvertent calls is low or the likelihood that the user is experiencing a real emergency. In some embodiments, a user or emergency service provider (e.g., EMS, EDC, or PSAP) customizes the authentication process to require authentication or not require authentication. In some embodiments, the authentication module evaluates whether authentication is required based on previously filled information by the user, for example, the user's medical conditions, health information about the user as detected by the sensors on the device (e.g., heart rate, pulse, temperature information detected by a wearable device), user's risk for unconsciousness, user's deviation from established habit, location information, etc. In some embodiments, the authentication module evaluates whether authentication is required by querying whether the emergency service provider requires authentication.

In some embodiments, the user may be experiencing an emergency situation where he or she may not be able to press buttons (e.g., user is driving, user has some disability). In such situations, the user optionally sends an emergency alert using a hands-free process through voice commands. In some embodiments, voice analysis of the voice command provides authentication for sending the emergency alert.

In some embodiments, the user may be required to authenticate that he or she is authorized to make an emergency call from that device, for example, by placing his or her finger on the fingerprint reader (act 918). In some embodiments, if the authorization is successful based on saved fingerprint of the user (act 918), an emergency alert is sent with emergency data (act 922). In this way, the user is able to send an emergency alert even with an inactive display. In some embodiments, a device comprises at least two separate procedures for sending an emergency alert depending on the state of the device or the modes of the display. For example, in some embodiments, when the display is OFF (device is in inactive mode), a physical button press sends the emergency alert. Conversely, in some embodiments, when the display is ON (device is in active mode), a persistent emergency button is available in all or most of the device states for making an emergency call.

In some embodiments, if the authentication is unsuccessful, the user is required to provide his or her fingerprint again (act 918). It is contemplated that there can be several variations to this scheme. In some embodiments, a user provides authentication by interactions such as touch, tap, press, squeeze, swipe, voice, gesture, capturing a photo or video with the camera, or any combination thereof. For example, in some embodiments, the user's live video or photo captured by the camera is analyzed by the authorization module through face recognition, body recognition, audio recognition, or a combination thereof. In some embodiments, the user selects the interactions that are indicative of an emergency from a list of user interactions. In some embodiments, the user interaction that initiates the emergency alert also provides authentication, for example, voice command, image, video or through sensors on the physical buttons. In some embodiments, a physical button is equipped with a biometric information reader for biometric authentication. For example, in some embodiments, a physical button is equipped with a fingerprint reader to provide fingerprint authentication when the user presses the button.

In some embodiments, the application 806 (see FIG. 8) allows the user to define a sequence of interactions with physical interactive elements (e.g., hard buttons) to unlock the device and make the emergency call. In some embodiments, the application 806 uses third-party software to unlock the phone to make the emergency call.

In some embodiments, the authorization is performed or provided before the emergency call is initiated and it may be in the form of verification (as described in discussion related to FIG. 3). In other embodiments, the authorization step is completed after the emergency call is initiated (as described in discussion related to FIGS. 7 and 9).

In one aspect, the disclosed herein is a method for transmitting a request for assistance in an emergency situation, the method comprising: (a) receiving an indication of a first selection, by a user, of a soft interface of a communication device; (b) providing a response at the output interface of the communication device indicating the reception of the first selection by the communication device; (c) responsive to an indication of performance of the at least one instruction by the user, sending a request for emergency assistance from the communication device to a system connected with emergency assistance personnel including one of an emergency management system (EMS), an emergency dispatch center (EDC), and another system connected with emergency assistance personnel; (d) determining if the request for emergency assistance has been received by the emergency assistance personnel; (e) determining if the system connected with the emergency assistance personnel can be reached by the communication device; (f) responsive to determining that the request for emergency assistance has not been received by the emergency assistance personnel within a predetermined time period, and that the system connected with the emergency assistance personnel can be reached by the communication device, sending metadata including information about the user and a nature of the emergency situation, the metadata being one of provided by the user and sensed by the communication device, to the system connected with the emergency assistance personnel; (g) responsive to determining that the system connected with the emergency assistance personnel cannot be reached by the communication device, storing the metadata on the communication device and retrying to establish communication with the system connected with the emergency assistance personnel; and (h) responsive to establishing communication with the system connected with the emergency assistance personnel, sending the metadata to the emergency response personnel. In a further embodiment, the method comprises displaying the soft interface on a touch screen of a communication device, and receiving the indication of the first selection through the touch screen. In a further embodiment, the method comprises receiving the indication of the first selection includes receiving an indication of a single interaction with the soft interface. In a further embodiment, the method comprises receiving the indication of the first selection includes receiving an indication of a multiple interactions with the soft interface. In a further embodiment, the method comprises receiving the indication of the first selection includes receiving an indication of an input to one or more of touch screen, a microphone, and a camera of the communication device. In a further embodiment, the method comprises authenticating an identity of the user via interaction with a sensor on the communication device by the user. In a further embodiment, the method comprises authenticating the identity of the user via interaction with a fingerprint sensor. In a further embodiment, the method comprises authenticating the identity of the user via interaction with a heat sensor. In a further embodiment, the method comprises authenticating the identity of the user is performed prior to receiving the indication of the first selection. In a further embodiment, the method comprises a request for emergency assistance is not sent from the communication device if the identity of the user has not been authenticated. In a further embodiment, the method comprises storing the metadata at the system connected with the emergency assistance personnel until the metadata is retrieved by the emergency response personnel. In a further embodiment, the method comprises sending a first type of request for emergency assistance by the communication device in response to a first sequence of interactions with user input interfaces of the communication device, and sending a second type of request for emergency assistance by the communication device in response to a second sequence of interactions with the user input interfaces of the communication device. In a further embodiment, the method comprises the indication of performance of the at least one instruction by the user includes an indication of interaction with at least one hard key of the communication device by the user. In a further embodiments, the method comprises the communication device receives the indication of a first selection, provides the response, receives the indication of performance of the at least one instruction by the user, and sends the request for emergency assistance from a non-active state including one of a sleep state and a state wherein the screen is locked and the phone is not performing any active communication for the user, without the user having to first unlock the communication device.

In one aspect, disclosed herein is a method for transmitting a request for assistance in an emergency situation, the method comprising: (a) receiving an indication of at least one selection of at least one hard interface of a communication device, the at least one hard interface including one or more of a power button and a volume button of the communication device; (b) providing a response from the communication device to the indication of at least one selection, the response including an instruction for the user of the communication device; (c) responsive to receiving an indication of performance of the instruction by the user, authenticating the user by receiving an indication of an interaction, by the user, with a sensor on the communication device capable of sensing one or more characteristics of the user; (d) responsive to receiving the indication of the at least one selection, receiving an indication of performance of the instruction, and authenticating the user, sending a request for emergency assistance from the communication device to one of an emergency management system (EMS), an emergency dispatch center (EDC), and another system connected with emergency assistance personnel; (e) determining if the request for emergency assistance has been received by the one of the EMS, the EDC, and the another system; (f) determining if the one of the EMS, the EDC, and the another system can be reached by the communication device; (g) responsive to determining that the request for emergency assistance has not been received by the one of the EMS, the EDC, and the another system within a predetermined time period, and that the one of the EMS, the EDC, and the another system can be reached by the communication device, sending metadata including information about the user and a nature of the emergency situation, the metadata being one of provided by the user and sensed by the communication device, to the one of the EMS, the EDC, and the another system; (h) responsive to determining that the one of the EMS, the EDC, and the another system cannot be reached by the communication device, storing the metadata on the communication device and retrying to establish communication with the one of the EMS, the EDC, and the another system; and (i) responsive to establishing communication with the one of the EMS, the EDC, and the another system, sending the metadata to the one of the EMS, the EDC, and the another system. In one embodiment, the method comprises receiving an indication of at least one selection of the at least one hard interface of the communication device includes receiving an indication of an interaction of the user with the power button. In a further embodiment, the method comprises receiving an indication of at least one selection of the at least one hard interface of the communication device includes receiving an indication of an interaction of the user with the volume button.

In one aspect, disclosed herein is a communications device configured to receive an input from a user, the communications device comprising a user interface, at least one physical interaction component, a location determination module configured to send and receive messages over a communications network; and a processor configured to: (i) receive an indication of a user interaction with one of the user interface and the at least one physical interaction component, and to detect a number of times an interaction occurred within a period of time and a duration of each interaction; (ii) receive an indication of a location of the communication device from the location determination module; (iii) place a call for emergency assistance to an EDC responsive to a sequence of interactions of the user with the communication device matching a pre-determined pattern; and (iv) authenticate a user by interaction with a sensor on the communication device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Example 1

John Doe is a third-year student at City University. Because final examinations are coming up, John is studying in the library until about 2 a.m. Because he has walk through a high-crime area to reach his apartment, John keeps his cellular phone handy in his pocket. John's phone has been installed with an emergency calling software application, which includes a one-touch button for making an emergency call. John has installed the application and saved his personal identification information. John also used email verification to authenticate his cellular phone number and connect it with his university email.

The emergency calling software application has a persistent button for one-touch calling that is available even when John's phone is outside of the application. Thus, there is a soft button that persists even when John's phone is on the Home Screen or when he is in another application such as an Internet browser. In addition, John has predefined a sequence of physical button interactions that will wake his phone and send an emergency call. He has chosen a five-button-press sequence of the volume toggle button—Up, Down, Down, Down, Up, Down. Because the number of physical buttons interactions is more than three, the application's authentication module determines that the "risk of inadvertent calling" is low enough that there is no need for additional authentication such as a soft-button press or fingerprint authentication. Because John is aware that his walk to the library is through an area with a high risk of mugging, he disables the 10 second delay for emergency calling such that the emergency call is sent immediately. In addition, John has put the software on "stealth mode" where an emergency call is made silently.

Tonight, as John is walking past a park, he hears someone from behind "I have a gun. Give me your wallet." John says, "I will give you money. Do not hurt me." John takes out his wallet with one hand and with the other surreptitiously enters the five-button-press for one-touch emergency calling on his cellular phone that is in his pocket. Although the phone has gone into a "Sleep" or "Hibernate" state where the display is switched off (inactive mode), the emergency calling sequence of "Up, Down, Down, Down, Up, Down" is able to wake up the phone and make the emergency call.

An emergency call is sent to an EMS, which locates the appropriate EDC (such as a PSAP). Because there is no voice on the line, the EMS sends an emergency alert with locational information (GPS coordinates of the phone) and will use voice simulation to transmit the information to the PSAP (because this PSAP can only receive voice information). In addition, the EMS sends an alert to the University police regarding an emergency situation at that location. Fortunately, a University police car is in the vicinity and comes on the scene. Because of the one-touch emergency calling, John is able to recover his wallet from the mugger.

Example 2

Jane Doe is a retired school teacher in her eighties who lives alone. Jane is in good health for her age but has a medical condition that makes her susceptible to falls. At the insistence of her son Joe, Jane agrees to install an emergency calling software application on her cellular phone. Because Jane is susceptible to falls and may not be able to reach her phone, Joe installs a Bluetooth® button and pairs it with the application. Joe requests that her mother wear the blue-tooth button on a chain around her neck on days when she is not feeling well.

As part of the installation of the application, Joe goes through a process of SMS verification to connect the phone number with his mother's personal details. Joe also enters Jane's medical conditions and a list of medications into the application. The software evaluates whether authentication will be necessary for one-touch emergency calling and finds that authentication is not necessary because of Jane's high risk of falling.

One day, Jane wakes up feeling light-headed. Because of Joe's request, Jane puts on the chain with the Bluetooth® button around her neck and pairs the button with her phone. As she is walking to the bathroom, Jane experiences a dizzy spell and falls down. During the fall, Jane bangs her head and starts bleeding. After the fall, Jane cannot move her legs but she presses the Bluetooth® button for making an emergency call. Although the phone has gone into a "Sleep" or "Hibernate" mode where the display is switched off, the Bluetooth® button is able to wake up the phone. Because Joe has set-up voice commands as part of the interaction sequence for indicating an emergency to send an emergency alert, the application requests Jane to provide a voice command by saying "Call emergency." When Jane says "Call emergency", the software matches her voice to the one saved previously and makes the emergency call. The voice recognition also serves to provide user authentication, although in this case, the application has determined authentication is not required due to the Jane's high risk of falling.

The emergency call or request with locational information from the GPS of Jane's cell phone is now sent to an EMS, which identifies the correct EDC (such as a PSAP) to send the emergency alert to. The EMS then sends the emergency alert with GPS coordinates of Jane's phone in a format that the particular PSAP is capable of receiving. In addition to locational information, the emergency alert includes information about Jane's medical condition so that an ambulance is sent to Jane's home immediately. As a result, the paramedics reach Jane quickly and are able to stop the bleeding. Jane receives appropriate medical treatment in a hospital and makes a speedy recovery.

Example 3

Mr. James Bond is working on an assignment late night at his office in downtown Manhattan. Mr. Bond's office is next to a chemical factory that processes toxic chemicals. Mr. Bond is working on a special assignment and suspects suspicious activities. Therefore, Mr. Bond pro-actively installed a software application on his mobile communication device that allows Mr. Bond to request emergency assistance and communicate in a covert fashion with an emergency management system. With this application installed, Mr. Bond can press a sequence of hard buttons, a sequence of soft buttons, or a combination thereof in order to send an emergency alert that initiates a communication session with an emergency management system. In addition, Mr. Bond can perform a finger print scan in order to authenticate his identity for the emergency alert.

While Mr. Bond is working late at night finishing a report on an important and critical assignment, Mr. Bond suspects something is not right. There is a distinct smell indicating a leak at the neighborhood chemical factory. Toxic gases have escaped from their storage tanks, and Mr. Bond has to quickly put on his gas mask, which he has kept nearby for such a calamity. Unfortunately, Mr. Bond is unable to talk into the mobile device when wearing the gas mask. Mr. Bond picks up his mobile communication device and presses the decrease volume hard button located on the side of his communication device twice. This turns on the touchscreen display, which presents a persistent emergency button, a soft button available in any state of the mobile communication device whenever the display is ON. This soft-button is available to Mr. Bond even in the screen lock mode, allowing him to press this button without having to unlock the screen. Mr. Bond presses the persistent emergency call button. Next, he places his thumb against a fingerprint scanner on the mobile communication device to scan his fingerprint, which authenticates his identity. This above process is predefined by Mr. Bond and the administrators of the emergency calling service. The emergency alert is sent to the emergency management system, which establishes a communication link with Mr. Bond's communication device. The alert comprises both Mr. Bond's identification information and location information according to his device's GPS.

The device is now in "emergency mode," which was activated by the sending of the emergency alert. The emergency mode persists through the course of the communication link with the EMS and presents a plurality of soft buttons on the touchscreen display comprising a button indicating the user cannot speak. Mr. Bond presses this button to signal to the EMS his inability to talk. He then presses a message button on the touchscreen display and types out a message to the EMS explaining the chemical leak. Mr. Bond also presses a photo/video button on the touchscreen display to take and send a photo of the chemical leak. The EMS coordinates the emergency response personnel and provides them with the relevant information. The emergency response personnel are thus able to arrive at the emergency location prepared with necessary equipment for diffusing the chemical leak. Mr. Bond in the meanwhile is able to maintain himself in a safe location inside his office, while help reaches. With timely help, Mr. Bond is able to evacuate to safety and eventually finish his assignment and hence save the world.

The sequence of hard button and soft button interactions (button presses) along with fingerprint authentication on the communication device allows Mr. Bond to place a call for emergency assistance without requiring Mr. Bond to convey his emergency assistance request in a vocal manner. Moreover, Mr. Bond is able to send pertinent information with the request as well as during the resulting communication link, including GPS location coordinates, meta-data about Mr. Bond, and multimedia information about the emergency situation that Mr. Bond is contained in.

What is claimed is:

1. A smartphone comprising a processor, a memory, a user interface comprising a touchscreen display, a network element for wireless communications, and instructions that, when executed by the processor, cause the processor to:
   present one or more interactive elements for requesting emergency assistance on the touchscreen display;
   receive one or more user interactions with the one or more interactive elements for requesting emergency assistance on the touchscreen display, wherein the one or more user interactions are indicative of an emergency;
   initiate a delay timer for sending an emergency alert after the one or more user interactions indicative of the emergency are received;
   present an option for a user to cancel the emergency alert before the delay timer expires; and
   transmit the emergency alert to an emergency management system based on the delay timer expiring without user cancellation of the emergency alert.

2. The smartphone of claim 1, wherein the one or more user interactions comprises pressing or touching the one or more interactive elements continuously.

3. The smartphone of claim 1, wherein the one or more interactive elements for requesting emergency assistance comprises a soft button.

4. The smartphone of claim 1, wherein the emergency alert comprises a current location for the smartphone.

5. The smartphone of claim 4, wherein the current location information comprises GPS coordinates, an address, or both.

6. The smartphone of claim 1, wherein the emergency alert comprises pre-saved user information.

7. The smartphone of claim 6, wherein the pre-saved user information comprises medical information.

8. The smartphone of claim 1, wherein the delay timer is displayed on the touchscreen display.

9. The smartphone of claim 8, wherein the delay timer is between 3 seconds and 20 seconds.

10. The smartphone of claim 8, wherein the delay timer is 10 seconds.

11. The smartphone of claim 1, wherein the delay timer is customized with a set time.

12. The smartphone of claim 1, wherein the processor is caused to not send the emergency alert to the emergency management system based upon user cancellation.

13. The smartphone of claim 1, wherein the emergency alert is transmitted to the emergency management system in order to alert an appropriate public safety answering point (PSAP) based on a location information and a jurisdictional boundary of the PSAP.

14. A computer-implemented method of sending an emergency alert, comprising:
   presenting one or more interactive elements for requesting emergency assistance on a touchscreen display of smart device;
   receiving one or more user interactions with the one or more interactive elements for requesting emergency assistance on the touchscreen display, wherein the one or more user interactions are indicative of an emergency;
   initiating a delay timer for sending an emergency alert after the one or more user interactions indicative of the emergency are received;
   presenting an option on the touchscreen display for a user to cancel the emergency alert before the delay timer expires; and
   transmitting the emergency alert to an emergency management system based on the delay timer expiring without user cancellation of the emergency alert.

15. The method of claim 14, wherein the one or more user interactions comprises pressing or touching the one or more interactive elements continuously.

16. The method of claim 14, wherein the emergency alert comprises a current GPS location or address for the smart device.

17. The method of claim 14, wherein the delay timer is displayed on the touchscreen display.

18. The method of claim 17, wherein the delay timer is between 3 seconds and 20 seconds.

19. Non-transitory computer readable storage media encoded with a computer program including instructions executable by at least one processor that cause the at least one processor to:
   present one or more interactive elements for requesting emergency assistance on a touchscreen display;
   receive, from a user, one or more user interactions with the one or more interactive elements for requesting emergency assistance on the touchscreen display, wherein the one or more user interactions are indicative of an emergency;
   initiating a delay timer for sending an emergency alert after the one or more user interactions indicative of the emergency are received;
   present an option for the user to cancel the emergency alert before the delay timer expires; and transmit the emergency alert to an emergency management system based on the delay timer expiring without user cancellation of the emergency alert.

20. The non-transitory computer readable storage media of claim 19, wherein the computer program is a mobile application.

* * * * *

UNITED STATES PATENT AND TRADEMARK OFFICE
CERTIFICATE OF CORRECTION

PATENT NO. : 11,832,157 B2
APPLICATION NO. : 17/468392
DATED : November 28, 2023
INVENTOR(S) : Mehta et al.

Page 1 of 1

It is certified that error appears in the above-identified patent and that said Letters Patent is hereby corrected as shown below:

In the Claims

In Column 51, Claim 5, Line 66, delete "information comprises" and insert -- comprises --, therefor.

Signed and Sealed this
Twenty-sixth Day of November, 2024

Katherine Kelly Vidal
*Director of the United States Patent and Trademark Office*